(12) United States Patent
Yoshizawa et al.

(10) Patent No.: US 11,742,971 B2
(45) Date of Patent: Aug. 29, 2023

(54) BROADCAST RECEIVING APPARATUS AND METHOD OF PROCESSING TRANSMISSION WAVES

(71) Applicant: MAXELL, LTD., Kyoto (JP)

(72) Inventors: Kazuhiko Yoshizawa, Kyoto (JP); Yasunobu Hashimoto, Kyoto (JP); Takuya Shimizu, Kyoto (JP); Hitoshi Akiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 347 days.

(21) Appl. No.: 17/054,997

(22) PCT Filed: May 13, 2019

(86) PCT No.: PCT/JP2019/018997
§ 371 (c)(1),
(2) Date: Feb. 8, 2021

(87) PCT Pub. No.: WO2019/221080
PCT Pub. Date: Nov. 21, 2019

(65) Prior Publication Data
US 2021/0218487 A1    Jul. 15, 2021

(30) Foreign Application Priority Data

May 15, 2018 (JP) ................................ 2018-093602
May 16, 2018 (JP) ................................ 2018-094899
(Continued)

(51) Int. Cl.
*H04H 60/43*   (2008.01)
*H04H 20/31*   (2008.01)
(Continued)

(52) U.S. Cl.
CPC ............ *H04H 60/43* (2013.01); *H04H 20/31* (2013.01); *H04H 60/13* (2013.01); *H04H 60/65* (2013.01); *H04H 60/82* (2013.01)

(58) Field of Classification Search
CPC ........ H04H 60/43; H04H 20/31; H04H 60/13; H04H 60/65; H04H 60/82; H04H 20/95; H04H 60/41; H04N 21/235; H04N 21/435
See application file for complete search history.

(56) References Cited

U.S. PATENT DOCUMENTS

2007/0025472 A1\* 2/2007 Hamaminato ......... H04N 5/455
                                                                348/E5.097
2018/0041795 A1\* 2/2018 Yoshizawa ......... H04N 21/4345

FOREIGN PATENT DOCUMENTS

JP      2006-33173 A    2/2006
JP      2007-036684 A   2/2007
(Continued)

OTHER PUBLICATIONS

Tsumochi, Jun et al., "Development of Millimeter-wave Link for 8K Super Hi-Vision Program Contribution", NHK SRL R&D [online], Sep. 2017, No. 165, pp. 28-38.
(Continued)

*Primary Examiner* — Ankur Jain
(74) *Attorney, Agent, or Firm* — McDermott Will & Emery LLP

(57) ABSTRACT

A broadcast receiving apparatus includes: a tuner configured to receive a transmission wave in which identification information is stored in a carrier, the carrier being modulated differently from a data carrier, a frequency band when the transmission wave is transmitted in an air being able to be identified by the identification information; and a controller. The controller is configured to identify a frequency band
(Continued)

when the transmission wave is transmitted in the air by using the identification information contained in transmission wave received by the tuner.

4 Claims, 41 Drawing Sheets

(30) Foreign Application Priority Data

May 17, 2018 (JP) .................................. 2018-095078
Jun. 13, 2018 (JP) .................................. 2018-112514

(51) Int. Cl.
*H04H 60/13* (2008.01)
*H04H 60/65* (2008.01)
*H04H 60/82* (2008.01)

(56) References Cited

FOREIGN PATENT DOCUMENTS

| | | |
|---|---|---|
| JP | 2014-22983 A | 2/2014 |
| JP | 2015-80029 A | 4/2015 |
| JP | 2015-95665 A | 5/2015 |
| JP | 2016-144020 A | 8/2016 |

OTHER PUBLICATIONS

"Channel Coding Scheme for Advanced Digital Satellite Broadcasting System", A draft report of advanced satellite digital broadcasting task force of Information and Communications Council [online], Ministry of Internal Affairs and Communications, Jun. 17, 2008, pp. 1-36.

"Research and Development on Advancement of Broadcasting", Information and Communications Bureau of Ministry of Internal Affairs and Communications [online], document 4-2, Ministry of Internal Affairs and Communications, Mar. 16, 2018, pp. 1-26.

International Search Report issued in corresponding International Patent Application No. PCT/JP2019/018997, dated Jul. 16, 2019, with English translation.

Office Action from corresponding Japanese Patent Application No. 2018-094899 dated May 31, 2022, with English machine translation.

Office Action from corresponding Japanese Patent Application No. 2018-112514 dated Jun. 28, 2022, with English machine translation.

"Succeeded in transmission experiment of Super Hi-Vision by terrestrial broadcasting!" NHK, May 15, 2012, pp. 1-4, with English machine translation.

Written Opinion of the International Searching Authority of PCT/JP2019/018997 and English Translation, dated Jul. 16, 2019. The concise explanations of the non-patent literature documents 2 and 3 of the Information Disclosure Statement filed Nov. 12, 2020 are included in the Written Opinion.

Office Action from corresponding Japanese Patent Application No. 2022-106295 dated Jun. 27, 2023, with English machine translation.

* cited by examiner

FIG. 4A
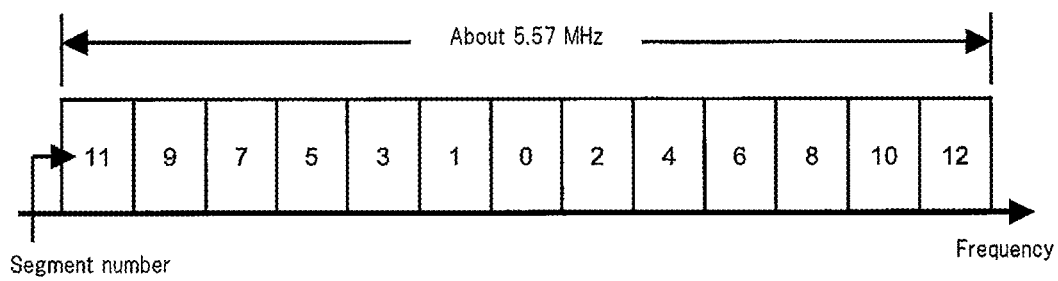
FIG. 4B
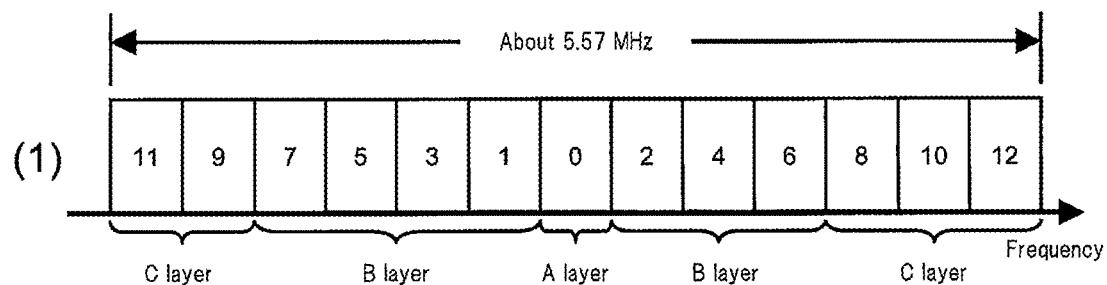
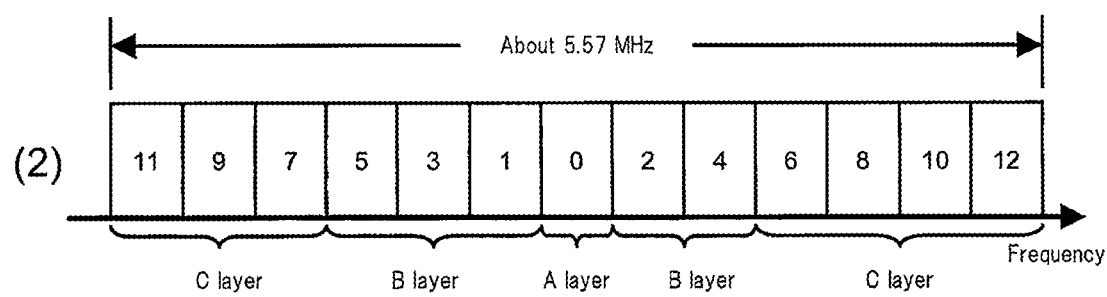
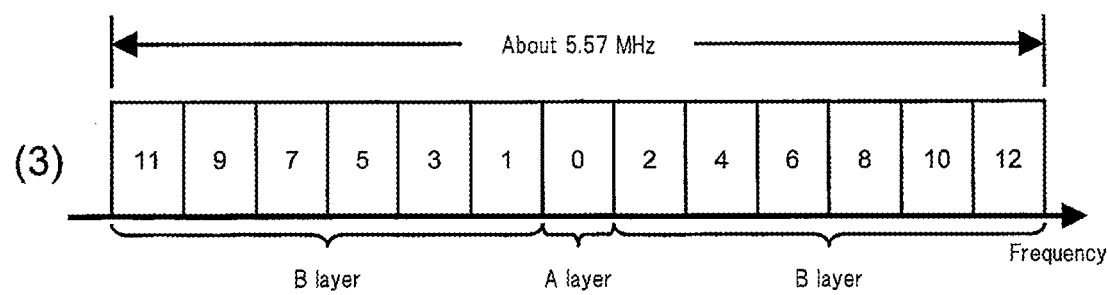

FIG. 4D
(1)
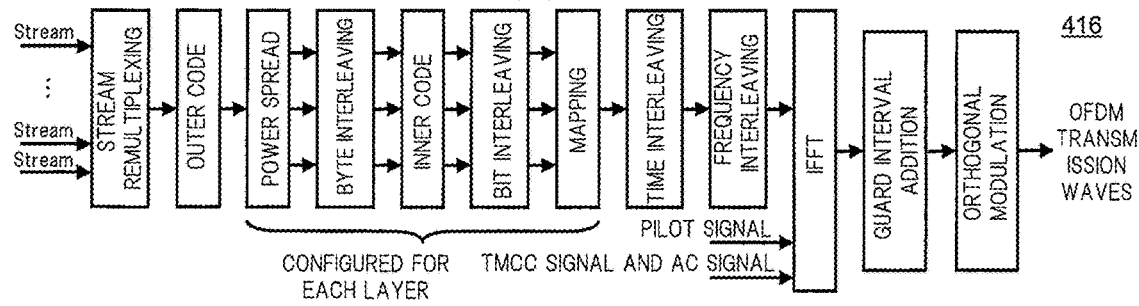
(2)
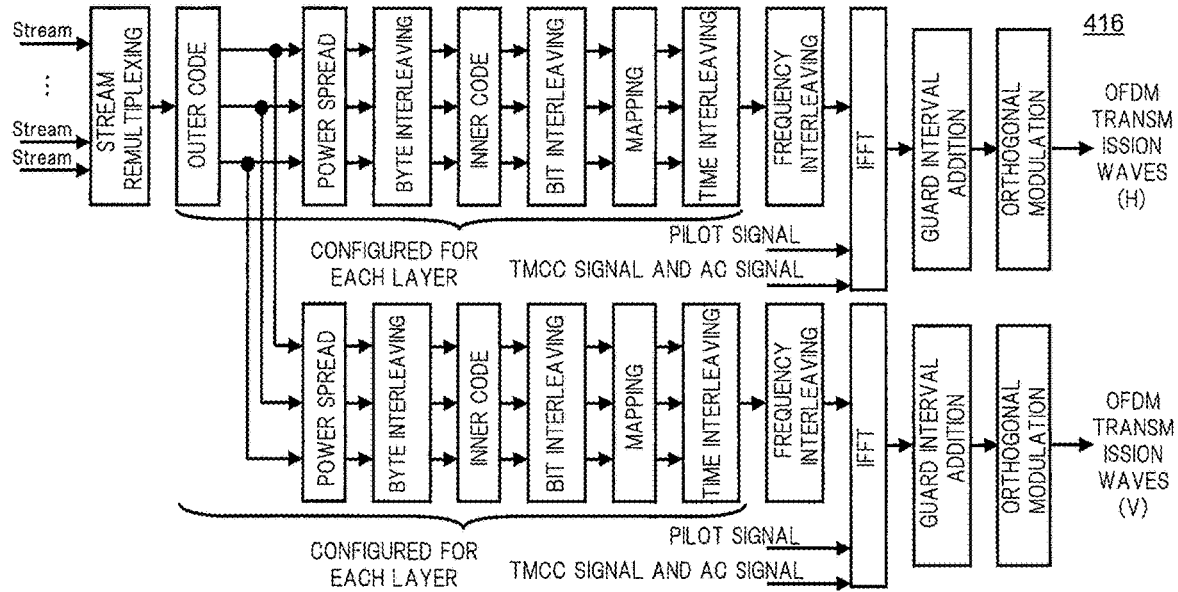
(3)
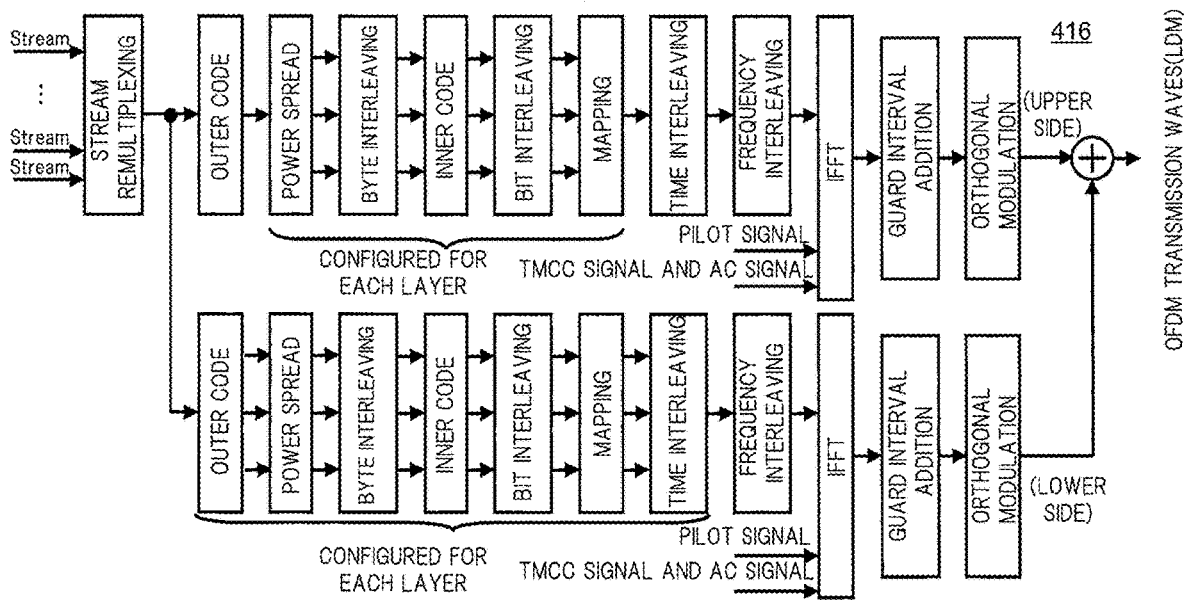

FIG. 4E

| Mode | | Mode 1 | Mode 2 | Mode 3 |
|---|---|---|---|---|
| Segment bandwidth | | About 428.571 kHz | | |
| Carrier interval | | About 3.968 kHz | About 1.984 kHz | About 0.992 kHz |
| Carrier | Total number | 108/108 | 216/216 | 432/432 |
| | Data | 96/96 | 192/192 | 384/384 |
| | SP* | 9/0 | 18/0 | 36/0 |
| | CP* | 0/1 | 0/1 | 0/1 |
| | TMCC | 1/5 | 2/10 | 4/20 |
| | AC1* | 2/2 | 4/4 | 8/8 |
| | AC2* | 0/4 | 0/9 | 0/19 |
| Carrier modulation method | | QPSK, 16 QAM, 64 QAM, 256 QIM, 1024 QAM, 4096 QAM/DQPSK | | |
| Symbol number per frame | | 204 | | |
| Effective symbol length | | About 252 $\mu$s | About 504 $\mu$s | About 1008 $\mu$s |
| Guard interval ratio | | 1/4, 1/8, 1/16, 1/32, etc. | | |
| Inner code | | Convolution code (1/2, 2/3, 3/4, 5/6, 7/8), LDPC code (2/3, 3/4, 5/6), etc. | | |
| Outer code | | Shortened reed Solomon (204, 188) code, BCH code, etc. | | |

*SP: Scattered Pilot, CP: Continual Pilot, AC: Auxiliary Channel

FIG. 4F

| Mode | | Mode 1 | Mode 2 | Mode 3 |
|---|---|---|---|---|
| OFDM segment number | | 13 (Among them, differential modulator segment number: nd, and synchronous modulator segment number: ns) | | |
| Carrier interval | | About 3.968 kHz | About 1.984 kHz | About 0.992 kHz |
| Channel bandwidth | | About 5.575 MHz | About 5.573 MHz | About 5.572 MHz |
| | | (segment bandwidth (see FIG. 4E) × 13 + carrier interval) | | |
| Carrier | Total number | 108 × 13 + 1 = 1405 | 216 × 13 + 1 = 2809 | 432 × 13 + 1 = 5617 |
| | Data | 96 × 13 = 1248 | 192 × 13 = 2496 | 384 × 13 = 4992 |
| | SP | 9 × ns | 18 × ns | 36 × ns |
| | CP | nd + 1 | nd + 1 | nd + 1 |
| | TMCC | ns + 5 × nd | 2 × ns + 10 × nd | 4 × ns + 20 × nd |
| | AC1 | 2 × 13 = 26 | 4 × 13 = 52 | 8 × 13 = 104 |
| | AC2 | 4 × nd | 9 × nd | 19 × nd |

FIG. 5A

| Bit allocation | Explanation |
|---|---|
| B0 | Demodulation reference signal for TMCC symbol |
| B1-B16 | Synchronization signal (w0 = 0011010111101110, w1 = 1100101000010001) |
| B17-B19 | Segment form identification (differential modulator: 111, synchronous modulator: 000) |
| B20-B121 | TMCC information (102 bits) |
| B122-B203 | Parity bits |

FIG. 5B

| Bit allocation | Explanation | |
|---|---|---|
| B20-B21 | System identification | |
| B22-B25 | Transmission parameter switching indicator | |
| B26 | Startup control signal (startup flag for emergency warning broadcasting) | |
| B27 | Current information | Partial reception flag |
| B28-B40 | Current information | A layer transmission parameter information |
| B41-B53 | Current information | B layer transmission parameter information |
| B54-B66 | Current information | C layer transmission parameter information |
| B67 | Next information | Partial reception flag |
| B68-B80 | Next information | A layer transmission parameter information |
| B81-B93 | Next information | B layer transmission parameter information |
| B94-B106 | Next information | C layer transmission parameter information |
| B107-B109 | Connected transmission phase correction amount | |
| B110 | Frequency converting process identification | |
| B111-B116 | Physical channel number identification | |
| B117 | Main signal identification | |
| B118-B119 | 4K signal transmission layer identification | |
| B120-B121 | Additional layer transmission identification | |

FIG. 5C

| Explanation | Bit number |
|---|---|
| Carrier modulation mapping method | 3 |
| Code rate | 3 |
| Length of time interleaving | 3 |
| Segment number | 4 |

FIG. 5D

| B20-B21 | Meaning |
|---|---|
| 00 | Terrestrial digital television broadcasting system |
| 01 | Terrestrial digital audio broadcasting system |
| 10 | Advanced terrestrial digital television broadcasting system |
| 11 | Undefined |

FIG. 5E

| B28-B30/B41-B43/B54-B56<br>B68-B70/B81-B83/B94-B96 | Meaning |
|---|---|
| 000 | DQPSK |
| 001 | QPSK |
| 010 | 16 QAM |
| 011 | 64 QAM |
| 100 | 256 QAM |
| 101 | 1024 QAM |
| 110 | 4096 QAM |
| 111 | Unused layer |

FIG. 5F

| B110 | Meaning |
|---|---|
| 0 | Frequency converting process/<br>frequency conversion amplification process is applied |
| 1 | Frequency converting process/<br>frequency conversion amplification process is not applied |

FIG. 5G

| B111-B116 | Meaning |
|---|---|
| 000000-001100 | Undefined |
| 001101-110100 | 13-52 ch of physical channels |
| 110101-111110 | Undefined |
| 111111 | Not dual-polarized terrestrial digital broadcasting service |

*FIG. 5H*

| B117 | Meaning |
|---|---|
| 0 | Signal transmitted by sub polarized wave (vertical polarized wave/second polarized wave) (dual-polarized transmission method) |
| 0 | Signal transmitted by lower side layer (layered division multiplexing transmission method) |
| 1 | Signal transmitted by main polarized wave (horizontal polarized wave/first polarized wave) (dual-polarized transmission method) |
| 1 | Signal transmitted by upper side layer (layered division multiplexing transmission method) |

*FIG. 5I*

| B118 | Meaning |
|---|---|
| 0 | Execute transmission of 4K program by B layer (dual-polarized transmission method) |
| 0 | Undefined (layered division multiplexing transmission method) |
| 1 | Not execute transmission of 4K program by B layer (dual-polarized transmission method) |
| 1 | Undefined (layered I division multiplexing transmission method) |

| B119 | Meaning |
|---|---|
| 0 | Execute transmission of 4K program by C layer (dual-polarized transmission method) |
| 0 | Execute transmission of 4K program by lower side layer (layered division multiplexing transmission method) |
| 1 | Not execute transmission of 4K program by C layer (dual-polarized transmission method) |
| 1 | Not execute transmission of 4K program by lower side layer (layered division multiplexing transmission method) |

*FIG. 5J*

| B120 | Meaning |
|---|---|
| 0 | Use B layer of vertical polarized wave signal as virtual D layer |
| 1 | Not use B layer of vertical polarized wave signal as virtual D layer |

| B121 | Meaning |
|---|---|
| 0 | Use C layer of vertical polarized wave signal as virtual E layer |
| 1 | Not use C layer of vertical polarized wave signal as virtual E layer |

FIG. 6A

| Bit allocation | Explanation |
|---|---|
| B0 | Demodulation reference signal for AC symbol |
| B1-B3 | Configuration identification |
| B4-B203 | Additional information regarding transmission control of modulation wave or seismic motion warning information |

FIG. 6B

| B1-B3 | Meaning |
|---|---|
| 000 | Transmit additional information regarding transmission control of modulation wave |
| 111 | |
| 001 | Transmit seismic motion warning information |
| 110 | |
| 010 | Transmit additional information regarding transmission control of modulation wave |
| 101 | |
| 011 | Transmit additional information regarding transmission control of modulation wave |
| 100 | |

FIG. 6C

| Bit allocation | Meaning |
|---|---|
| B4-B16 | Synchronization signal |
| B17-B18 | Start/end flag |
| B19-B20 | Update flag |
| B21-B23 | Signal identification |
| B24-B111 | Seismic motion warning detailed information |
| B112-B121 | CRC |
| B122-B203 | Parity bit |

FIG. 6D

| B21-B23 | Meaning |
|---|---|
| 000 | Seismic motion warning detailed information (there is corresponding region) |
| 001 | Seismic motion warning detailed information (there is no corresponding region) |
| 010 | Test signal of seismic motion warning detailed information (there is corresponding region) |
| 011 | Test signal of seismic motion warning detailed information (there is no corresponding region) |
| 100 | Undefined |
| 101 | |
| 110 | |
| 111 | No seismic motion warning detailed information |

FIG. 6E

| Bit allocation | | Meaning |
|---|---|---|
| B24-B54 | Current time | Information on current time when seismic motion warning information is sent out |
| B55 | Page type | Code for identifying type of information regarding seismic motion that is target of seismic motion warning |
| B56-B111 | Seismic motion information | Case where page type is "0": Target region of seismic motion warning is indicated. Case where page type is "1": Information on total number, longitude, latitude, seismic intensity, and time of occurrence in seismic motion warning is indicated. |

FIG. 6F

| Bit allocation | Meaning |
|---|---|
| B24-B55 | Undefined |
| B56-B66 | Broadcaster identification |
| B67-B111 | Undefined |

FIG. 6G

| Bit allocation | Meaning | |
|---|---|---|
| B4-B16 | synchronization signal | |
| B17 | undefined | |
| B18-B30 | Current information | B layer transmission parameter additional information (during 4K transmission) |
| B31-B43 | | C layer transmission parameter additional information (during 4K transmission) |
| B44-B56 | | Virtual D layer transmission parameter (during not 4K transmission) |
| B57-B69 | | Virtual E layer transmission parameter (during not 4K transmission) |
| B70-B82 | Next information | B layer transmission parameter additional information (during 4K transmission) |
| B83-B95 | | C layer transmission parameter additional information (during 4K transmission) |
| B96-B108 | | Virtual D layer transmission parameter (during not 4K transmission) |
| B109-B121 | | Virtual E layer transmission parameter (during not 4K transmission) |
| B122-B203 | Parity bits | |

FIG. 6H

| Explanation | Bit number |
|---|---|
| Error correction method | 3 |
| Constellation form | 3 |
| undefined | 3 |
| undefined | 4 |

FIG. 6I

| Error correction method | Meaning |
|---|---|
| 000 | Inner code = convolution code, and Outer code = shortened RS code |
| 001 | Inner code = LDPC code, and Outer code = BCH code |
| 010-111 | undefined |

FIG. 6J

| NUC form | Meaning |
|---|---|
| 000 | Uniform constellation |
| 001-111 | Non-uniform constellation 1 to 7 |

FIG. 7E
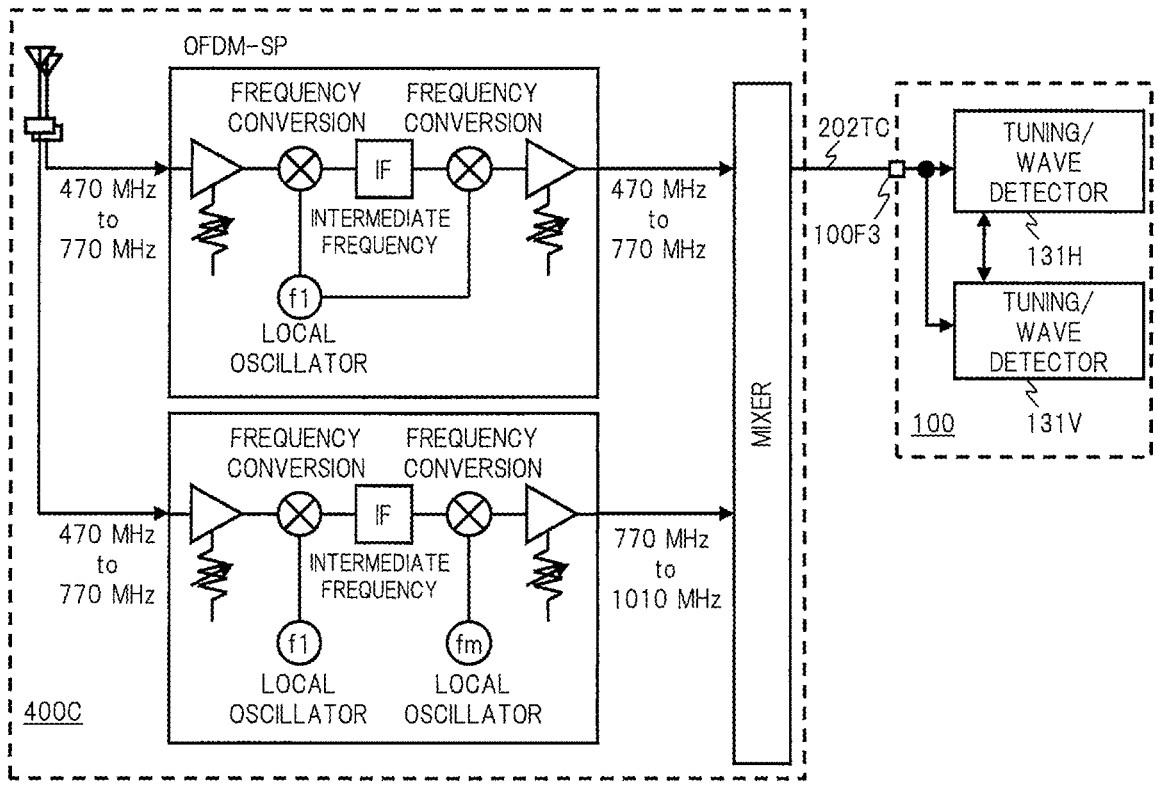
FIG. 7F
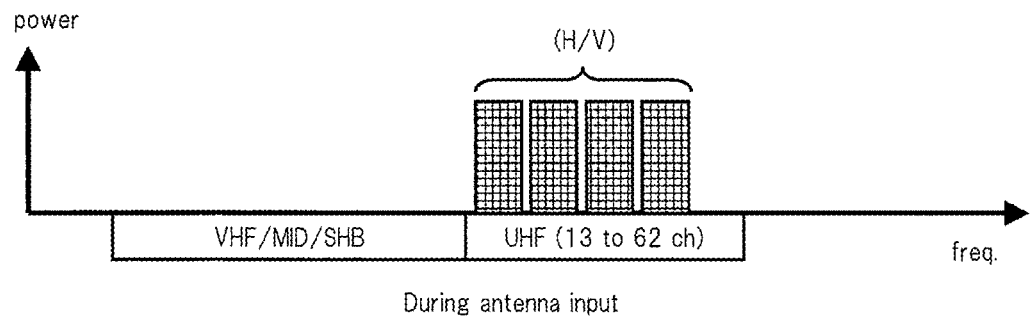
During antenna input
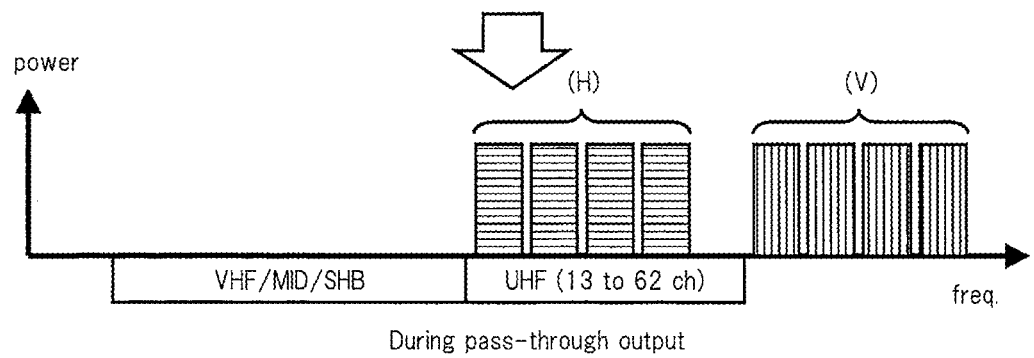
During pass-through output FIG. 7G
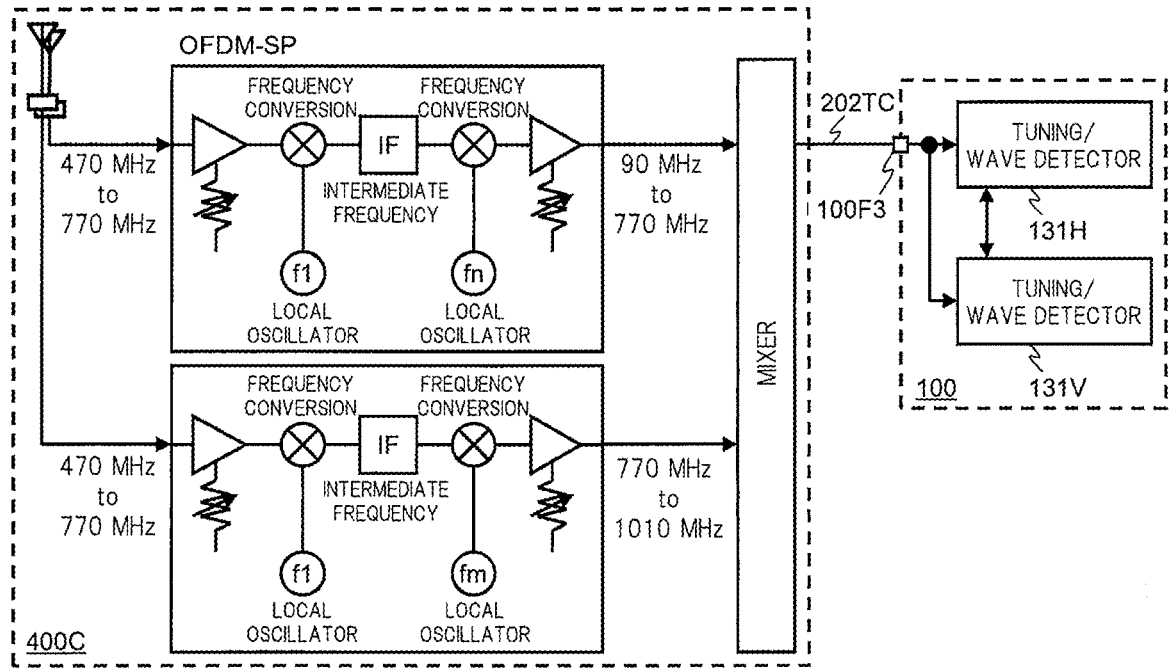
FIG. 7H
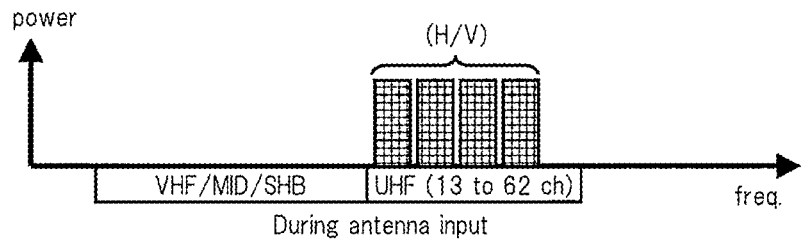
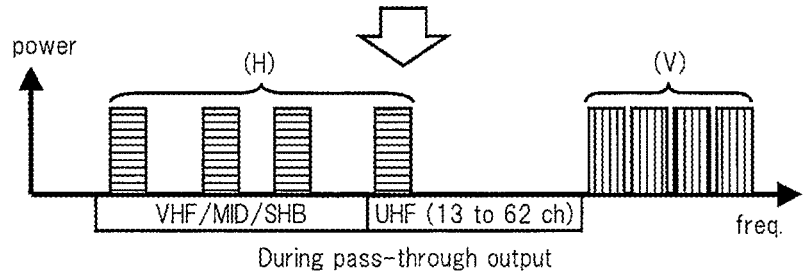
FIG. 7I
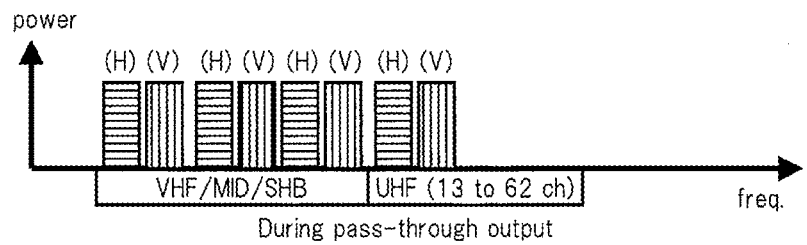

(*TMCC: Transmission and Multiplexing Configuration Control)

FIG. 9B

| Table name | Overview of function |
|---|---|
| PAT (Program Association Table) | Transmit PMT related to broadcasting program<br>Specify packet identifier of TS packet |
| CAT (Conditional Access Table) | Transmit personal information of related information of pay-per-view<br>Specify packet identifier of TS packet |
| PMT (Program Map Table) | Transmit each coded signal constituting broadcasting program<br>Specify packet identifier of TS packet to transmit common information among packet identifier of TS packet to transmit each coded signal constituting broadcasting program and related information of pay-per-view |
| NIT (Network Information Table) | Transmit information of transmission path such as modulation frequency and information with which broadcasting program is associated |
| SDT (Service Description Table) | Transmit information with which broadcasting program is associated, such as name of organization channel or name of broadcaster |
| BAT (Bouquet Association Table) | Indication of information regarding bouquet (cluster of organization channels) such as name of bouquet, or organization channels included therein |
| EIT (Event Information Table) | Indication of information regarding program such as name of program, broadcast date and time, explanation of content |
| RST (Running Status Table) | Indication of current progress status of program |
| TDT (Time and Date Table) | Indication of current date and time |
| TOT (Time Offset Table) | Indication of current date and time, and<br>Specify difference time between actual time and display time to human systems |
| LIT (Local Event Information Table) | Indication of information regarding local event such as identification (time) of local event (scene, etc.) in program, name, or explanation |
| ERT (Event Relation Table) | Represent relation between program and local event, such as group of program and local event, or attribute |
| ITT (Index Transmission Table) | Description of information regarding program index when program is sent out |
| PCAT (Partial Content Announcement Table) | Notification of content difference distribution in data broadcast |
| ST (Stuffing Table) | Disablement of table |
| BIT (Broadcaster Information Table) | Specify unit of broadcaster, and SI transmission parameter for every broadcaster unit |
| NBIT (Network Board Information Table) | Transmit bulletin board information and reference information for obtaining bulletin board information |
| LDT (Linked Description Table) | Transmit information on which reference information from other tables is summarized |
| AMT (Address Map Table) | Transmit information in which service identifier for identifying broadcasting program is associated with IP packet |
| INT (IP/MAC Notification Table) | Transmit information for associating broadcasting program with IP/MAC stream constituting it in IP packet transmission by MPEG-2 TS<br>INT is transmitted by private section (stream_type = 0x05) of MPEG-2 System |
| Table set by provider | |

FIG. 9C

| Table name | Overview of function |
|---|---|
| ECM (Entitlement Control Message) | Transmission of common information composed of program information (information regarding program, key for descramble, etc.) and control information (command for forced on/off of descramble function of decoder) |
| EMM (Entitlement Management Message) | Transmission of personal information containing contract of each subscriber and work key for deciphering a code of common information |
| DCT (Download Control Table) | Transmission of various kinds of information for dividing and extracting DLT |
| DLT (DownLoad Table) | Transmission of software to be downloaded |
| DIT (Discontinuity Information Table) | Indicate change point where program arrangement information of program transmitted by partial transport stream may become discontinuous |
| SIT (Selection Information Table) | Indication of information regarding program transmitted by partial transport stream |
| SDTT (Software Download Trigger Table) | Indication of notification information of service ID for download, schedule information, receiver type of update target |
| CDT (Common Data Table) | Transmit data that are commonly necessary for receiver and assumes to be stored in non-volatile memory, such as provider logo mark |
| DSM-CC section | Transmission of various kinds of data in data broadcasting |
| AIT (Application Information Table) | Transmission of dynamic control information regarding application and additional information necessary for execution |
| DCM (Download Control Message) | Transmission of related information composed of key for decoding transmission path code for download |
| DMM (Download Management Message) | Transmission of key related information composed of download key for deciphering a code of DCM |
| Table set by provider | |

FIG. 9D

| Descriptor name | Overview of function |
|---|---|
| Limited reception type descriptor (Conditional Access Descriptor) | Description of access control method and PID for transmitting ECM/EMM thereof |
| Copyright descriptor (Copyright Descriptor) | Identification of copyright |
| Network name descriptor (Network Name Descriptor) | Description of network name |
| Service list descriptor (Service List Descriptor) | Description of organization channel and its type |
| Stuffing descriptor (Stuffing Descriptor) | Security of descriptor space and disablement of descriptor |
| Satellite delivery system descriptor (Satellite Delivery System Descriptor) | Description of physical condition of satellite transmission path |
| Terrestrial delivery system descriptor (Terrestrial Delivery System Descriptor) | Description of physical condition of terrestrial transmission path |
| Bouquet name descriptor (Bouquet Name Descriptor) | Description of bouquet name |
| Service descriptor (Service Descriptor) | Description of organization channel name and its provider name |
| Country reception availability descriptor (Country Availability Descriptor) | Description of service target country |
| Linkage descriptor (Linkage Descriptor) | Description of association with other organization channels |
| NVOD reference service descriptor (NVOD Reference Descriptor) | Description of list of time shifted organization channels with respect to reference organization channel of NearVOD |
| Time shifted service descriptor (Time Shifted Service Descriptor) | Description of reference organization channel with respect to time shifted organization channel of NearVOD |
| Short form event descriptor (Short Event Descriptor) | Description of program name and brief description of program |
| Extended form event descriptor (Extended Event Descriptor) | Description of detailed information regarding program |
| Time shifted event descriptor (Time Shifted Event Descriptor) | Description of reference program with respect to time shifted program of NearVOD |
| Component descriptor (Component Descriptor) | Description of type and explanation regarding program element signal |
| Mosaic descriptor (Mosaic Descriptor) | Description of unit of division, and association with other organization channel/program regarding mosaic (divided screen) service |
| Stream identifier descriptor (Stream Identifier Descriptor) | Identification of individual program element signal |
| CA identifier descriptor (CA Identifier Descriptor) | Description of available access control method |

FIG. 9E

| Descriptor name | Overview of function |
|---|---|
| Content descriptor<br>(Content Descriptor) | Description of program genre |
| Parental rate descriptor<br>(Parental Rating Descriptor) | Description of viewing permitted age limit |
| Hierarchical transmission descriptor<br>(Hierarchical Transmission Descriptor) | Description of relation among hierarchized streams in hierarchical transmission |
| Digital copy control descriptor<br>(Digital Copy Control Descriptor) | Description of information for controlling copy generation and the maximum transmission rate in digital recording equipment |
| Emergency information descriptor<br>(Emergency Information Descriptor)) | Description of necessary information and function as emergency warning signal |
| Data coded method descriptor<br>(Data Component Descriptor) | Identification of data signal form |
| System management descriptor<br>(System Management Descriptor) | Identification of broadcasting/non-broadcasting |
| Local time offset descriptor<br>(Local Time Offset Descriptor) | Description of difference time between actual time (UTC + 9 hours) and display time to human systems when daylight-saving time system is performed |
| Audio component descriptor<br>(Audio Component Descriptor) | Description of parameter regarding audio signal of program element |
| Target region descriptor<br>(Target Region Descriptor) | Description of region as target |
| Hyperlink descriptor<br>(Hyperlink Descriptor) | Description of links for other program, inside of program, and program related information |
| Data content descriptor<br>(Data Content Descriptor) | Description of detailed information regarding individual content of data program |
| Video decode control descriptor<br>(Video Decode Control Descriptor) | Usage for controlling video code at turning point of events |
| Basic local event descriptor<br>(Basic Local Event Descriptor) | Description of identification information of local event |
| Reference descriptor<br>(Reference Descriptor) | Description of node reference from program or local event |
| Node relation descriptor<br>(Node Relation Descriptor) | Description of relation from node to another node |
| Short form node information descriptor<br>(Short Node Information Descriptor) | Description of name of node and brief description |
| STC reference descriptor<br>(STC Reference Descriptor) | Description of relation between identification time and STC of local event |
| Partial reception descriptor<br>(Partial Reception Descriptor) | Description of service identification transmitted by partial reception layer of terrestrial transmission path |
| Series descriptor<br>(Series Descriptor) | Description of series descriptor spreading plural events |
| Event group descriptor<br>(Event Group Descriptor) | Description of grouped information of plural events |
| SI transmission parameter descriptor<br>(SI Parameter Descriptor) | Description of SI transmission parameter (such as periodic group or retransmission cycle) |
| Broadcaster name descriptor<br>(Broadcaster Name Descriptor) | Description of broadcaster name |
| Component group descriptor<br>(Component Group Descriptor) | Description of grouped information of plural components |
| SI prime TS descriptor<br>(SI Prime TS Descriptor) | Description of identification information and transmission parameter of SI prime TS |
| Bulletin board information descriptor<br>(Board Information Descriptor) | Description of title and body of bulletin board information |

FIG. 9F

| Descriptor name | Overview of function |
|---|---|
| LDT linkage descriptor (LDT Linkage Descriptor) | Summarize and transmit description referred from another table |
| Connected transmission descriptor (Connected Transmission Descriptor) | Description of physical condition at time of connected transmission on terrestrial transmission path |
| TS information descriptor (TS Information Descriptor) | Description of information regarding TS, such as allocation of remote controller button number for the TS or transmission layer of service in TS |
| Extended broadcaster descriptor (Extended Broadcaster Descriptor) | Description of broadcaster information that is not limited within network |
| Logo transmission descriptor (Logo Transmission Descriptor) | Description of string for simple logo, pointing to CDT form logo, etc. |
| Content availability descriptor (Content Availability Descriptor) | Description of information for controlling record and output |
| Carousel compatible composite descriptor (Carousel Compatible Composite Descriptor) | Description of descriptor defined by data carousel method |
| Limited reproducing method descriptor (Conditional Playback Descriptor) | Description of PID for transmitting conditional reproduction method and its ECM/EMM |
| AVC video descriptor (AVC Video Descriptor) | Description of basic information of coding, such as profile or level of ITU-T recommendation H.264\|ISO/IEC 14496-10 video |
| AVC timing HRD descriptor (AVC Timing and HRD Descriptor) | Description of timing information for decoding ITU-T recommendation H.264\|ISO/IEC 14496-10 video |
| Service group descriptor (Service Group Descriptor) | Description of grouped information of plural services |
| MPEG-4 audio descriptor (MPEG-4 Audio Descriptor) | Description of basic information for specifying coding parameter of MPEG-4 audio stream |
| MPEG-4 audio extension descriptor (MPEG-4 Audio Extension Descriptor) | Description of profile and level of MPEG-4 audio stream and settings specific to coding method |
| Registration descriptor (Registration Descriptor) | Description of information for identifying private data that is not defined in ISO/IEC 13818-1 |
| Data broadcast identification descriptor (Data Broadcast Id Descriptor) | Description of data broadcast identification |
| Access control descriptor (Access Control Descriptor) | Description of access control method, and PID and transmission information for transmitting its ECM/EMM |
| Area broadcasting information descriptor (Area Broadcasting Information Descriptor) | Description of identification and signal form of transmitting station, and information related to transmitting station in broadcast performed by area limitation |
| Material information descriptor (Material Information Descriptor) | Description of basic information, such as material type, material name, material code, or linkage to related information, with respect to material constituting program |
| HEVC video descriptor (HEVC Video Descriptor) | Description of basic information of coding, such as profile or level of ITU-T recommendation H.265\|ISO/IEC 23008-2 video |
| Hierarchy coded descriptor (Hierarchy Descriptor) | Description of information for identifying program element including hierarchy coded video stream component |
| Communication cooperation information descriptor (Hybrid Information Descriptor) | Description of information for specifying communication stream used in combination with broadcasting service |
| Scramble method descriptor (Scrambler Descriptor) | Description of information for specifying cryptographic algorithm of scramble method |
| Descriptor set by provider | |

FIG. 9G

| Descriptor name | Overview of function |
|---|---|
| Partial transport stream descriptor (Partial Transport Stream Descriptor) | Description regarding partial transport stream |
| Network identification descriptor (Network Identification Descriptor) | Description regarding network identification |
| Partial transport stream time descriptor (Partial Transport Stream Time Descriptor) | Description regarding partial transport stream time |
| Download Content descriptor (Download Content Descriptor) | Description of attribute information such as size and type of content to be downloaded, or download ID |
| CA EMM TS descriptor (CA EMM TS Descriptor) | Indicate specific transponder in case where transmission of EMM is performed by specific transponder method |
| CA contract information descriptor (CA Contract Information Descriptor) | Description of type of Limited reception service of broadcast scheduled program (tier/flat/PPV) and advisability of viewing/recording reservation |
| CA service descriptor (CA Service Descriptor) | Description of pay-per-view entity that provides service for displaying automatic display message |
| Carousel identifier descriptor (Carousel Identifier Descriptor) | Description of carousel identifier defined by ISO/IEC 13818-6 |
| Association tag descriptor (Association Tag Descriptor) | Description regarding association tag information defined by ISO/IEC 13818-6 |
| Extended association tag descriptor (Deferred Association tags Descriptor) | Description regarding association tag information on another broadcasting program defined by ISO/IEC 13818-6 |
| Network download Content descriptor (Network Download Content Descriptor) | Description of customer information of content downloaded via network |
| Download protection descriptor (Download Protection Descriptor) | Description of security information at time of download |
| CA startup descriptor (CA Startup Descriptor) | Description of information regarding CAS program startup with limited reproducing function |
| Descriptor set by provider | |

FIG. 9H

| Descriptor name | Overview of function |
|---|---|
| Target smartcard descriptor (Target Smartcard Descriptor) | Specification of receiver by smartcard ID |
| Target IP address descriptor (Target IP Address Descriptor) | Specification of IPv4 address that becomes target |
| Target IPv6 address descriptor (Target IPv6 Address Descriptor) | Specification of IPv6 address that becomes target |
| IP/MAC platform name descriptor (IP/MAC Platform Name Descriptor) | Description of IP platform name |
| IP/MAC platform provider name descriptor (IP/MAC Platform Provider Name Descriptor) | Description of IP platform provider name |
| IP/MAC stream arrangement descriptor (IP/MAC Stream Location Descriptor) | Description of IP stream arrangement information |
| Descriptor set by provider | |

FIG. 9I

| Descriptor name | Overview of function |
|---|---|
| Application descriptor (Application Descriptor) | Description of information on application |
| Transport protocol descriptor (Transport Protocol Descriptor) | Indicate specification of transport protocol for broadcast/communication and location information on application depending on transport protocol |
| Simple application location descriptor (Simple Application Location Descriptor) | Indicate details of customer of application |
| Application boundary authority setting descriptor (Application Boundary and Permission Descriptor) | Set application boundary and set authority of broadcast resource for each region (URL) |
| Startup priority information descriptor (Autostart Priority Descriptor) | Specify application startup priority |
| Cache information descriptor (Cache Control Info Descriptor) | Indicate cache information in case where resource constituting application is cached and held |
| Stochastic application delay descriptor (Randomized Latency Descriptor) | Set timing when application control is performed |
| External application control descriptor (External Application Control Descriptor) | Indicate access authority of broadcasting resource to be given to external application |
| Video recording and reproducing application descriptor (Playback Application Descriptor) | Description of information of application that starts up at time of reproduction of recorded content |
| Simple video recording and reproducing application location descriptor (Simple Playback Application Location Descriptor) | Indicate details of customer of application that starts up at time of reproduction of recorded content |
| Application expiration descriptor (Application Expiration Descriptor) | Indicate expiration date when application indicated by video recording and reproducing application descriptor and Simple video recording and reproducing application location descriptor may be started up |
| Descriptor set by provider | |

(*TMCC: Transmission and Multiplexing Configuration Control)

*FIG. 10C*

| Table name | Overview of function |
|---|---|
| Network information table for TLV (Network Information Table for TLV) | Transmit information for associating information on transmission path such as modulation frequency with broadcasting program in transmission by TLV packet |
| Address map table (Address Map Table) | Transmit information for associating service identifier for identifying broadcasting program number with IP packet |
| Table set by provider | |

*FIG. 10D*

| Descriptor name | Overview of function |
|---|---|
| Service list descriptor (Service List Descriptor) | Description of list of organization channel and its type |
| Satellite delivery system descriptor (Satellite Delivery System Descriptor) | Description of physical condition of satellite delivery path |
| System management descriptor (System Management Descriptor) | Identification of broadcast/non-broadcast |
| Network name descriptor (Network Name Descriptor) | Description of network name |
| Remote control key descriptor (Remote Control Key Descriptor) | Set service to be allocated to one-touch channel selection button of remote controller for receiver |
| Descriptor set by provider | |

*FIG. 10E*

| Message name | Overview of function |
|---|---|
| PA (Package Access) message | Become entry point of MMT-SI, and Transmit table of MMT-SI |
| M2 section message | Transmit section extension form of MPEG-2 Systems |
| CA message | Transmit information regarding limited receiving method |
| M2 short section message | Transmit section short form of MPEG-2 Systems |
| Data transmission message | Transmit table regarding data transmission |
| Message set by provider | |

FIG. 10F

| Table name | Overview of function |
|---|---|
| MMT package table (MMT Package Table) | Give information constituting package, such as list of assets or their positions |
| Package list table (Package List Table) | Transmit PA message of MMT package provided as broadcasting service, Transmit IP data flow and packet ID, and Indicate list of IP data flow for transmitting IP service |
| Layout configuration table (Layout Configuration Table) | Use for associating layout information for presentation with layout number |
| ECM (Entitlement Control Message) | Transmit common information composed of program information (information regarding program, key for descramble, etc.) and control information |
| EMM (Entitlement Management Message) | Transmit individual information containing contract information for each subscriber and work key for deciphering code of common information |
| CA table (MH) (Conditional Access Table) | Transmit descriptor regarding limited receiving method |
| DCM (Download Control Message) | Transmit key related information composed of key for decoding transmission path code for download |
| DMM (Download Management Message) | Transmit key related information composed of download key for decoding code of DCM |
| MH-event information table (MH-Event Information Table) | Transmit information regarding program, such as name of program, date and time of broadcast, or explanation of content |
| MH-application information table (MH-Application Information Table) | Transmit dynamic control information regarding application and additional information necessary for execution |
| MH-broadcaster information table (MH-Broadcaster Information Table) | Use for presenting information on broadcaster existing on network |
| MH-software download trigger table (MH-Software Download Trigger Table) | Transmit notification information such as service ID for download, schedule information, or receiver type of update target |
| MH-service description table (MH-Service Description Table) | Transmit information regarding organization channel such as name of organization channel or name of broadcaster |
| MH-time offset table (MH-Time Offset Table) | Indicate current date and time, and Transmit difference time between actual time and display time to human systems |
| MH-common data table (MH-Common Data Table) | Transmit data that are commonly necessary for receiver and assumes to be stored in non-volatile memory, such as provider logo mark |
| Data directory management table (Data Directory Management Table) | Provide directory configuration of file constituting application |
| Data asset management table (Data Asset Management Table) | Provide configuration of MPU in asset and version information for each MPU |
| Data content configuration table (Data Content Configuration Table) | Provide configuration information of file as data content |
| Event message table (Event Message Table) | Use for transmitting information regarding event message |
| Table set by provider | |

FIG. 10G

| Descriptor name | Overview of function |
|---|---|
| Asset group descriptor (Asset Group Descriptor) | Provide group relation of asset and priority in group |
| Event package descriptor (Event Package Descriptor) | Provide correspondence between event indicating program and package |
| Background color specification descriptor (Background Color Descriptor) | Specify background color of rearmost surface in layout specification |
| MPU presentation region specification descriptor (MPU Presentation Region Descriptor) | Provide presentation position of MPU |
| MPU timestamp descriptor (MPU Timestamp Descriptor) | Provide presentation time of MPU |
| Dependency descriptor (Dependency Descriptor) | Provide asset ID of assets that have dependency relation |
| Access control descriptor (Access Control Descriptor) | Identify limited receiving method |
| Scramble method descriptor (Scrambler Descriptor) | Identify scramble sub system |
| Message authentication method descriptor (Message Authentication Method Descriptor) | Identify message authentication method |
| Emergency information descriptor (Emergency Information Descriptor) | Provide necessary information and description of function as emergency warning signal |
| MH-MPEG-4 audio descriptor (MH-MPEG-4 Audio Descriptor) | Describe basic information for specifying coding parameter of MPEG-4 audio stream |
| MH-MPEG-4 audio extension descriptor (MH-MPEG-4 Audio Extension Descriptor) | Describe profile and level of MPEG-4 audio stream and setting specific to coding method |
| MH-HEVC video descriptor (MH-HEVC Descriptor) | Describe basic coding parameter of video stream (HEVC stream) of ITU-T recommendation H.265\|ISO/IEC 23008-2 video |
| MH-linkage descriptor (MH-Linkage Descriptor) | Describe association with another organization channel |
| MH-event group descriptor (MH-Event Group Descriptor) | Describe grouping information of plural events |
| MH-service list descriptor (MH-Service List Descriptor) | Describe list of organization channel and its type |
| MH-short form event descriptor (MH-Short Event Descriptor) | Describe program name and brief description of program |
| MH-extended form event descriptor (MH-Extended Event Descriptor) | Describe detailed information regarding program |
| Video component descriptor (Video Component Descriptor) | Describe parameter regarding video signal, explanation thereof, etc. of program element signal |
| MH-stream identifier descriptor (MH-Stream Identifier Descriptor) | Use for identifying individual program element signal |
| MH-content descriptor (MH-Content Descriptor) | Describe program genre |
| MH-parental rate descriptor (MH-Parental Rating Descriptor) | Describe viewing permitted age limit |
| MH-audio component descriptor (MH-Audio Component Descriptor) | Describe parameter regarding audio signal of program element |
| MH-target region descriptor (MH-Target Region Descriptor) | Describe region as target |
| MH-series descriptor (MH-Series Descriptor) | Describe series information spreading plural events |
| MH-SI transmission parameter descriptor (MH-SI Parameter Descriptor) | Describe parameter (such as periodic group or retransmission cycle) of SI transmission |

FIG. 10H

| Descriptor name | Overview of function |
|---|---|
| MH-broadcaster name descriptor (MH-Broadcaster Name Descriptor) | Describe broadcaster name |
| MH-service descriptor (MH-Service Descriptor) | Describe organization channel name and its provider name |
| IP data flow descriptor (IP Data Flow Descriptor) | Describe information of IP data flow contained in service |
| MH-CA startup descriptor (MH-CA Startup Descriptor) | Describe information regarding startup of CAS program having limited receiving function |
| MH-Type descriptor (MH-Type Descriptor) | Indicate type of file to be transmitted by application transmission method |
| MH-Info descriptor (MH-Info Descriptor) | Describe information regarding MPU or item |
| MH-Expire descriptor (MH-Expire Descriptor) | Describe expiration date of item |
| MH-Compression Type descriptor (MH-Compression Type Descriptor) | Indicate compression algorithm of item to be compressed and transmitted and byte number of item before compression |
| MH-data coding method descriptor (MH-Data Component Descriptor) | Use for identifying data coding method |
| UTC-NPT reference descriptor (UTC-NPT Reference Descriptor) | Transmit relation between NPT and UTC |
| Event message descriptor (Event Message Descriptor) | Transmit information regarding general event message |
| MH-local time offset descriptor (MH-Local Time Offset Descriptor) | Describe difference time between actual time (UTC + 9 hours) and display time to human systems when daylight-saving time system is performed |
| MH-component group descriptor (MH-Component Group Descriptor) | Describe grouping information of plural components |
| MH-logo transmission descriptor (MH-Logo Transmission Descriptor) | Describe string for simple logo, pointing to logo with CDT form, etc. |
| MPU extended timestamp descriptor (MPU Extended Timestamp Descriptor) | Provide decoding time of access unit in MPU |
| MPU download content descriptor (MPU Download Content Descriptor) | Describe attribute information of content downloaded by using MPU |
| MH-network download content descriptor (MH-Network Download Content Descriptor) | Describe attribute information of content downloaded by using network |
| MH-application descriptor (MH-Application Descriptor) | Describe information on application |
| MH-transport protocol descriptor (MH-Transport Protocol Descriptor) | Describe specification of transmission protocol and location information of application depending on transmission protocol |
| MH-simple application location descriptor (MH-Simple Application Location Descriptor) | Describe details of acquisition source of application |
| MH-application boundary authority setting descriptor (MH-Application Boundary and Permission Descriptor) | Describe setting of application boundary, and setting of broadcasting resource access authority for each region (URL) |
| MH-startup priority information descriptor (MH-Autostart Priority Descriptor) | Describe startup priority of application |
| MH-cache information descriptor (MH-Cache Control Info Descriptor) | Describe information on cache control for caching and holding resource constituting application |
| MH-stochastic application delay descriptor (MH-Randomized Latency Descriptor) | Describe setting of delay amount for stochastically delaying timing to execute application control |
| Linked PU descriptor (Linked PU Descriptor) | Describe information on linked presentation unit |

FIG. 101

| Descriptor name | Overview of function |
|---|---|
| Locked cache specification descriptor (Locked Cache Descriptor) | Describe specification of file as target to be cached and locked |
| Unlocked cache specification descriptor (Unlocked Cache Descriptor) | Described specification of file to be unlocked |
| MH-download protection descriptor (MH-DL Protection Descriptor) | Describe DCM, location information of MMTP packet for transmitting DCM, and transmission information |
| Application service descriptor (Application Service Descriptor) | Describe entry information of application related to service |
| MPU node descriptor (MPU Node Descriptor) | Indicate that the MPU corresponds to directory node defined by data directory management table |
| PU structure descriptor (PU Structure Descriptor) | Indicate list of MPU constituting presentation unit |
| MH-hierarchy coding descriptor (MH-Hierarchy Descriptor) | Describe information for identifying hierarchy-coded video stream component |
| Content copy control descriptor (Content Copy Control Descriptor) | Indicate control information regarding digital copy of content and the maximum transmission rate |
| Content usage control descriptor (Content Usage Control Descriptor) | Describe control information regarding accumulation and output of content |
| Emergency news descriptor (Emergency News Descriptor) | Indicate that emergency news flash regarding safe and secure (emergency earthquake early warning, news bulletin, and flash caption) is broadcasting |
| MH-CA contract information descriptor (MH-CA Contract Info Descriptor) | Describe information for confirming that service or event can be reserved |
| MH-CA service descriptor (MH-CA Service Descriptor) | Indicate organization channel of provider that operates automatic display message, and Describe display control information of the message |
| MH-external application control descriptor (MH-External Application Control Descriptor) | Describe access authority to broadcasting resource to be given to external application |
| MH-video recording and reproducing application descriptor (MH-Playback Application Descriptor) | Indicate application that starts up together with reproduction of recorded content |
| MH-simple video recording and reproducing application location descriptor (MH-Simple Playback Application Location Descriptor) | Describe details of acquisition source of application that starts up at time of reproduction of recorded content |
| MH-application expiration date descriptor (MH-Application Expiration Descriptor) | Indicate expiration date of application that starts up at time of reproduction of recorded content |
| Related broadcaster descriptor (Related Broadcaster Descriptor) | Indicate association with broadcaster of another network to share NVRAM |
| Multimedia service information descriptor (Multimedia Service Descriptor) | Describe detailed information regarding individual content of multimedia service |
| Descriptor set by provider | |

FIG. 11B

| Data structure of NIT | Bit number | Data notation |
|---|---|---|
| Network_Information_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     network_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     network_descriptors_length | 12 | uimsbf |
|     for(i=0; i<N; i++){ | | |
|         descriptor() | | |
|     } | | |
|     reserved_future_use | 4 | bslbf |
|     transport_stream_loop_length | 12 | uimsbf |
|     for(i=0; i<N; i++){ | | |
|         transport_stream_id | 16 | uimsbf |
|         original_network_id | 16 | uimsbf |
|         reserved_future_use | 4 | bslbf |
|         transport_descriptors_length | 12 | uimsbf |
|         for(j=0; j<M; j++){ | | |
|             descriptor() | | |
|         } | | |
|     } | | |
|     CRC_32 | 32 | rpchof |
| } | | |

FIG. 11C

| Data structure of terrestrial delivery system descriptor | Bit number | Data notation |
|---|---|---|
| terrestrial_delivery_system_descriptor(){ | | |
|     descriptor_tag | 8 | uimsbf |
|     descriptor_length | 8 | uimsbf |
|     area_code | 12 | bslbf |
|     guard_interval | 2 | bslbf |
|     transmission_mode | 2 | bslbf |
|     for(i=0; i<N; i++){ | | |
|         frequency | 16 | uimsbf |
|     } | | |
| } | | |

FIG. 11D

| Data structure of service list descriptor | Bit number | Data notation |
|---|---|---|
| service_list_descriptor(){ | | |
|     descriptor_tag | 8 | uimsbf |
|     descriptor_length | 8 | uimsbf |
|     for(i=0; i<N; i++){ | | |
|         service_id | 16 | uimsbf |
|         service_type | 8 | uimsbf |
|     } | | |
| } | | |

FIG. 11E

| Data structure of TS information descriptor | Bit number | Data notation |
|---|---|---|
| ts_information_descriptor(){ | | |
|     descriptor_tag | 8 | uimsbf |
|     descriptor_length | 8 | uimsbf |
|     remote_control_key_id | 8 | uimsbf |
|     length_of_ts_name | 6 | uimsbf |
|     transmission_type_count | 2 | uimsbf |
|     for(i=0; i<length_of_ts_name; i++){ | | |
|         ts_name_char | 8 | uimsbf |
|     } | | |
|     for(j=0; j<transmission_type_count; j++){ | | |
|         transmission_type_info | 8 | bslbf |
|         num_of_service | 8 | uimsbf |
|         for(k=0; k<num_of_service; k++){ | | |
|             service_id | 16 | uimsbf |
|         } | | |
|     } | | |
|     for(l=0; l<N; l++){ | | |
|         reserved_future_use | 8 | bslbf |
|     } | | |
| } | | |

BROADCAST RECEIVING APPARATUS AND METHOD OF PROCESSING TRANSMISSION WAVES

TECHNICAL FIELD

The present invention relates to a broadcast transmission technique or a broadcast reception technique.

BACKGROUND ART

A digital broadcasting service has been started in each country since the latter half of the 1990s in place of a conventional analog broadcasting service. The digital broadcasting service realized improvement of broadcasting quality using an error correction technique, multi-channel and HD (High Definition) using a compression coding technique, and multimedia of a service using a BML (Broadcast Markup Language) or HTML5 (Hyper Text Markup Language version 5).

In recent years, for the purpose of further improvement of a frequency usage efficiency, higher resolution, and higher functionality, consideration of an advanced digital broadcasting method is caused to proceed in each country.

RELATED ART DOCUMENTS

Patent Documents

Patent document 1: Japanese Patent Application Publication No. 2016-14420

SUMMARY OF THE INVENTION

Problems to be Solved by the Invention

More than ten years have already passed since the service of the existing digital broadcasting was started, and broadcast receiving apparatuses capable of receiving an existing digital broadcasting service are widespread sufficiently. For this reason, it is necessary to consider compatibility with the existing digital broadcasting service when an advanced digital broadcasting service, which is currently considered, is to be started. Namely, it is preferable that UHD (Ultra High Definition) of a video signal is realized while maintaining viewing environment of the existing digital broadcasting service.

There is a system described in Patent document 1 as a technique for realizing UHD broadcasting in the digital broadcasting service. However, the system described in Patent document 1 is one by which the existing digital broadcasting is replaced, and does not take into consideration the maintenance of the viewing environment of the existing digital broadcasting service.

It is an object of the present invention to a technique for transmitting or receiving a higher functional advanced digital broadcasting service more suitably in consideration of compatibility with an existing digital broadcasting service.

Means for Solving the Problem

Techniques described in the following claims are used as means for solving the problem.

As one example, a broadcast receiving apparatus may be configured so as to include: a tuner configured to receive a transmission wave in which identification information is stored in a carrier, the carrier being modulated differently from a data carrier, a frequency band when the transmission wave is transmitted in an air being able to be identified by the identification information; and a controller. In this case, the controller may be configured to identify a frequency band when the transmission wave is transmitted in the air by using the identification information contained in transmission wave received by the tuner.

Effects of the Invention

According to the present invention, it is possible to provide a technique for transmitting or receiving an advanced digital broadcasting service more suitably.

BRIEF DESCRIPTIONS OF THE DRAWINGS

FIG. 4A is a diagram for explaining a segment configuration for digital broadcasting according to one embodiment of the present invention;

FIG. 4B is a diagram for explaining layer allocation in layer transmission for the digital broadcasting according to one embodiment of the present invention;

FIG. 4D is a diagram for explaining a basic configuration of a transmission path coder for the digital broadcasting according to one embodiment of the present invention;

FIG. 4E is a diagram for explaining an OFDM type segment parameter for the digital broadcasting according to one embodiment of the present invention;

FIG. 4F is a diagram for explaining a transmission signal parameter for the digital broadcasting according to one embodiment of the present invention;

FIG. 5A is a diagram for explaining bit allocation of a TMCC carrier for the digital broadcasting according to one embodiment of the present invention;

FIG. 5B is a diagram for explaining bit allocation of TMCC information for the digital broadcasting according to one embodiment of the present invention;

FIG. 5C is a diagram for explaining transmission parameter information of the TMCC information for the digital broadcasting according to one embodiment of the present invention;

FIG. 5D is a diagram for explaining system identification of the TMCC information for the digital broadcasting according to one embodiment of the present invention;

FIG. 5E is a diagram for explaining a carrier modulation mapping method of the TMCC information for the digital broadcasting according to one embodiment of the present invention;

FIG. 5F is a diagram for explaining frequency converting process identification of the TMCC information for the digital broadcasting according to one embodiment of the present invention;

FIG. 5G is a diagram for explaining physical channel number identification of the TMCC information for the digital broadcasting according to one embodiment of the present invention;

FIG. 5H is a diagram for explaining one example of main signal identification of the TMCC information for the digital broadcasting according to one embodiment of the present invention;

FIG. 5I is a diagram for explaining 4K signal transmission layer identification of the TMCC information for the digital broadcasting according to one embodiment of the present invention;

FIG. 5J is a diagram for explaining additional layer transmission identification of the TMCC information for the digital broadcasting according to one embodiment of the present invention;

FIG. 6A is a diagram for explaining bit allocation of an AC signal for the digital broadcasting according to one embodiment of the present invention;

FIG. 6B is a diagram for explaining configuration identification of the AC signal for the digital broadcasting according to one embodiment of the present invention;

FIG. 6C is a diagram for explaining seismic motion warning information of the AC signal for the digital broadcasting according to one embodiment of the present invention;

FIG. 6D is a diagram for explaining signal identification of the seismic motion warning information of the AC signal for the digital broadcasting according to one embodiment of the present invention;

FIG. 6E is a diagram for explaining seismic motion warning detailed information of the seismic motion warning information of the AC signal for the digital broadcasting according to one embodiment of the present invention;

FIG. 6F is a diagram for explaining the seismic motion warning detailed information of the seismic motion warning information of the AC signal for the digital broadcasting according to one embodiment of the present invention;

FIG. 6G is a diagram for explaining additional information regarding a transmission control of a modulation wave of the AC signal for the digital broadcasting according to one embodiment of the present invention;

FIG. 6H is a diagram for explaining transmission parameter additional information of the AC signal for the digital broadcasting according to one embodiment of the present invention;

FIG. 6I is a diagram for explaining an error correcting method of the AC signal for the digital broadcasting according to one embodiment of the present invention;

FIG. 6J is a diagram for explaining an NUC form of the AC signal for the digital broadcasting according to one embodiment of the present invention;

FIG. 7E is a diagram for explaining a configuration of a pass-through transmission method according to one embodiment of the present invention;

FIG. 7F is a diagram for explaining a pass-through transmission band according to one embodiment of the present invention;

FIG. 7G is a diagram for explaining a configuration of the pass-through transmission method according to one embodiment of the present invention;

FIG. 7H is a diagram for explaining the pass-through transmission band according to one embodiment of the present invention;

FIG. 7I is a diagram for explaining the pass-through transmission band according to one embodiment of the present invention;

FIG. 9B is a diagram for explaining names and functions of tables used in the MPEG-2 TS;

FIG. 9C is a diagram for explaining names and functions of the tables used in the MPEG-2 TS;

FIG. 9D is a diagram for explaining names and functions of descriptors used in the MPEG-2 TS;

FIG. 9E is a diagram for explaining names and functions of descriptors used in the MPEG-2 TS;

FIG. 9F is a diagram for explaining names and functions of descriptors used in the MPEG-2 TS;

FIG. 9G is a diagram for explaining names and functions of descriptors used in the MPEG-2 TS;

FIG. 9H is a diagram for explaining names and functions of descriptors used in the MPEG-2 TS;

FIG. 9I is a diagram for explaining names and functions of descriptors used in the MPEG-2 TS;

FIG. 10C is a diagram for explaining names and functions of tables used in TLV-SI of the MMT;

FIG. 10D is a diagram for explaining names and functions of descriptors used in the TLV-SI of the MMT;

FIG. 10E is a diagram for explaining names and functions of messages used in MMT-SI of the MMT;

FIG. 10F is a diagram for explaining names and functions of tables used in the MMT-SI of the MMT;

FIG. 10G is a diagram for explaining names and functions of descriptors used in the MMT-SI of the MMT;

FIG. 10H is a diagram for explaining names and functions of descriptors used in the MMT-SI of the MMT;

FIG. 10I is a diagram for explaining names and functions of descriptors used in the MMT-SI of the MMT;

FIG. 11B is a diagram for explaining a data structure of a network information table;

FIG. 11C is a diagram for explaining a data structure of a terrestrial delivery system descriptor;

FIG. 11D is a diagram for explaining a data structure of a service list descriptor;

FIG. 11E is a diagram for explaining a data structure of a TS information descriptor;

DETAILED DESCRIPTION OF PREFERRED EMBODIMENTS

Hereinafter, an example of an embodiment of the present invention will be described with reference to the drawings.

First Embodiment

[System Configuration]

Figure 1:
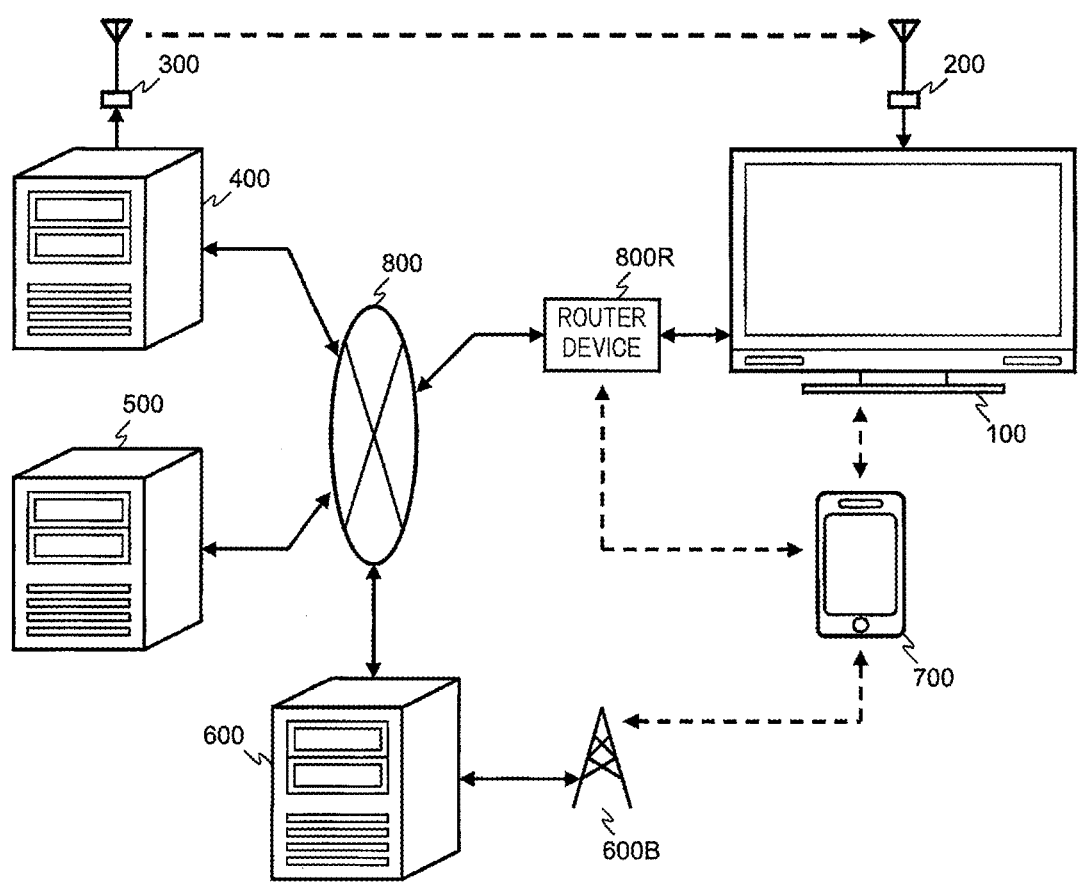
FIG. 1 is a system configuration diagram of a broadcasting system according to one embodiment of the present invention.

FIG. 1 is a system configuration diagram illustrating one example of a configuration of a broadcasting system.

The broadcasting system is configured by, for example, a broadcast receiving apparatus 100 and an antenna 200, a radio tower 300 and a broadcast station server 400 of a broadcast station, a service provider server 500, a mobile phone communication server 600 and a base station 600B for a mobile phone communication network, a portable information terminal 700, and a broadband network 800 such as the Internet and a router device 800R. Further, various kinds of server apparatuses and communication equipment may further be connected to the Internet 800.

The broadcast receiving apparatus 100 is a television receiver provided with a receiving function for an advanced digital broadcasting service. The broadcast receiving apparatus 100 may further include a receiving function for an existing digital broadcasting service. Moreover, the broadcast receiving apparatus 100 is compatible with a broadcasting/communication cooperation system that combines acquisition of additional content via a broadband network, arithmetic processing by a server apparatus, a presenting process by cooperation with portable terminal equipment, and the like with the digital broadcasting service by linking functions using the broadband network to the digital broadcasting service (the existing digital broadcasting service or the advanced digital broadcasting service). The broadcast receiving apparatus 100 receives a digital broadcasting wave sent out from the radio tower 300 via the antenna 200. The digital broadcasting wave may directly be transmitted from the radio tower 300 to the antenna 200, or may be transmitted via a broadcast satellite or a communication satellite (whose illustration is omitted). A broadcasting signal retransmitted by a cable television station may be received via a cable line or the like. Further, the broadcast receiving apparatus 100 can be connected to the Internet 800 via the router device 800R, and can transmit and receive data by communication with each server apparatus on the Internet 800.

The router device 800R is connected to the Internet 800 with wireless communication or wired communication; is connected to the broadcast receiving apparatus 100 with wired communication; and is connected to the portable information terminal 700 with wireless communication. This makes it possible to mutually execute transmission and reception of data among each server apparatus on the Internet 800, the broadcast receiving apparatus 100, and the portable information terminal 700 via the router device 800R. The router device 800R, the broadcast receiving apparatus 100, and the portable information terminal 700 constitute a LAN (Local Area Network). Note that communication between the broadcast receiving apparatus 100 and the portable information terminal 700 may be executed directly by a method such as BlueTooth (registered trademark) or NFC (Near Field Communication) without the router device 800R.

The radio tower 300 is a broadcasting facility of the broadcast station, and sends out the digital broadcasting wave including various kinds of control information and content data of a broadcasting program (such as moving image content or audio content) according to the digital broadcasting service. Further, the broadcast station includes the broadcast station server 400. The broadcast station server 400 stores metadata such as content data of broadcasting programs and program titles of the respective broadcasting programs, program IDs, program summaries, casts, broadcasting dates, or the like. The broadcast station server 400 provides the content data or the metadata with a service provider on the basis of a contract. Provision of the content data and the metadata to the service provider is executed through an API (Application Programming Interface) included in the broadcast station server 400.

The service provider server 500 is a server apparatus that the service provider prepares for providing a service by the broadcasting/communication cooperation system. The service provider server 500 executes storage, management, distribution, and the like of the content data and the metadata provided from the broadcast station server 400 and content data and applications (such as at least one of operating program or various kinds of data) created for the broadcasting/communication cooperation system. Further, the service provider server 500 also has a function to execute search of providable applications or provision of a list in response to an inquiry from the television receiver. Note that different server apparatuses may respectively execute storage, management, and distribution of the content data and the metadata, and storage, management, and distribution of the applications. The broadcast station may be the same as the service provider, or may be a different provider. A plurality of service provider servers 500 may respectively be prepared for different services. Further, the broadcast station server 400 may be combined with the functions of the service provider server 500.

The mobile phone communication server 600 is connected to the Internet 800, and is also connected to the portable information terminal 700 via the base station 600B. The mobile phone communication server 600 manages telephone communication (telephone call), and transmission and reception of data via the mobile phone communication network of the portable information terminal 700, and allows transmission and reception of data by communication between the portable information terminal 700 and each server apparatus on the Internet 800. Note that the communication between the portable information terminal 700 and the broadcast receiving apparatus 100 may be executed via the base station 600B, the mobile phone communication server 600, the Internet 800, and the router device 800R.

[Hardware Configuration of Broadcast Receiving Apparatus]

Figure 2A:
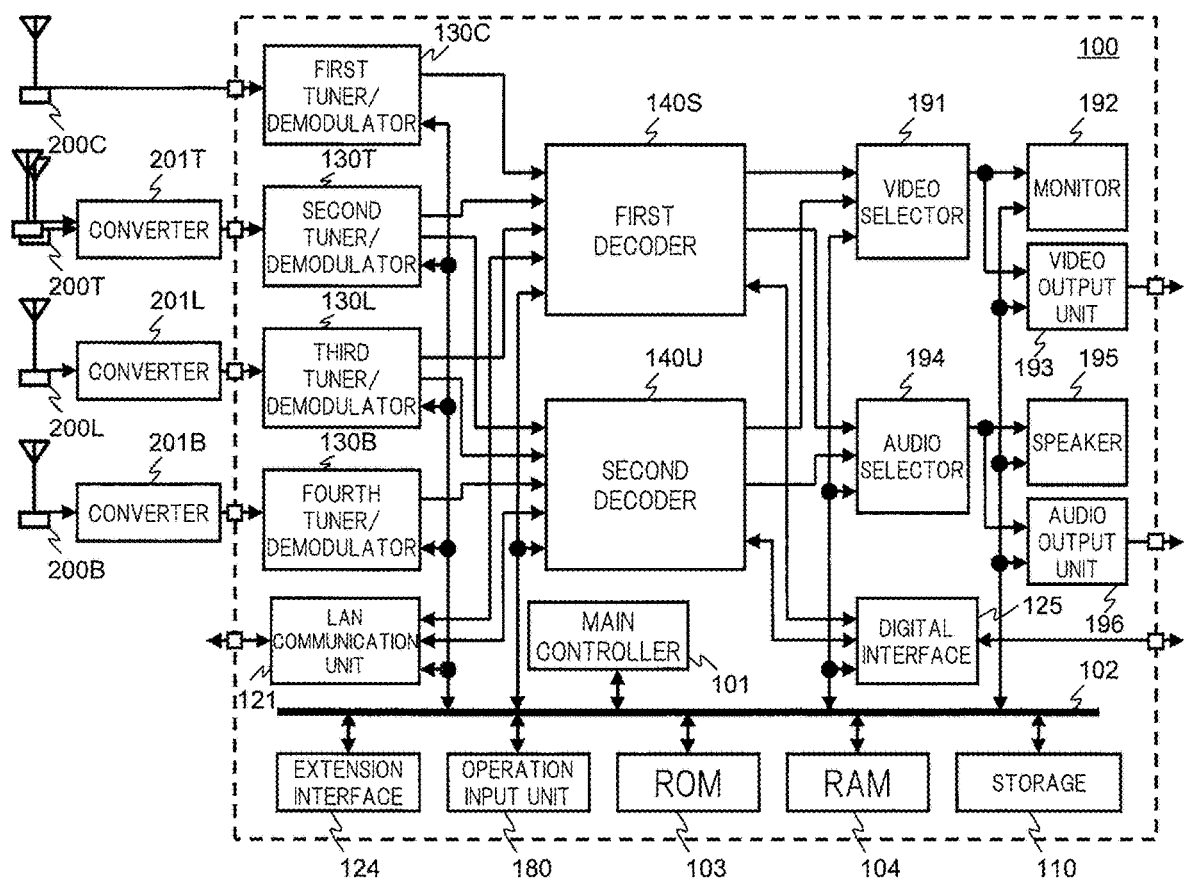
FIG. 2A is a block diagram of a broadcast receiving apparatus according to one embodiment of the present invention.

FIG. 2A is a block diagram illustrating one example of an internal configuration of the broadcast receiving apparatus 100.

The broadcast receiving apparatus 100 is configured by a main controller 101, a system bus 102, a ROM 103, a RAM 104, a storage (accumulator) 110, a LAN communication unit 121, an extension interface 124, a digital interface 125, a first tuner/demodulator 130C, a second tuner/demodulator 130T, a third tuner/demodulator 130L, a fourth tuner/demodulator 130B, a first decoder 140S, a second decoder 140U, an operation input unit 180, a video selector 191, a monitor 192, a video output unit 193, an audio selector 194, a speaker 195, and an audio output unit 196.

The main controller 101 is a microprocessor unit that controls the whole broadcast receiving apparatus 100 in accordance with a predetermined operating program. The system bus 102 is a communication path for executing transmission and reception of various kinds of data or commands between the main controller 101 and each of operating blocks in the broadcast receiving apparatus 100.

The ROM (Read Only Memory) 103 is a non-volatile memory in which a basic operating program such as an operating system and other operating programs are stored, for example, and a rewritable ROM such as an EEPROM (Electrically Erasable Programmable ROM) or a flash ROM is used for the ROM 103. Further, operating set values and the like necessary for operations of the broadcast receiving apparatus 100 are stored in the ROM 103. The RAM (Random Access Memory) 104 becomes a work area when the basic operating program or the other operating program is executed. The ROM 103 and the RAM 104 may be configured integrally with the main controller 101. Further, the ROM 103 is not configured independently as illustrated in FIG. 2A, but a partial memory region in the storage (accumulator) 110 may be used instead.

An operating program and operating set values of the broadcast receiving apparatus 100, and personal information of a user of the broadcast receiving apparatus 100 are stored in the storage (accumulator) 110. Further, an operating program downloaded via the Internet 800 and various kinds of data created by the operating program can be stored in the storage (accumulator) 110. Further, content such as moving images, still images, or audios, which are obtained from a broadcast wave or downloaded via the Internet 800 can be stored in the storage (accumulator) 110. All or a part of functions of the ROM 103 may be substituted by a partial area of the storage (accumulator) 110. Further, the storage (accumulator) 110 is required to hold stored information even in a state where power source is not supplied to the broadcast receiving apparatus 100 from the outside. Therefore, for example, a device including a semiconductor element memory such as a flash ROM or an SSD (Solid State Drive) or a magnetic disk drive such as an HDD (Hard Disc Drive) is used as the storage (accumulator) 110.

Note that each of the operating programs stored in the ROM 103 or the storage (accumulator) 110 can be added, updated, and functionally extended by a downloading process from each server apparatus on the Internet 800 or the broadcast wave.

The LAN communication unit 121 is connected to the Internet 800 via the router device 800R, and executes transmission and reception of data with each of the server apparatuses or the other communication equipment on the Internet 800. Further, the LAN communication unit 121 executes acquisition of content data (or a part thereof) of a program, which are transmitted via a communication line. The LAN communication unit 121 may be connected to the router device 800R through wired communication or wireless communication such as Wi-Fi (registered trademark). The LAN communication unit 121 includes a coding circuit and a decoding circuit. Further, the broadcast receiving apparatus 100 may further be provided with the other communication unit such as a BlueTooth (registered trademark) communication unit, an NFC communication unit, or an infrared communication unit.

Each of the first tuner/demodulator 130C, the second tuner/demodulator 130T, the third tuner/demodulator 130L, and the fourth tuner/demodulator 130B receives the broadcast wave of the digital broadcasting service, and executes a channel selecting process (channel selection) by tuning a channel for a predetermined service on the basis of a control of the main controller 101. Moreover, each of the first tuner/demodulator 130C, the second tuner/demodulator 130T, the third tuner/demodulator 130L, and the fourth tuner/demodulator 130B executes a demodulating process of a modulation wave from a received signal, a waveform shaping process, a reconfiguring process of a frame structure and a layer structure, energy dispersal removal, and error correction decoding process to reproduce a packet stream. Further, each of the first tuner/demodulator 130C, the second tuner/demodulator 130T, the third tuner/demodulator 130L, and the fourth tuner/demodulator 130B executes an extracting and decoding process for a transmission TMCC (Transmission Multiplexing Configuration Control) signal from the received signal.

Note that a digital broadcasting wave of an existing terrestrial digital broadcasting service received by an antenna 200C, which is an antenna for receiving existing terrestrial digital broadcasting, can be inputted into the first tuner/demodulator 130C. Further, one broadcasting signal of a polarized wave of a horizontal (H) polarization signal and a vertical (V) polarization signal of dual-polarized terrestrial digital broadcasting (will be described later) can also be inputted into the first tuner/demodulator 130C to demodulate a segment of a layer adopting the same modulation method as that of the existing terrestrial digital broadcasting service. Further, a broadcasting signal of layered division multiplexing terrestrial digital broadcasting (will be described later) can also be inputted into the first tuner/demodulator 130C to demodulate the layer adopting the same modulation method as that of the existing terrestrial digital broadcasting service. A digital broadcasting wave of an advanced terrestrial digital broadcasting service received by an antenna 200T, which is an antenna for receiving the dual-polarized terrestrial digital broadcasting, is inputted into the second tuner/demodulator 130T via a converter 201T. The digital broadcasting wave of the advanced terrestrial digital broadcasting service received by an antenna 200L, which is an antenna for receiving the layered division multiplexing terrestrial digital broadcasting, is inputted into the third tuner/demodulator 130L via a converter 201L. A digital broadcasting wave of an advanced BS (Broadcasting Satellite) digital broadcasting service or an advanced CS (Communication Satellite) digital broadcasting service received by an antenna 200B, which is an antenna for receiving both BS/CS, is inputted into the fourth tuner/demodulator 130B via a converter 201B.

Note that the expression "tuner/demodulator" means a component provided with a tuner function and a demodulator function.

Further, the antenna 200C, the antenna 200T, the antenna 200L, the antenna 200B, the converter 201T, the converter 201L, the converter 201B do not constitute a part of the broadcast receiving apparatus 100, and belong to a facility side such as a building in which the broadcast receiving apparatus 100 is installed.

Further, the existing terrestrial digital broadcasting described above is a broadcasting signal of a terrestrial digital broadcasting service for transmitting video whose maximum resolution is 1920 horizontal pixels×1080 vertical pixels.

Further, details of the dual-polarized terrestrial digital broadcasting (advanced terrestrial digital broadcasting adopting a dual-polarized transmission method) will be described later. However, it is a broadcasting signal of the terrestrial digital broadcasting service in which video whose maximum resolution is the number of pixels that exceeds 1920 horizontal pixels×1080 vertical pixels can be transmitted. The dual-polarized terrestrial digital broadcasting is terrestrial digital broadcasting using a plurality of polarized waves including a horizontal (H) polarized wave and a vertical (V) polarized wave. The terrestrial digital broadcasting service in which the video whose maximum resolution is the number of pixels that exceeds 1920 horizontal pixels×1080 vertical pixels can be transmitted is transmitted by a part of divided segments in both the polarized waves of the plurality of polarized waves.

Note that in the explanation of each embodiment of the present invention, in a case where the expression "a plurality of polarized waves" is used for the dual-polarized terrestrial digital broadcasting, it means the two polarized waves of the horizontal (H) polarized wave and the vertical (V) polarized wave unless otherwise stated. Further, even in case where the expression "polarized wave" is simply used, it means the "polarization signal". Further, in one polarized wave or both the polarized waves of the plurality of polarized waves, the existing terrestrial digital broadcasting described above in which the video whose maximum resolution is 1920 horizontal pixels×1080 vertical pixels is transmitted by transmitted apart of divided segments can be transmitted by the same modulation method. Namely, in dual-polarized terrestrial digital broadcasting, by different segments of the plurality of polarized waves according to each embodiment of the present invention, the existing terrestrial digital broadcasting service in which the video whose maximum resolution is 1920 horizontal pixels×1080 vertical pixels is transmitted and the terrestrial digital broadcasting service in which the video whose maximum resolution is the number of pixels that exceeds 1920 horizontal pixels×1080 vertical pixels can be transmitted can be transmitted at the same time.

Further, although details of the layered division multiplexing terrestrial digital broadcasting (that is, the advanced terrestrial digital broadcasting adopting a layered division multiplexing transmission method) will be described later, it is a broadcasting signal of the terrestrial digital broadcasting service in which the video whose maximum resolution is the number of pixels that exceeds 1920 horizontal pixels×1080 vertical pixels can be transmitted. The layered division multiplexing terrestrial digital broadcasting multiplexes a plurality of digital broadcasting signals whose signal levels are different from each other. The layered division multiplexing terrestrial digital broadcasting according to each embodiment of the present invention can transmit, as the plurality of digital broadcasting signals whose signal levels are different from each other, a broadcasting signal of the existing terrestrial digital broadcasting service in which video whose maximum resolution is 1920 horizontal pixels×1080 vertical pixels is transmitted and a broadcasting signal of the terrestrial digital broadcasting service in which the video whose maximum resolution is the number of pixels that exceeds 1920 horizontal pixels×1080 vertical pixels can be transmitted by multiplexing these broadcasting signals as layers with a frequency band of the same physical channel. Namely, in the layered division multiplexing terrestrial digital broadcasting according to each embodiment of the present invention, by a plurality of layers whose signal levels are different from each other, it is possible to transmit the existing terrestrial digital broadcasting service in which the video whose maximum resolution is 1920 horizontal pixels×1080 vertical pixels is transmitted and the terrestrial digital broadcasting in which video whose maximum resolution is the number of pixels that exceeds 1920 horizontal pixels×1080 vertical pixels can be transmitted at the same time.

Note that the broadcast receiving apparatus according to each embodiment of the present invention may be configured so as to be capable of suitably receiving advanced digital broadcasting, and it is not essential to include all of the first tuner/demodulator 130C, the second tuner/demodulator 130T, the third tuner/demodulator 130L, and the fourth tuner/demodulator 130B. For example, the broadcast receiving apparatus may include at least one of the second tuner/demodulator 130T or the third tuner/demodulator 130L. Further, in order to realize a more advanced function, the broadcast receiving apparatus may be configured so as to one or plural of the four tuner/demodulators described above in addition to one of the second tuner/demodulator 130T or the third tuner/demodulator 130L.

Further, the antenna 200C, the antenna 200T, and the antenna 200L may be used together appropriately. Further, among the first tuner/demodulator 130C, the second tuner/demodulator 130T, and the third tuner/demodulator 130L, a plurality of tuners/demodulators may be used together (or integrated) appropriately.

A packet stream outputted from the first tuner/demodulator 130C, the second tuner/demodulator 130T, the third tuner/demodulator 130L, and the fourth tuner/demodulator 130B or a packet stream obtained from each server apparatus on the Internet 800 via the LAN communication unit 121 is inputted into each of the first decoder 140S and the second decoder 140U. The packet stream inputted by each of the first decoder 140S and the second decoder 140U may be a packet stream with any form such as an MPEG (Moving Picture Experts Group)-2 TS (Transport Stream), an MPEG-2 PS (Program Stream), a TLV (Type Length Value), or an MMT (MPEG Media Transport).

Each of the first decoder 140S and the second decoder 140U executes a conditional access (Conditional Access: CA) process, a demultiplexing process of demultiplexing and extracting various kinds of information data, such as video data or audio data, from the packet stream on the basis of various kinds of control information contained in the packet stream, a decoding process for the video data and the audio data, a process of obtaining program information and generating an EPG (Electronic Program Guide: electronic program guide), a reproducing process of a data broadcasting screen or multimedia data, and the like. Further, each of the first decoder 140S and the second decoder 140U also executes a process of superimposing the generated EPG or the reproduced multimedia data onto the decoded video data or the decoded audio data.

The video data outputted from the first decoder 140S and the video data outputted from the second decoder 140U are inputted into the video selector 191, and the video selector 191 appropriately executes at least one of a selecting process or a superimposing process on the basis of a control of the main controller 101. Further, the video selector 191 appropriately executes a scaling process and a superimposing process of OSD (On Screen Display) data. The monitor 192 is a display device such as a liquid crystal panel for example. The monitor 192 displays video data that are subjected to the selecting/superimposing process in the video selector 191 to provide the user of the broadcast receiving apparatus 100 therewith. The video output unit 193 is a video output interface for outputting the video data that are subjected to the selecting/superimposing process in the video selector 191 to the outside.

The audio data outputted from the first decoder 140S and the audio data outputted from the second decoder 140U are inputted into the audio selector 194, and the audio selector 194 appropriately executes at least one of a selecting process or a mixing process on the basis of a control of the main controller 101. The speaker 195 outputs sound based on the audio data that are subjected to the selecting/mixing process in the audio selector 194 to provide the user of the broadcast receiving apparatus 100 therewith. The audio output unit 196 is an audio output interface for outputting the audio data that are subjected to the selecting/mixing process in the audio selector 194 to the outside.

The digital interface 125 is an interface for outputting or inputting the packet stream including at least one of coded digital video data or coded digital audio data. The digital interface 125 can output the packet stream that is inputted from any of the first tuner/demodulator 130C, the second tuner/demodulator 130T, the third tuner/demodulator 130L, and the fourth tuner/demodulator 130B by the first decoder 140S or the second decoder 140U as it is. Further, the digital interface 125 may input the packet stream inputted from the outside via the digital interface 125 into the first decoder 140S or the second decoder 140U, or may control the storage (accumulator) 110 to store the packet stream. Alternatively, the digital interface 125 may output the video data or the audio data, which are demultiplexed and extracted in the first decoder 140S or the second decoder 140U. Further, the digital interface 125 may input the video data or the audio data inputted from the outside via the digital interface 125 into the first decoder 140S or the second decoder 140U, or may control the storage (accumulator) 110 to store the video data or the audio data.

The extension interface 124 is a group of interfaces for extending the function of the broadcast receiving apparatus 100, and is configured by an analog video/audio interface, a USB (Universal Serial Bus) interface, a memory interface, or the like. The analog video/audio interface executes an input of an analog video signal/audio signal from external video/audio output equipment, an output of an analog video signal/audio signal to the external video/audio input equipment. The USB interface executes transmission and reception of data to and from a PC by being connected to the PC. The USB interface may execute recording of broadcasting program or the other content data by being connected to an HDD. Further, the USB interface may execute connection to a keyboard or the other USB equipment. The memory interface executes transmission and reception of data by being connected to a memory card or the other memory medium.

The operation input unit 180 is an instruction input unit configured to execute an input of an operation instruction to the broadcast receiving apparatus 100, and is configured by a remote controller receiver for receiving a command transmitted from a remote controller (remote controller) (whose illustration is omitted) and an operation key configured by arranging button switches. The operation input unit 180 may be configured by any one of the remote controller receiver and the operation key. Further, the operation input unit 180 can be substituted by a touch panel or the like disposed so as to be overlapped on the monitor 192. The operation input unit 180 may be substituted by a keyboard or the like connected to the extension interface 124. The remote controller can be substituted by the portable information terminal 700 provided with a remote controller command transmitting function.

Note that in a case where the broadcast receiving apparatus 100 is the television receiver or the like, the video output unit 193 and the audio output unit 196 are not essential configuration. Further, the broadcast receiving apparatus 100 may be an optical disc drive recorder such as a DVD (Digital Versatile Disc) recorder, a magnetic disk drive recorder such as an HDD recorder, an STB (Set Top Box), or the like. The broadcast receiving apparatus 100 may be a PC (Personal Computer) provided with a receiving function of the digital broadcasting service, a tablet terminal, or the like. In a case where the broadcast receiving apparatus 100 is the DVD recorder, the HDD recorder, or the STB, the monitor 192 and the speaker 195 are not essential configuration. By connecting the video output unit 193 and the audio output unit 196 or the digital interface 125 to an external monitor and an external speaker, the broadcast receiving apparatus 100 can execute the similar operations to those of a television receiver or the like.

Figure 2B:
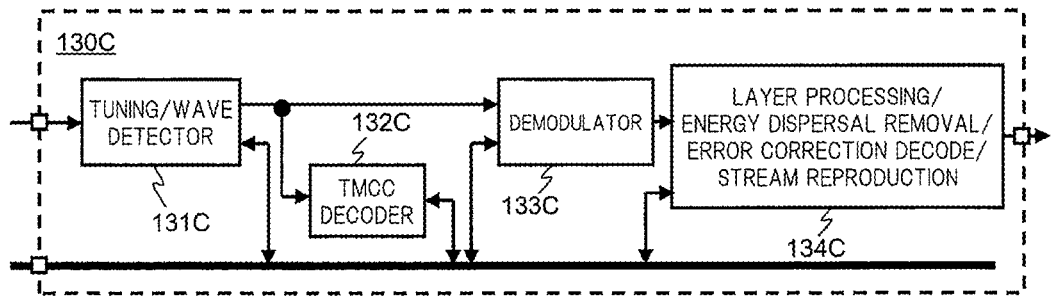
FIG. 2B is a detailed block diagram of a first tuner/demodulator in the broadcast receiving apparatus according to one embodiment of the present invention.

FIG. 2B is a block diagram illustrating one example of a detailed configuration of the first tuner/demodulator 130C.

An existing digital broadcasting wave received by the antenna 200C is inputted into the tuning/wave detector 131C, and the tuning/wave detector 131C executes channel selection on the basis of a channel selection control signal. A TMCC decoder 132C extracts a TMCC signal from an output signal of the tuning/wave detector 131C, and obtains various kinds of TMCC information. The obtained TMCC information is used for controlling respective latter processes. Details of the TMCC signal and the TMCC information will be described later.

A modulation wave modulated by using a method such as QPSK (Quadrature Phase Shift Keying), DQPSK (Differential QPSK), 16 QAM (Quadrature Amplitude Modulation), or 64 QAM is inputted into the demodulator 133C on the basis of the TMCC information and the like, and the demodulator 133C executes a demodulating process including frequency deinterleaving, time deinterleaving, and a carrier demapping process. The demodulator 133C may further be compatible with a modulation method different from the respective modulation methods described above.

A stream reproducer 134C executes a layer dividing process, an inner code error correcting process such as viterbi decoding, energy dispersal removal, a stream reproducing process, and an outer code error correcting process such as RS (Reed Solomon) decoding. Note that as the error correcting process, a method different from each method described above may be used. Further, a packet stream reproduced by and outputted from the stream reproducer 134C may be an MPEG-2 TS or the like, for example. The packet stream may be the other form of packet stream.

Figure 2C:
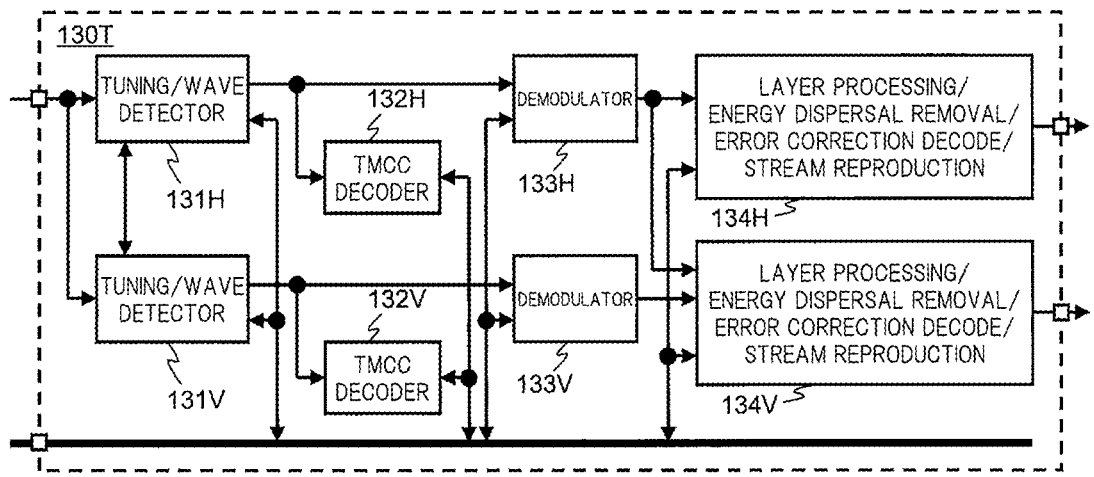
FIG. 2C is a detailed block diagram of a second tuner/demodulator in the broadcast receiving apparatus according to one embodiment of the present invention.

FIG. 2C is a block diagram illustrating one example of a detailed configuration of the second tuner/demodulator 130T.

The horizontal (H) polarization signal of the digital broadcasting wave received by the antenna 200T is inputted into a tuning/wave detector 131H, and the tuning/wave detector 131H executes channel selection on the basis of the channel selection control signal. The vertical (V) polarization signal of the digital broadcasting wave received by the antenna 200T is inputted into a tuning/wave detector 131V, and the tuning/wave detector 131V executes channel selection on the basis of the channel selection control signal. Note that an operation of the channel selecting process by the tuning/wave detector 131H and an operation of the channel selecting process by the tuning/wave detector 131V may be controlled in conjunction with each other, or may be controlled independently from each other. Namely, by assuming that the tuning/wave detector 131H and the tuning/wave detector 131V are one tuning/wave detector, it is possible to control the one tuning/wave detector to select one channel of the digital broadcasting service transmitted by using both horizontal/vertical polarized waves. By assuming that the tuning/wave detector 131H and the tuning/wave detector 131V are two independent tuning/wave detectors, it is possible to control the two independent tuning/wave detectors to respectively select two different channels of the digital broadcasting service transmitted by only the horizontal polarized wave (or only the vertical polarized wave).

Note that the horizontal (H) polarization signal and the vertical (V) polarization signal received by the second tuner/demodulator 130T of the broadcast receiving apparatus according to each embodiment of the present invention may be a polarization signal by a broadcast wave whose polarization direction is different by approximately 90 degrees, and a configuration regarding their reception between the horizontal (H) polarization signal and the vertical (V) polarization signal, which will be described below, may be reversed.

A TMCC decoder 132H extracts the TMCC signal from an output signal of the tuning/wave detector 131H to obtain various kinds of TMCC information. A TMCC decoder 132V extracts the TMCC signal from an output signal of the tuning/wave detector 131V to obtain various kinds of TMCC information. Any one of the TMCC decoder 132H and the TMCC decoder 132V may be provided. The obtained TMCC information is used for controlling respective latter processes.

A modulation wave modulated by using a method such as BPSK (Binary Phase Shift Keying), DBPSK (Differential BPSK), QPSK, DQPSK, 8PSK (Phase Shift Keying), 16APSK (Amplitude and Phase Shift Keying), 32 APSK, 16 QAM, 64 QAM, 256 QAM, or 1024 QAM is inputted into each of a demodulator 133H and a demodulator 133V on the basis of the TMCC information and the like, and each of the demodulator 133H and the demodulator 133V executes a demodulating process including frequency deinterleaving, time deinterleaving, and carrier demapping process. The demodulator 133H and the demodulator 133V may further be compatible with a modulation method different from the respective modulation methods described above.

Each of a stream reproducer 134H and a stream reproducer 134V executes a layer dividing process, an inner code error correcting process such as viterbi decoding or LDPC (Low Density Parity Check) decoding, energy dispersal removal, a stream reproducing process, and an outer code error correcting process such as RS decoding or BCH decoding. Note that as the error correcting process, one different from each of the methods described above may be used. Further, a packet stream reproduced by and outputted from the stream reproducer 134H is an MPEG-2 TS or the like, for example. A packet stream reproduced by and outputted from the stream reproducer 134V is a TLV including the MPEG-2 TS and an MMT packet stream, for example. Each of the packet streams may be the other form of packet stream.

Figure 2D:
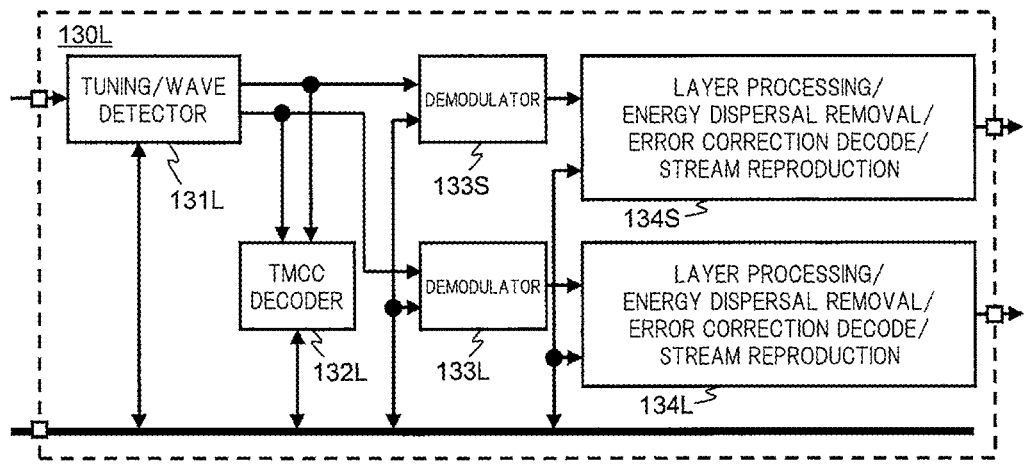
FIG. 2D is a detailed block diagram of a third tuner/demodulator in the broadcast receiving apparatus according to one embodiment of the present invention.

FIG. 2D is a block diagram illustrating one example of detailed configuration of the third tuner/demodulator 130L.

A digital broadcasting wave subjected to a layered division multiplexing (Layered Division Multiplexing: LDM) process is inputted into a tuning/wave detector 131L from the antenna 200L, and the tuning/wave detector 131L executes channel selection on the basis of the channel selection control signal. The digital broadcasting wave subjected to the layered division multiplexing process may be used for transmission of a digital broadcasting service (or a different channel of the same broadcasting service) in which a modulation wave of an upper layer (Upper Layer: UL) is different from a modulation wave of a lower layer (Lower Layer: LL). Further, the modulation wave of the upper layer and the modulation wave of the lower layer are respectively outputted to a demodulator 133S and a demodulator 133L.

The modulation wave of the upper layer and the modulation wave of the lower layer outputted from the tuning/wave detector 131L is inputted into a TMCC decoder 132L, and the TMCC decoder 132L extracts the TMCC signal to obtain various kinds of TMCC information. A signal inputted into the TMCC decoder 132L may be any one of the modulation wave of the upper layer and the modulation wave of the lower layer.

The demodulator 133S and the demodulator 133L respectively execute the similar operations to those of the demodulator 133H and the demodulator 133V. For this reason, detailed explanation thereof is omitted. Further, a stream reproducer 134S and a stream reproducer 134L respectively execute the similar operations to those of the stream reproducer 134H and the stream reproducer 134V. For this reason, detailed explanation thereof is omitted.

Figure 2E:
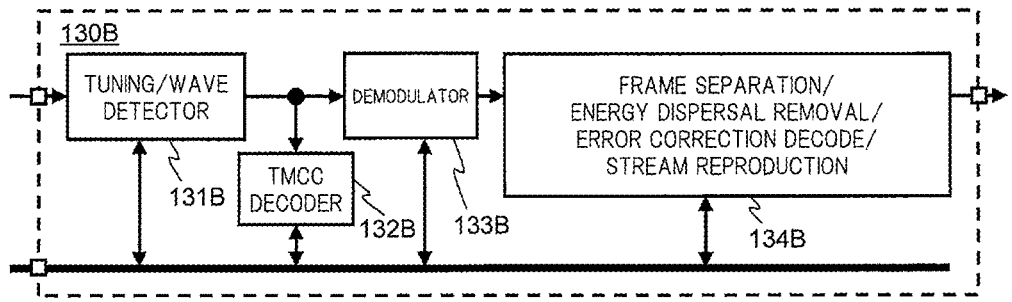
FIG. 2E is a detailed block diagram of a fourth tuner/demodulator in the broadcast receiving apparatus according to one embodiment of the present invention.

FIG. 2E is a block diagram illustrating one example of a detailed configuration of the fourth tuner/demodulator 130B.

A digital broadcasting wave of an advanced BS digital broadcasting service or an advanced CS digital broadcasting service received by the antenna 200B is inputted into a tuning/wave detector 131B, and the tuning/wave detector 131B executes channel selection on the basis of the channel selection control signal. The other operations are similar to those of the tuning/wave detector 131H and the tuning/wave detector 131V. For this reason, detailed explanation thereof is omitted. Further, a TMCC decoder 132B, a demodulator 133B, and a stream reproducer 134B also execute the similar operations of the TMCC decoder 132H or the TMCC decoder 132V, the demodulator 133H or the demodulator 133V, and the stream reproducer 134V, respectively. For this reason, detailed explanation thereof is omitted.

Figure 2F:
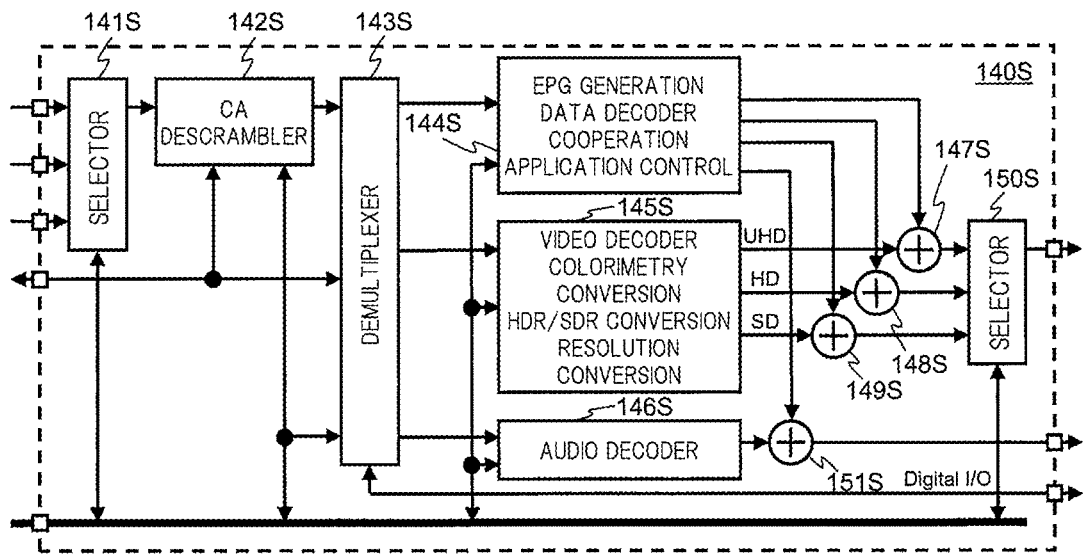
FIG. 2F is a detailed block diagram of a first decoder in the broadcast receiving apparatus according to one embodiment of the present invention.

FIG. 2F is a block diagram illustrating one example of a detailed configuration of the first decoder 140S.

A selector 141S selects, on the basis of a control of the main controller 101, one from the packet stream inputted from the first tuner/demodulator 130C, the packet stream inputted from the second tuner/demodulator 130T, and the packet stream inputted from the third tuner/demodulator 130L, and outputs the selected one. The packet stream inputted from each of the first tuner/demodulator 130C, the second tuner/demodulator 130T, and the third tuner/demodulator 130L is the MPEG-2 TS or the like, for example. A CA descrambler 142S executes a releasing process of encoding algorithm with a predetermined scramble method on the basis of various kinds of control information regarding conditional access superimposed onto the packet stream.

A demultiplexer 143S is a stream decoder, and demultiplexes and extracts video data, audio data, caption data, subtitle data, or program information data on the basis of various kinds of control information contained in the inputted packet stream. The demultiplexed and extracted video data are distributed to a video decoder 145S; the demultiplexed and extracted audio data are distributed to an audio decoder 146S; the demultiplexed and extracted caption data, subtitle data, and program information data are distributed to a data decoder 144S. The packet stream obtained from the server apparatus on the Internet 800 via the LAN communication unit 121 (for example, the MPEG-2 PS or the like) may be inputted into the demultiplexer 143S. Further, the demultiplexer 143S can output the packet stream inputted from each of the first tuner/demodulator 130C, the second tuner/demodulator 130T, and the third tuner/demodulator 130L via the digital interface 125 to the outside, and the packet stream obtained from the outside via the digital interface 125 can be inputted into the demultiplexer 143S.

The video decoder 145S executes a decoding process of video information subjected to compression coding, a colorimetry converting process to the decoded video information, and a dynamic range converting process with respect to the video data inputted from the demultiplexer 143S. Further, the video decoder 145S executes a process of resolution conversion (up/down conversion) based on a control of the main controller 101, and appropriately outputs video data with resolution such as UHD (3840 horizontal pixels×2160 vertical pixels), HD (1920 horizontal pixels×1080 vertical pixels), or SD (720 horizontal pixels×480 vertical pixels). The output of the video data may be executed with the other resolution. The audio decoder 146S executes a decoding process of audio information subjected to compression coding. Further, the audio decoder 146S executes a downmixing process based on a control of the main controller 101, and outputs the audio data by channel number such as 22.2 ch, 7.1 ch, 5.1 ch, or 2 ch. Note that the first decoder 140S may include a plurality of video decoders 145S and a plurality of audio decoders 146S in order to execute a plurality of decoding processes for video data and audio data at the same time.

The data decoder 144S executes a process of generating an EPG on the basis of the program information data, a data broadcasting screen generating process based on BML data, and a controlling process of a cooperation application based on a broadcasting/communication cooperating function. The data decoder 144S includes a BML browser function of executing a BML document, and the data broadcasting screen generating process is executed by the BML browser function. Further, the data decoder 144S executes a process of decoding the caption data and generating caption information, and a process of decoding the subtitle data and generating subtitle information.

Each of a superimposer 147S, a superimposer 148S, and a superimposer 149S executes a superimposing process for the video data outputted from the video decoder 145S, the EPG outputted from the data decoder 144S, and the data broadcasting screen. A composer 151S executes a process of synthesizing the audio data outputted from the audio decoder 146S and the audio data reproduced by the data decoder 144S. A selector 150S executes resolution selection of the video data based on a control of the main controller 101. Note that the functions of the superimposer 147S, the superimposer 148S, the superimposer 149S, and the selector 150S may be integrated with that of the video selector 191. The function of the composer 151S may be integrated with that of the audio selector 194.

Figure 2G:
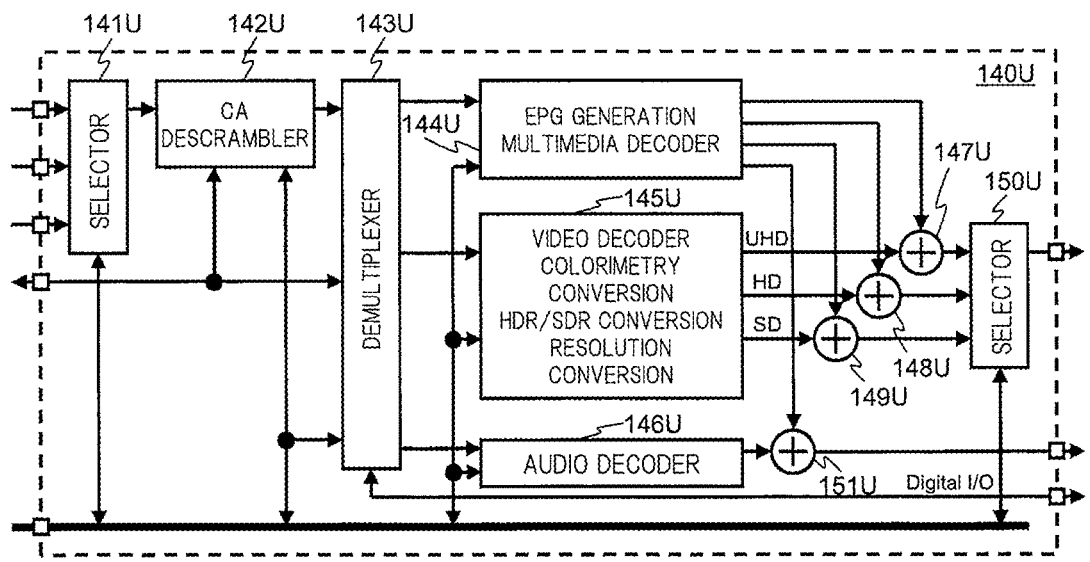
FIG. 2G is a detailed block diagram of a second decoder in the broadcast receiving apparatus according to one embodiment of the present invention.

FIG. 2G is a block diagram illustrating one example of a detailed configuration of the second decoder 140U.

A selector 141U selects one from the packet stream inputted from the second tuner/demodulator 130T, the packet stream inputted from the third tuner/demodulator 130L, and the packet stream inputted from the fourth tuner/demodulator 130B on the basis of a control of the main controller 101, and outputs the selected one. The packet stream inputted from each of the second tuner/demodulator 130T, the third tuner/demodulator 130L, and the fourth tuner/demodulator 130B is an MMT packet stream or TLV or the like including the MMT packet stream, for example. The packet stream may be a packet stream of an MPEG-2 TS form that adopts HEVC (High Efficiency Video Coding) to a video compressing method. A CA descrambler 142U executes a releasing process of encoding algorithm with a predetermined scramble method on the basis of various kinds of control information regarding conditional access superimposed onto the packet stream.

A demultiplexer 143U is a stream decoder, and demultiplexes and extracts video data, audio data, caption data, subtitle data, or program information data on the basis of various kinds of control information contained in the inputted packet stream. The demultiplexed and extracted video data are distributed to a video decoder 145U; the demultiplexed and extracted audio data are distributed to an audio decoder 146U; the demultiplexed and extracted caption data, subtitle data, and program information data are distributed to a multimedia decoder 144U. The packet stream obtained from the server apparatus on the Internet 800 via the LAN communication unit 121 (for example, the MPEG-2 PS, the MMT packet stream, or the like) may be inputted into the demultiplexer 143U. Further, the demultiplexer 143U can output the packet stream inputted from each of the second tuner/demodulator 130T, the third tuner/demodulator 130L, and the fourth tuner/demodulator 130B via the digital interface 125 to the outside, and the packet stream obtained from the outside via the digital interface 125 can be inputted into the demultiplexer 143U.

The multimedia decoder 144U executes a process of generating an EPG, a multimedia screen generating process based on multimedia data, and a controlling process of a cooperation application based on a broadcasting/communication cooperating function on the basis of the program information data. The multimedia decoder 144U includes an HTML browser function of executing an HTML document, and the multimedia screen generating process is executed by the HTML browser function.

The video decoder 145U, the audio decoder 146U, a superimposer 147U, a superimposer 148U, a superimposer 149U, a composer 151U, and a selector 150U are respectively components that have the similar functions to the video decoder 145S, the audio decoder 146S, the superimposer 147S, the superimposer 148S, the superimposer 149S, the composer 151S, and the selector 150S. By changing the end of each of the reference signs "S" into "U" in the explanation about the video decoder 145S, the audio decoder 146S, the superimposer 147S, the superimposer 148S, the superimposer 149S, the composer 151S, and the selector 150S illustrated in FIG. 2F, the video decoder 145U, the audio decoder 146U, the superimposer 147U, the superimposer 148U, the superimposer 149U, the composer 151U, and the selector 150U illustrated in FIG. 2G may respectively be explained. For this reason, further detailed explanation thereof is omitted.

[Software Configuration of Broadcast Receiving Apparatus]

Figure 2H:
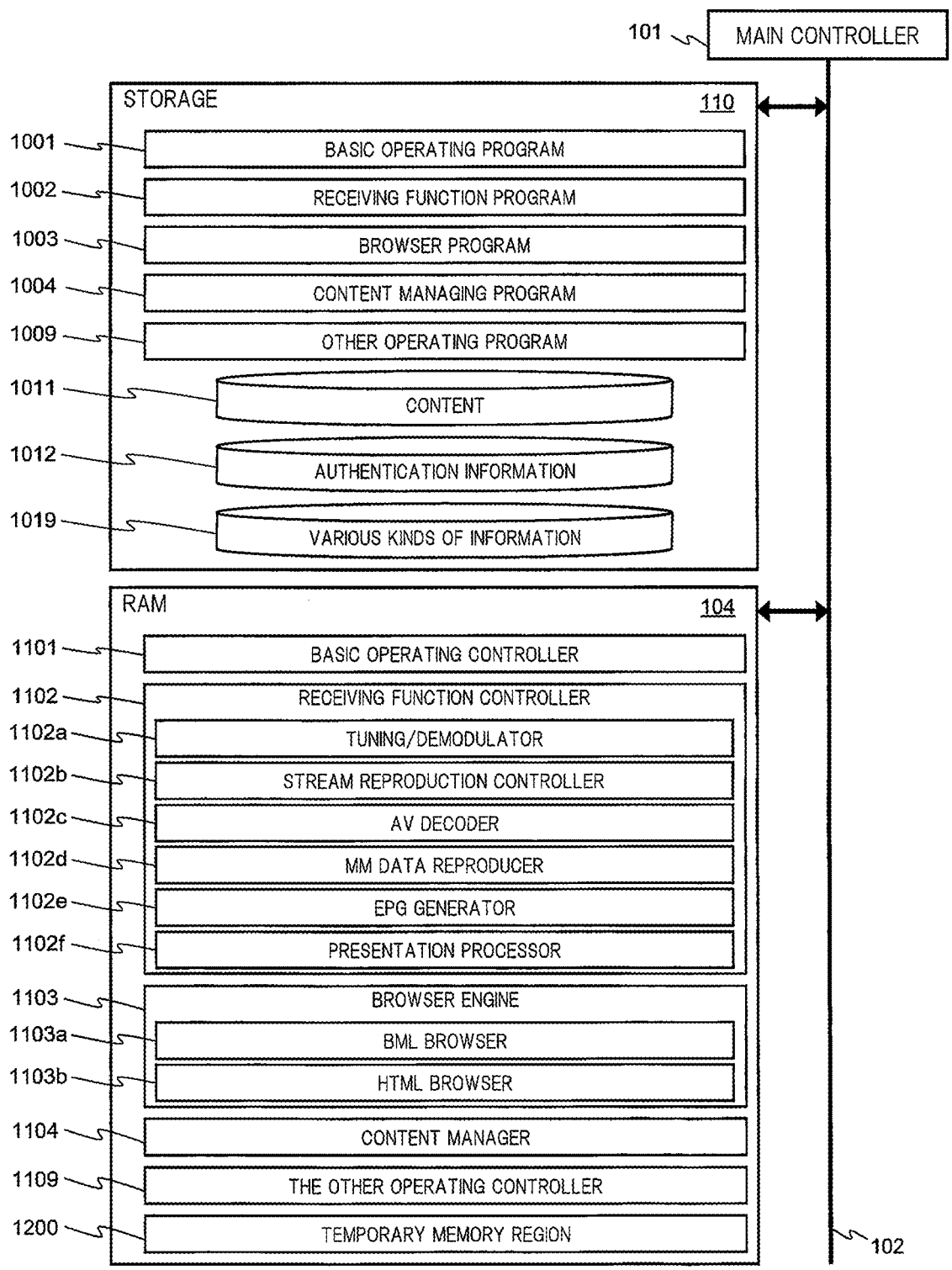
FIG. 2H is a software configuration diagram of the broadcast receiving apparatus according to one embodiment of the present invention.

FIG. 2H is a software configuration diagram of the broadcast receiving apparatus 100, and illustrates one example of a software configuration of the storage (accumulator) 110 (or the ROM 103, the same applies hereinafter) and the RAM 104. A basic operating program 1001, a receiving function program 1002, a browser program 1003, a content managing program 1004, and the other operating program 1009 are stored in the storage (accumulator) 110. Further, the storage (accumulator) 110 includes: a content memory region 1011 configured to store content data such as moving images, still images, or audio; an authentication information memory region 1012 configured to store authentication information used when communicating or cooperating with external portable terminal equipment or the server apparatus; and a various kinds of information memory region 1019 configured to store various kinds of other information.

The basic operating program 1001 stored in the storage (accumulator) 110 is developed on the RAM 104, and the main controller 101 further executes the developed basic operating program, thereby constituting a basic operating controller 1101. Further, the receiving function program 1002, the browser program 1003, and the content managing program 1004, which are stored in the storage (accumulator) 110, are respectively developed on the RAM 104, and the main controller 101 further executes the developed operating programs, thereby constituting a receiving function controller 1102, a browser engine 1103, and a content manager 1104. Further, the RAM 104 includes a temporary memory region 1200 configured to temporarily hold data created at the time of execution of each of the operating programs as needed.

Note that hereinafter, in order to simplify explanation thereof, a case where the main controller 101 develops the basic operating program 1001 stored in the storage (accumulator) 110 on the RAM 104 and executes the developed basic operating program 1001, whereby the basic operating controller 1101 executes a process of controlling each operating block will be described. The similar description is made with respect to the other operating programs.

The receiving function controller 1102 executes basic controls such as a broadcast receiving function or a broadcasting/communication cooperating function of the broadcast receiving apparatus 100. In particular, a tuning/demodulator 1102a mainly controls the channel selecting process, a TMCC information obtaining process, and the demodulating process in each of the first tuner/demodulator 130C, the second tuner/demodulator 130T, the third tuner/demodulator 130L, and the fourth tuner/demodulator 130B. A stream reproduction controller 1102b mainly controls the layer dividing process, the error correction decoding process, the energy dispersal removal, and the stream reproducing process in each of the first tuner/demodulator 130C, the second tuner/demodulator 130T, the third tuner/demodulator 130L, and the fourth tuner/demodulator 130B. An AV decoder 1102c mainly controls the demultiplexing process (or a stream decoding process), a video data decoding process, and an audio data decoding process in each of the first decoder 140S and a second decoder 140H. A multimedia (MM) data reproducer 1102d mainly controls a BML data reproducing process, a caption data decoding process, a subtitle data decoding process, and a controlling process of a communication cooperation application in the first decoder 140S, and an HTML data reproducing process, the multimedia screen generating process, and a controlling process of a communication cooperation application in the second decoder 140H. An EPG generator 1102e mainly controls an EPG generating process and a displaying process of the generated EPG in each of the first decoder 140S and the second decoder 140H. A presentation processor 1102f executes controls of the colorimetry converting process, the dynamic range converting process, a resolution converting process, and the downmixing process for audio in each of the first decoder 140S and the second decoder 140H, and controls of the video selector 191 and the audio selector 194.

At the time of the BML data reproducing process or the HTML data reproducing process described above, a BML browser 1103a and an HTML browser 1103b of the browser engine 1103 respectively execute interpretation of a BML document or an HTML document, and execute the data broadcasting screen generating process or the multimedia screen generating process.

The content manager 1104 executes time schedule management and execution control at the time of execution of video recording reservation or timer recording of a broadcasting program, and expiration date management of the cooperation application obtained based on copyright management and the broadcasting/communication cooperating function when the broadcasting program or a recorded program is outputted from the digital interface 125 or the LAN communication unit 121.

Each of the operating programs may be stored in advance in at least one of the storage (accumulator) 110 or the ROM 103 at the time of product shipment. Each of the operating programs may be obtained from the server apparatus on the Internet 800 via the LAN communication unit 121 or the like after the product shipment. Further, each of the operating programs stored in a memory card or an optical disc may be obtained via the extension interface 124. Each of the operating programs may be newly obtained or updated via the broadcast wave.

[Configuration of Broadcast Station Server]

Figure 3A:
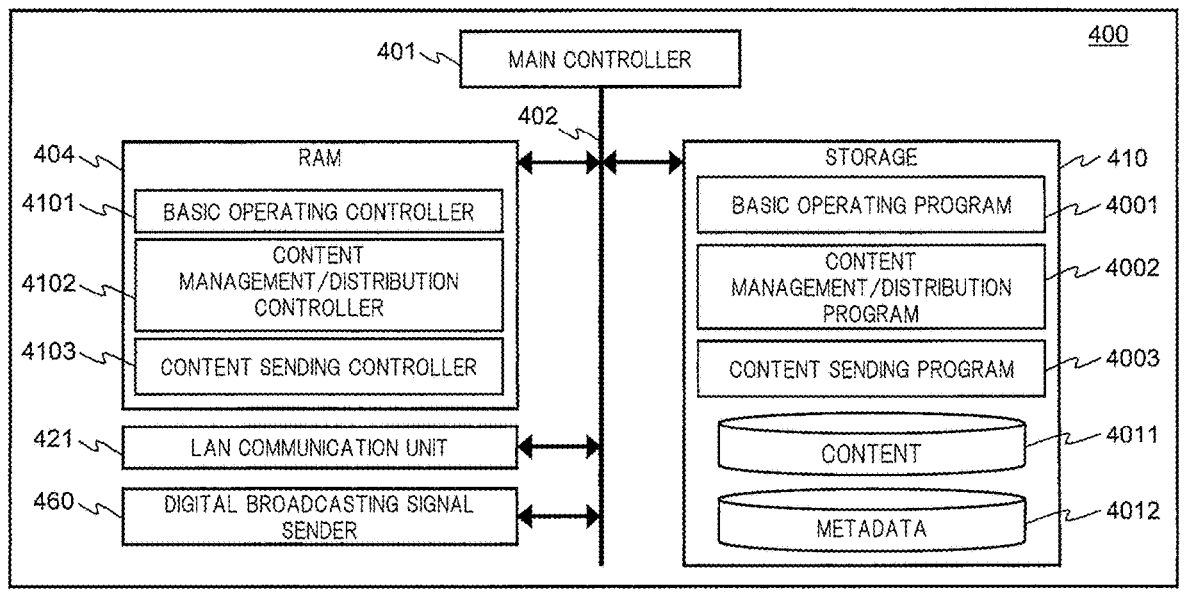
FIG. 3A is a configuration diagram of a broadcast station server according to one embodiment of the present invention.

FIG. 3A is one example of an internal configuration of the broadcast station server 400. The broadcast station server 400 is configured by a main controller 401, a system bus 402, a RAM 404, a storage 410, a LAN communication unit 421, and a digital broadcasting signal sender 460.

The main controller 401 is a microprocessor unit configured to control the whole broadcast station server 400 in accordance with a predetermined operating program. The system bus 402 is a communication path for executing transmission and reception of various kinds of data or commands between the main controller 401 and each operating block in the broadcast station server 400. The RAM 404 becomes a work area at the time of execution of each of operating programs.

A basic operating program 4001, a content management/distribution program 4002, and a content sending program 4003 are stored in the storage 410, and the storage 410 further includes a content data memory region 4011 and a metadata memory region 4012. Contents data of each broadcasting program broadcasted by the broadcast station are stored in the content data memory region 4011. Metadata such as program titles of the respective broadcasting programs, program IDs, program summaries, casts, broadcasting dates, or the like are stored in the metadata memory region 4012.

Further, each of the basic operating program 4001, the content management/distribution program 4002, and the content sending program 4003 stored in the storage 410 is developed on the RAM 404, and the main controller 401 further executes the developed basic operating program, the developed content management/distribution program, the developed content sending program, thereby constituting a basic operating controller 4101, a content management/distribution controller 4102, and a content sending controller 4103.

Note that hereinafter, in order to simplify explanation thereof, a case where the main controller 401 develops the basic operating program 4001 stored in the storage 410 on the RAM 404 and executed the developed basic operating program 4001, whereby the basic operating controller 4101 executes a process of controlling each operating block will be described. The similar description is made with respect to the other operating programs.

The content management/distribution controller 4102 executes management of the content data and the metadata respectively stored in the content data memory region 4011 and the metadata memory region 4012, and a control of the content data and the metadata at the time of provision of them to the service provider on the basis of contract. Moreover, the content management/distribution controller 4102 executes an authentication process of the service provider server 500 as needed at the time of provision of the content data or the metadata to the service provider.

The content sending controller 4103 executes time schedule management when the content data of the broadcasting program stored in the content data memory region 4011 and a stream containing a program title or a program ID of the broadcasting program stored in the metadata memory region 4012 and copy control information of program content are sent out via the digital broadcasting signal sender 460.

The LAN communication unit 421 is connected to the Internet 800, and executes communication with the service provider server 500 or another communication equipment on the Internet 800. The LAN communication unit 421 includes a coding circuit, a decoding circuit, and the like. The digital broadcasting signal sender 460 subjects a stream constituted by content data and program information data for each of the broadcasting programs stored in the content data memory region 4011 to a process such as modulation, and sends out the processed stream as a digital broadcasting wave via the radio tower 300.

[Configuration of Service Provider Server]

Figure 3B:
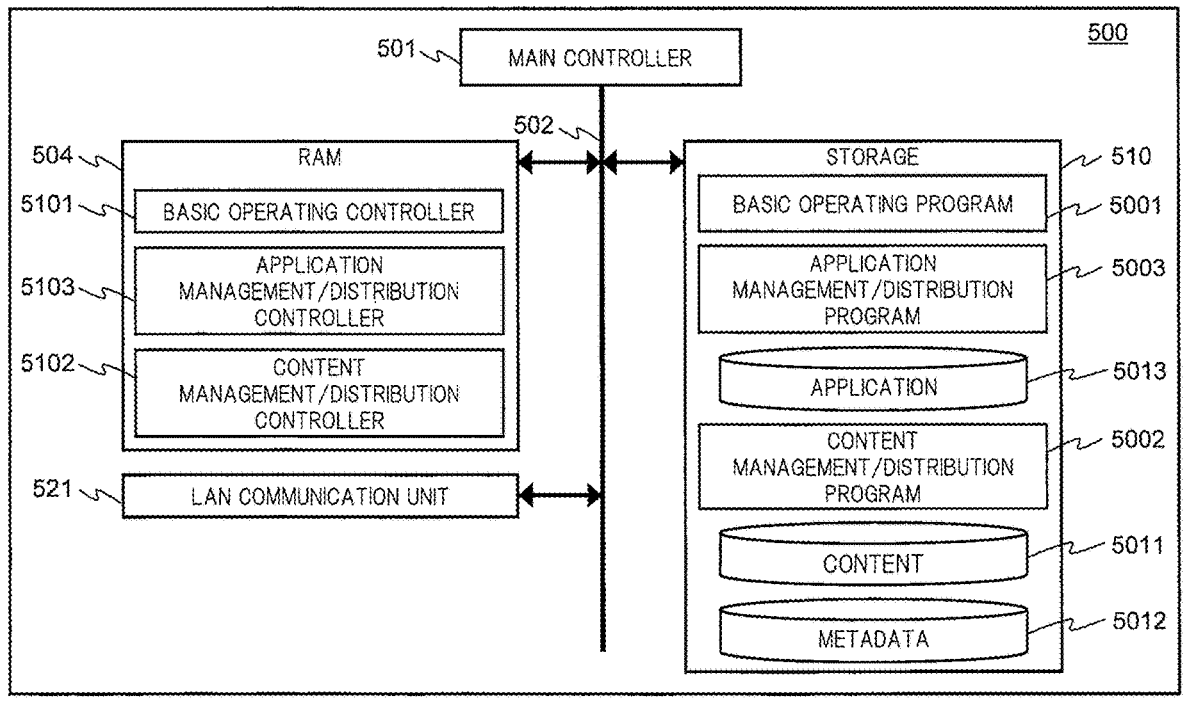
FIG. 3B is a configuration diagram of a service provider server according to one embodiment of the present invention.

FIG. 3B is one example of an internal configuration of the service provider server 500. The service provider server 500 is configured by a main controller 501, a system bus 502, a RAM 504, a storage 510, and a LAN communication unit 521.

The main controller 501 is a microprocessor unit configured to control the whole service provider server 500 in accordance with a predetermined operating program. The system bus 502 is a communication path for executing transmission and reception of various kinds of data or commands between the main controller 501 and each operating block in the service provider server 500. The RAM 504 becomes a work area at the time of execution of each of operating programs.

A basic operating program 5001, a content management/distribution program 5002, and an application management/distribution program 5003 are stored in the storage 510, and the storage 510 further includes a content data memory region 5011, a metadata memory region 5012, and an application memory region 5013. The content data and the metadata provided from the broadcast station server 400, or content created by the service provider and metadata regarding the content are stored in the content data memory region 5011 and the metadata memory region 5012. Applications to be distributed in response to a request from each television receiver (at least one of operating programs or various kinds of data), which are required to realize each service of the broadcasting/communication cooperation system, are stored in the application memory region 5013.

Further, the basic operating program 5001, the content management/distribution program 5002, and the application management/distribution program 5003, which are stored in the storage 510, are respectively developed on the RAM 504, and the main controller 501 further executes the developed basic operating program, the developed content management/distribution program, and the developed application management/distribution program, thereby constituting a basic operating controller 5101, a content management/distribution controller 5102, and an application management/distribution controller 5103.

Note that hereinafter, in order to simplify explanation thereof, a case where the main controller 501 develops the basic operating program 5001 stored in the storage 510 on the RAM 504 and executes the developed basic operating program 5001, whereby the basic operating controller 5101 executes a process of controlling each operating block will be described. The similar description is made with respect to the other operating programs.

The content management/distribution controller 5102 executes acquisition of content data and metadata from the broadcast station server 400, management of the content data and the metadata respectively stored in the content data memory region 5011 and the metadata memory region 5012, and a control of distribution of the content data and the metadata to each television receiver. Further, the application management/distribution controller 5103 executes management of each application stored in the application memory region 5013, and control when each application is distributed in response to a request from each television receiver. Moreover, the application management/distribution controller 5103 also executes an authentication process of the corresponding television receiver as needed when each application is distributed to each television receiver.

The LAN communication unit 521 is connected to the Internet 800, and executes communication with the broadcast station server 400 or the other communication equipment on the Internet 800. Further, the LAN communication unit 521 executes communication with the broadcast receiving apparatus 100 or the portable information terminal 700 via the router device 800R. The LAN communication unit 521 includes a coding circuit, a decoding circuit, and the like.

[Broadcast wave of Digital Broadcasting]

Here, one example of the broadcast wave of digital broadcasting received by the broadcast receiving apparatus according to the embodiment of the present invention will be described.

The broadcast receiving apparatus 100 can receive the terrestrial digital broadcasting service that shares at least apart of specifications with ISDB-T (Integrated Services Digital Broadcasting for Terrestrial Television Broadcasting) method. Specifically, the dual-polarized terrestrial digital broadcasting that the second tuner/demodulator 130T can receive is advanced terrestrial digital broadcasting that shares the part of the specifications with the ISDB-T method. Further, the layered division multiplexing terrestrial digital broadcasting that the third tuner/demodulator 130L can receive is the advanced terrestrial digital broadcasting shares the part of the specifications with the ISDB-T method. Note that the existing terrestrial digital broadcasting that the first tuner/demodulator 130C can receive is terrestrial digital broadcasting with the ISDB-T method. Further, advanced BS digital broadcasting or advanced CS digital broadcasting that the fourth tuner/demodulator 130B can receive is digital broadcasting with a method different from the ISDB-T method.

Here, the dual-polarized terrestrial digital broadcasting and the layered division multiplexing terrestrial digital broadcasting according to the present embodiment adopts OFDM (Orthogonal Frequency Division Multiplexing: orthogonal frequency division multiplexing) that is one of multi-carrier methods as a transmission method in the similar manner to the ISDB-T method. Since the OFDM is a multi-carrier method, a symbol length thereof is long, and it is effective to add a redundant portion in a time axis direction called a guard interval. This makes it possible to reduce an influence on multipath within a range of the guard interval. For this reason, it is possible to realize an SFN (Single Frequency Network: single frequency network), and this makes it possible to use the frequency effectively.

In the dual-polarized terrestrial digital broadcasting and the layered division multiplexing terrestrial digital broadcasting according to the present embodiment, a carrier of the OFDM is divided into groups called segments in the similar manner to the ISDB-T method. As illustrated in FIG. 4A, one channel bandwidth of the digital broadcasting service is configured by 13 segments. The central part of the band is set to a position of segment 0, and segment numbers (0 to 12) are assigned above and below this position in turn. Transmission path coding of the dual-polarized terrestrial digital broadcasting and the layered division multiplexing terrestrial digital broadcasting according to the present embodiment is executed in units of OFDM segments. For this reason, it is possible to define layer transmission. For example, in the bandwidth of one television channel, it is possible to allocate a part of the OFDM segments to a fixed receiving service, and allocate the remaining to a mobile receiving service. In the layer transmission, each layer is configured by one OFDM segment or a plurality of OFDM segments, and it is possible to set, for each layer, parameters such as a carrier modulation method, a coding rate of an inner code, or a length of time interleaving. Note that the number of layers may be set arbitrarily, for example, and the number of layers may be set up to three layers. FIG. 4B illustrates one example of a layer allocation of the OFDM segments in a case where the number of layers is three or two. In the example of (1) of FIG. 4B, the number of layers is three; an A layer is configured by one segment (segment 0); a B layer is configured by seven segments (segments 1 to 7); and a C layer is configured by five segments (segments 8 to 12). In the example of (2) of FIG. 4B, the number of layers is three; an A layer is configured by one segment (segment 0); a B layer is configured by five segments (segments 1 to 5); and a C layer is configured by seven segments (segments 6 to 12). In the example of (3) of FIG. 4B, the number of layers is two; an A layer is configured by one segment (segment 0); and a B layer is configured by 12 segments (segments 1 to 12). The number of OFDM segments and transmission path coding parameters of each layer are determined in accordance with organization information, and are transmitted by the TMCC signal that is control information for assisting the operation of the receiver.

Note that as one example of a usage example of segment layer allocation illustrated in (1), (2), and (3) of FIG. 4B, the following may be an example, for example.

For example, the layer allocation illustrated in (1) of FIG. 4B can be used in the dual-polarized terrestrial digital broadcasting according to the present embodiment, and the same segment layer allocation may be used for both a horizontal polarized wave and a vertical polarized wave. Specifically, the mobile receiving service of the existing terrestrial digital broadcasting may be transmitted by the one segment described above of the horizontal polarized wave as the A layer. (Note that in the mobile receiving service of the existing terrestrial digital broadcasting, the same service may be transmitted by the one segment described above of the vertical polarized wave. In this case, this is also treated as the A layer.) Further, the terrestrial digital broadcasting service in which video whose maximum resolution is 1920 horizontal pixels×1080 vertical pixels, which is the existing terrestrial digital broadcasting, is transmitted may be transmitted by the seven segments described above of the horizontal polarized wave as the B layer. (Note that the terrestrial digital broadcasting service in which the video whose maximum resolution is 1920 horizontal pixels×1080 vertical pixels is transmitted may transmit the same service by the seven segments described above of the vertical polarized wave. In this case, this is also treated as the B layer.) Moreover, it may be configured so as to transmit the advanced terrestrial digital broadcasting service capable of transmitting the video whose maximum resolution is the number of pixels that exceeds 1920 horizontal pixels×1080 vertical pixels by the five segments described above of each of both the horizontal polarized wave and the vertical polarized wave, that is, by total ten segments as the C layer. Details of the transmission will be described later. A transmission wave of the segment layer allocation can be received by the second tuner/demodulator 130T of the broadcast receiving apparatus 100, for example.

For example, the layer allocation illustrated in (2) of FIG. 4B can be used as an example different from that illustrated in (1) of FIG. 4B in the dual-polarized terrestrial digital broadcasting according to the present embodiment, and the same segment layer allocation may be used for both the horizontal polarized wave and the vertical polarized wave. Specifically, the mobile receiving service of the existing terrestrial digital broadcasting may be transmitted by the one segment described above of the horizontal polarized wave as the A layer. (Note that the mobile receiving service of the existing terrestrial digital broadcasting may transmit the same service by the one segment described above of the vertical polarized wave. In this case, this is also treated as the A layer.) Moreover, it may be configured so as to transmit the advanced terrestrial digital broadcasting service capable of transmitting the video whose maximum resolution is the number of pixels that exceeds 1920 horizontal pixels×1080 vertical pixels by the five segments described above of each of both the horizontal polarized wave and the vertical polarized wave, that is, by total ten segments as the B layer. Further, the terrestrial digital broadcasting service, which is the existing terrestrial digital broadcasting, in which the video whose maximum resolution is 1920 horizontal pixels× 1080 vertical pixels is transmitted, may be transmitted by the seven segments described above of the horizontal polarized wave as the C layer. (Note that the terrestrial digital broadcasting service in which the video whose maximum resolution is 1920 horizontal pixels×1080 vertical pixels is transmitted may transmit the same service by the seven segments described above of the vertical polarized wave. In this case, this is also treated as the C layer.) Details of the transmission will be described later. A transmission wave of the segment layer allocation can be received by the second tuner/demodulator 130T of the broadcast receiving apparatus 100 according to the present embodiment, for example.

For example, the layer allocation illustrated in (3) of FIG. 4B can be used in the layered division multiplexing terrestrial digital broadcasting or the existing terrestrial digital broadcasting according to the present embodiment. Specifically, in a case where the layered division multiplexing terrestrial digital broadcasting is used, the mobile receiving service of the existing terrestrial digital broadcasting may be transmitted by one segment illustrated in FIG. 4B as the A layer. Moreover, it may be configured so as to transmit the advanced terrestrial digital broadcasting service capable of transmitting the video whose maximum resolution is the number of pixels that exceeds 1920 horizontal pixels×1080 vertical pixels by 12 segments illustrated in FIG. 4B as the B layer. A transmission wave of the segment layer allocation can be received by the third tuner/demodulator 130L of the broadcast receiving apparatus 100 according to the present embodiment, for example. in a case where the existing terrestrial digital broadcasting is used, the mobile receiving service of the existing terrestrial digital broadcasting may be transmitted by one segment illustrated in FIG. 4B as the A layer, and the terrestrial digital broadcasting service, which is the existing terrestrial digital broadcasting, in which the video whose maximum resolution is 1920 horizontal pixels× 1080 vertical pixels is transmitted, may be transmitted by 12 segments illustrated in FIG. 4B as the B layer. A transmission wave of the segment layer allocation can be received by the first tuner/demodulator 130C of the broadcast receiving apparatus 100 according to the present embodiment, for example.

Figure 4C:
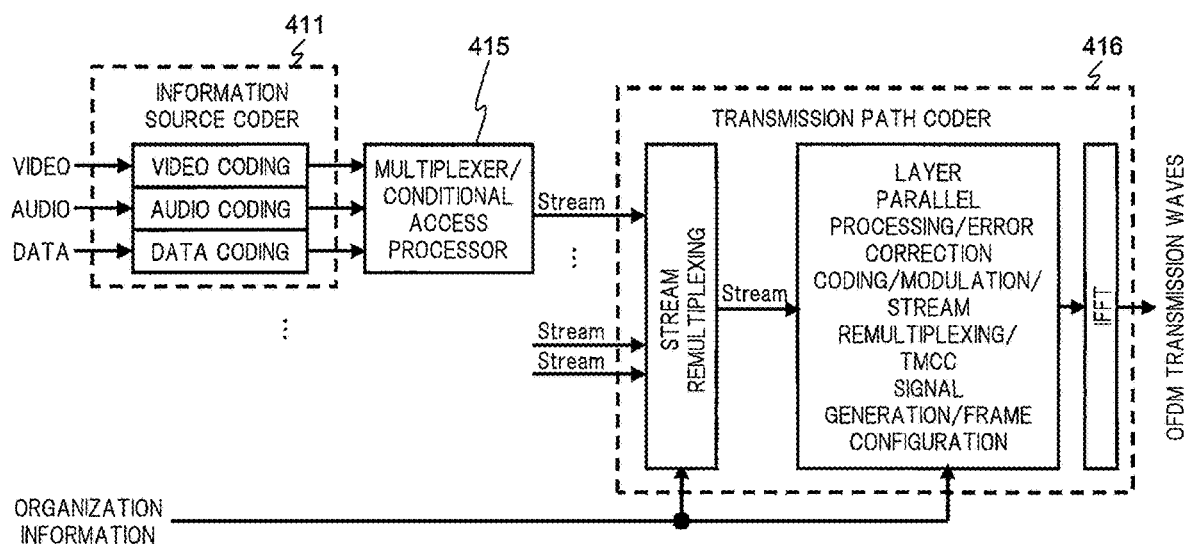
FIG. 4C is a diagram for explaining a generating process for an OFDM transmission wave for the digital broadcasting according to one embodiment of the present invention.

FIG. 4C illustrates one example of a system at the broadcast station side, which realizes a generating process for an OFDM transmission wave that is a digital broadcasting wave of the dual-polarized terrestrial digital broadcasting and the layered division multiplexing terrestrial digital broadcasting according to the present embodiment. An information source coder 411 codes each of video/audio/ various kinds of data. A multiplexer/conditional access processor 415 multiplexes the video/audio/various kinds of data respectively coded in the information source coder 411; further executes a process corresponding to conditional access appropriately; and outputs them as a packet stream. A plurality of information source coders 411 and a plurality of multiplexer/conditional access processors 415 can be provided parallelly, thereby generating a plurality of packet streams. A transmission path coder 416 remultiplexes the plurality of packet streams to create one packet stream, and executes a transmission path coding process to output it as the OFDM transmission wave. In the configuration illustrated in FIG. 4C, details of a method of information source coding and transmission path coding are different, but a configuration of realizing the generating process for the OFDM transmission wave is common to the ISDB-T method. Therefore, a part of the plurality of information source coders 411 and the plurality of multiplexer/conditional access processors 415 may be configured for the terrestrial digital broadcasting service with the ISDB-T method, another part thereof may be configured for the advanced terrestrial digital broadcasting service, and packet streams of a plurality of different terrestrial digital broadcasting services may be multiplexed in the transmission path coder 416. In a case where the multiplexer/conditional access processor 415 is configured for the terrestrial digital broadcasting service with the ISDB-T method, the MPEG-2 TS that is a stream of a TSP (Transport Stream Packet) defined by MPEG-2 systems may be generated. Further, in a case where the multiplexer/conditional access processor 415 is configured for the advanced terrestrial digital broadcasting service, the MMT packet stream or a TLV stream including the MMT packet or the stream of the TSP defined by another system may be generated. Of course, all of the plurality of information source coders 411 and the plurality of multiplexer/conditional access processors 415 may be configured for the advanced terrestrial digital broadcasting service, and all of the packet streams to be multiplexed by the transmission path coder 416 may be a packet stream for the advanced terrestrial digital broadcasting service.

FIG. 4D illustrates one example of a configuration of the transmission path coder 416.

(1) of FIG. 4D will first be described. (1) of FIG. 4D is a configuration of the transmission path coder 416 in a case where only the OFDM transmission wave of the digital broadcasting for the existing terrestrial digital broadcasting service is generated. The OFDM transmission wave transmitted by this configuration has a segment configuration illustrated in (3) of FIG. 4B, for example. Redundancy of error correction is added to the packet stream inputted from the multiplexer/conditional access processor 415 and subjected to a remultiplexing process, and various kinds of interleaving processes such as byte interleaving, bit interleaving, time interleaving, or frequency interleaving are also executed for the packet stream. Then, a process by IFFT (Inverse Fast Fourier Transform) is executed together with a pilot signal, the TMCC signal, and the AC signal, and it becomes the OFDM transmission wave through orthogonal modulation after a guard interval is added. Note that the processes of an outer coding process, a power spreading process, the byte interleaving, an inner coding process, and a mapping process are configured so that the processes can be executed separately for each layer such as the A layer or the B layer. (Note that the digital broadcasting of the existing terrestrial digital broadcasting service has two layers in its operation, but it is possible to transmit up to three layers. For this reason, (1) of FIG. 4D illustrates an example of three layers.) The mapping process is a modulating process for a carrier. Further, in the packet stream inputted from the multiplexer/conditional access processor 415, information such as the TMCC information, a mode, or a guard interval ratio may be multiplexed. Note that as described above, the packet stream inputted into the transmission path coder 416 may be a stream of the TSP defined by the MPEG-2 systems. The OFDM transmission wave generated by the configuration illustrated in (1) of FIG. 4D can be received by the first tuner/demodulator 130C of the broadcast receiving apparatus 100 according to the present embodiment, for example.

Next, (2) of FIG. 4D will be described. (2) of FIG. 4D is a configuration of the transmission path coder 416 in a case where the OFDM transmission wave of the dual-polarized terrestrial digital broadcasting according to the present embodiment is generated. The OFDM transmission wave transmitted by this configuration has a segment configuration illustrated in (1) or (2) of FIG. 4B, for example. In (2) of FIG. 4D, various kinds of interleaving processes such as the byte interleaving, the bit interleaving, the time interleaving, or the frequency interleaving are also executed for the packet stream inputted from the multiplexer/conditional access processor 415 and subjected to the remultiplexing process in addition to addition of redundancy of error correction. Then, a process by the IFFT is executed together with the pilot signal, the TMCC signal, and the AC signal, and it becomes the OFDM transmission wave through the orthogonal modulation after a guard interval adding process is executed.

In the configuration example illustrated in (2) of FIG. 4D, processes of the outer coding process, the power spreading process, the byte interleaving, the inner coding process, the mapping process, and the time interleaving are configured so that the processes can be executed separately for each layer such as the A layer, the B layer, or the C layer. However, in the configuration example illustrated in (2) of FIG. 4D, not only the OFDM transmission wave of a horizontal polarized wave (H) but also the OFDM transmission wave of a vertical polarized wave (V) are generated, and a processing flow thus branches to two lines. When branching from a processing system of the horizontal polarized wave (H) to a processing system of the vertical polarized wave (V), it is possible to differentiate, for each layer in accordance with the segment configuration explained with reference to (1) or (2) of FIG. 4B, whether the same data as that of the processing system of the horizontal polarized wave (H) is caused to branch to the processing system of the vertical polarized wave (V), different data from that of the processing system of the horizontal polarized wave (H) is caused to branch to the processing system of the vertical polarized wave (V), or any data is caused not to branch to the processing system of the vertical polarized wave (V).

As the processes indicated in the configuration of (2) of FIG. 4D, such as the outer code, the inner code, or the mapping, it is possible to use a more advanced process that is not adopted in each process of the configuration of (1) of FIG. 4D in addition to the processes compatible with the configuration of (1) of FIG. 4D. Specifically, in the configuration of (2) of FIG. 4D, for a portion where the process is executed for each layer, the processes compatible with (1) of FIG. 4D are executed in the layer in which the mobile receiving service of the existing terrestrial digital broadcasting or the existing terrestrial digital broadcasting service for transmitting and the video whose maximum resolution is 1920 horizontal pixels×1080 vertical pixels is transmitted with respect to the processes such as the outer code, the inner code, or the mapping. On the other hand, in the configuration of (2) of FIG. 4D, for a portion where the process is executed for each layer, it may be configured so that more advanced process that is not adopted in each process of the configuration of (1) of FIG. 4D for the layer in which the advanced terrestrial digital broadcasting service capable of transmitting the video whose maximum resolution is the number of pixels that exceeds 1920 horizontal pixels×1080 vertical pixels is transmitted with respect to the processes such as the outer code, the inner code, or the mapping.

Note that in the dual-polarized terrestrial digital broadcasting according to the present embodiment according to the present embodiment, the TMCC information (will be described later) allows allocation of layer and the content terrestrial digital broadcasting service to be transmitted to be switched. For this reason, it is desirable that it is configured so that the process such as the outer code, the inner code, or the mapping to be subjected to each layer can be switched by the TMCC information.

Note that with respect to the layer for transmitting the advanced terrestrial digital broadcasting service in which the video whose maximum resolution is the number of pixels that exceeds 1920 horizontal pixels×1080 vertical pixels can be transmitted, as the byte interleaving, the bit interleaving, and the time interleaving, a process compatible with the existing terrestrial digital broadcasting service may be executed, or more advanced different process may be executed. Alternatively, with respect to the layer for transmitting the advanced terrestrial digital broadcasting service, part of the interleavings may be omitted.

Further, in the configuration illustrated in (2) of FIG. 4D, an input stream that becomes a source of the layer in which the mobile receiving service of the existing terrestrial digital broadcasting or the existing terrestrial digital broadcasting service for transmitting the video whose maximum resolution is 1920 horizontal pixels×1080 vertical pixels is transmitted may be a stream of the TSP defined by the MPEG-2 systems that is adopted by the existing terrestrial digital broadcasting among the packet streams inputted into the transmission path coder 416. An input stream that becomes a source of the layer for transmitting the advanced terrestrial digital broadcasting service with the configuration illustrated in (2) of FIG. 4D may be a stream defined by a system different from the stream of the TSP defined by the MPEG-2 systems such as the MMT packet stream or the TLV including MMT packet among the packet streams inputted into the transmission path coder 416. However, a stream of the TSP defined by the MPEG-2 systems in the advanced terrestrial digital broadcasting service may be adopted.

In the configuration of (2) of FIG. 4D explained above, in the layer in which the mobile receiving service of the existing terrestrial digital broadcasting or the existing terrestrial digital broadcasting service for transmitting the video whose maximum resolution is 1920 horizontal pixels×1080 vertical pixels is transmitted, a stream form compatible with the existing terrestrial digital broadcasting and a process are maintained until the OFDM transmission wave is generated from the input stream. As a result, even in a case where the receiving apparatus for the existing terrestrial digital broadcasting service receives one transmission wave of the OFDM transmission wave of the horizontal polarized wave generated in the configuration illustrated in (2) of FIG. 4D and the OFDM transmission wave of the vertical polarized wave, it becomes possible to receive and demodulate the broadcasting signal of the terrestrial digital broadcasting service correctly with respect to the layer in which the mobile receiving service of the existing terrestrial digital broadcasting or the existing terrestrial digital broadcasting service for transmitting the video whose maximum resolution is 1920 horizontal pixels×1080 vertical pixels is transmitted.

Further, in the configuration illustrated in (2) of FIG. 4D, it is possible to transmit the advanced terrestrial digital broadcasting service capable of transmitting the video whose maximum resolution is the number of pixels that exceeds 1920 horizontal pixels×1080 vertical pixels in the layer in which segments of both the OFDM transmission wave of the horizontal polarized wave and the OFDM transmission wave of the vertical polarized wave are used, it becomes possible to receive and demodulate the broadcasting signal of the advanced terrestrial digital broadcasting service by the broadcast receiving apparatus 100 according to the embodiment of the present invention.

Namely, in the configuration illustrated in (2) of FIG. 4D, it is also possible to generate a digital broadcasting wave the digital broadcasting can suitably receive and demodulate both in the broadcast receiving apparatus that is compatible with the advanced terrestrial digital broadcasting service and in the receiving apparatus for the existing terrestrial digital broadcasting service.

Next, (3) of FIG. 4D will be described. (3) of FIG. 4D is a configuration of the transmission path coder 416 in a case where the OFDM transmission wave of the layered division multiplexing terrestrial digital broadcasting according to the present embodiment is generated. In (3) of FIG. 4D, various kinds of interleaving processes such as the byte interleaving, the bit interleaving, the time interleaving, or the frequency interleaving are also executed for the packet stream inputted from the multiplexer/conditional access processor 415 and subjected to the remultiplexing process in addition to addition of redundancy of error correction. Then, a process by the IFFT is executed together with the pilot signal, the TMCC signal, and the AC signal, and it becomes the OFDM transmission wave through the orthogonal modulation after the guard interval is added.

However, in the configuration of (3) of FIG. 4D, each of a modulation wave transmitted by the upper layer and a modulation wave transmitted by the lower layer is generated, and the OFDM transmission wave that is a digital broadcasting wave after multiplexing is generated. A processing system indicated at an upper side of the configuration illustrated in (3) of FIG. 4D is a processing system for generating the modulation wave to be transmitted by the upper layer, and a processing system indicated at a lower side is a processing system for generating the modulation wave to be transmitted by the lower layer. Data for transmitting the processing system for the generating the modulation wave to be transmitted by the upper layer illustrated in (3) of FIG. 4D are the mobile receiving service of the existing terrestrial digital broadcasting and the existing terrestrial digital broadcasting service for transmitting the video whose maximum resolution is 1920 horizontal pixels× 1080 vertical pixels, and various kinds of processes in the processing system for generating the modulation wave to be transmitted by the upper layer illustrated in (3) of FIG. 4D are processes that are the same as various kinds of processed of (1) of FIG. 4D or has compatibility therewith. The modulation wave to be transmitted by the upper layer illustrated in (3) of FIG. 4D has a segment configuration illustrated in (3) of FIG. 4B as well as the transmission wave illustrated in (1) of FIG. 4D, for example. Therefore, the modulation wave to be transmitted by the upper layer illustrated in (3) of FIG. 4D is a digital broadcasting wave that has compatibility with the existing terrestrial digital broadcasting service for transmitting the mobile receiving service of the existing terrestrial digital broadcasting or the video whose maximum resolution is 1920 horizontal pixels× 1080 vertical pixels. On the other hand, data for transmitting the processing system for generating the modulation wave to be transmitted by the lower layer illustrated in (3) of FIG. 4D are the advanced terrestrial digital broadcasting service capable of transmitting the video whose maximum resolution is the number of pixels that exceeds 1920 horizontal pixels×1080 vertical pixels, for example, and it may be configured so that a more advanced process that is not adopted in each process of the configuration illustrated in (1) of FIG. 4D is used with respect to the processes such as the outer code, the inner code, or the mapping.

The modulation wave to be transmitted by the lower layer illustrated in (3) of FIG. 4D may be allocated to the advanced terrestrial digital broadcasting service capable of transmitting the video whose maximum resolution is the number of pixels that exceeds 1920 horizontal pixels×1080 vertical pixels by using all of the 13 segments as the A layer, for example. Alternatively, the mobile receiving service of the existing terrestrial digital broadcasting having a segment configuration illustrated in (3) of FIG. 4B may be transmitted by the A layer of one segment, and the advanced terrestrial digital broadcasting service capable of transmitting the video whose maximum resolution is the number of pixels that exceeds 1920 horizontal pixels×1080 vertical pixels may be transmitted by the B layer of 12 segments. In case of the latter, as well as (2) of FIG. 4D, it may be configured so that the processes are switched for each layer such as the A layer or the B layer from the outer coding process to time interleaving process. In the layer for transmitting the mobile receiving service of the existing terrestrial digital broadcasting, it is similar to explanation for (2) of FIG. 4D in that it is necessary to maintain the process compatible with the existing terrestrial digital broadcasting.

In the configuration illustrated in (3) of FIG. 4D, the OFDM transmission wave, which is a terrestrial digital broadcasting wave obtained by multiplexing the modulation wave to be transmitted by the upper layer and the modulation wave to be transmitted by the lower layer, is generated. A technique of separating the modulation wave to be transmitted by the upper layer from the 4-D OFDM transmission wave is also equipped with the receiving apparatus for the existing terrestrial digital broadcasting service. For this reason, the broadcasting signal, which is contained in the modulation wave to be transmitted by the upper layer, of the mobile receiving service of the existing terrestrial digital broadcasting or the existing terrestrial digital broadcasting service for transmitting the video whose maximum resolution is 1920 horizontal pixels×1080 vertical pixels is correctly received and demodulated by the receiving apparatus of the existing terrestrial digital broadcasting service. On the other hand, the broadcasting signal, which is contained in the modulation wave to be transmitted by the lower layer, of the advanced terrestrial digital broadcasting service capable of transmitting the video whose maximum resolution is the number of pixels that exceeds 1920 horizontal pixels×1080 vertical pixels can be received and demodulated by the broadcast receiving apparatus 100 according to the embodiment of the present invention.

Namely, in the configuration illustrated in (3) of FIG. 4D, it is possible to generate the digital broadcasting wave by which the digital broadcasting can be received and demodulated suitably in both the broadcast receiving apparatus that is compatible with the advanced terrestrial digital broadcasting service and the receiving apparatus of the existing terrestrial digital broadcasting service. Further, in the configuration illustrated in (3) of FIG. 4D, unlike the configuration illustrated in (2) of FIG. 4D, it is possible to generate the OFDM transmission wave that can be received more easily without necessity to use the plurality of polarized waves.

In the 4-D OFDM transmission wave generating process illustrated in (1) of FIG. 4D, (2) of FIG. 4D, and (3) of FIG. 4D according to the present embodiment, three types of modes with the different number of carriers are prepared in consideration of the suitability of a distance between stations of the SFN and the resistance to Doppler shift in mobile reception. Note that another mode with the different number of carriers may further be prepared. In a mode with a large number of carriers, an effective symbol length becomes longer, and a guard interval length becomes longer if the guard interval ratio (guard interval length/effective symbol length) is the same. This makes it possible to have resistance to multipath with a long delay time difference. On the other hand, in case of a mode with the small number of carriers, a carrier interval becomes wide, and it is possible to reduce an influence of inter-carrier interference due to the Doppler shift that occurs in case of mobile reception or the like.

In the 4-D OFDM transmission wave generating process illustrated in (1) of FIG. 4D, (2) of FIG. 4D, and (3) of FIG. 4D according to the present embodiment, it is possible to set, for each layer configured by one OFDM segment or a plurality of OFDM segments, parameters such as a carrier modulation method, a code rate of an inner code, or a length of time interleaving. FIG. 4E illustrates one example of a transmission parameter for one segment unit of the OFDM segment identified in the mode of the system according to the present embodiment. Note that a carrier modulation method in FIG. 4E indicates a modulation method of a "data" carrier. An SP signal, a CP signal, a TMCC signal, and an AC signal adopt a modulation method different from the modulation method of the "data" carrier. These signals are signals whose resistance to noise is more important than the quantity of information. For this reason, a modulation method of executing mapping to a constellation with a small number of states (BPSK or DBPSK, that is, two states) than the modulation method of "data" carrier (all are QPSK or more, that is, four states or more) is adopted, and this heightens the resistance to noise.

Further, each numerical value of the number of carriers is a value in a case where numerical values at a left side of an oblique line set QPSK, 16 QAM, or 64 QAM as the carrier modulation method, and is a value in a case where numerical values at a right side of the oblique line set DQPSK as the carrier modulation method. In FIG. 4E, underlined parameters are parameters each of which is not compatible with the mobile receiving service of the existing terrestrial digital broadcasting. Specifically, 256 QAM, 1024 QAM, and 4096 QAM in the modulation method of the "data" carrier are not adopted in the existing terrestrial digital broadcasting service. Therefore, in a process in the layer that requires compatibility with the existing terrestrial digital broadcasting service in an OFDM broadcast wave generating process according to (1) of FIG. 4D, (2) of FIG. 4D, and (3) of FIG. 4D of the present embodiment, 256 QAM, 1024 QAM, and 4096 QAM of the modulation method of the "data" carrier are not used. Further multi-level modulation method such as 256 QAM (the number of states is 256), 1024 QAM (the number of states is 1024), or 4096 QAM (the number of states is 4096) may be applied to the "data" carrier transmitted by the layer corresponding to the advanced terrestrial digital broadcasting service in addition to the modulation method that has compatibility with the existing terrestrial digital broadcasting service, such as QPSK (the number of states is 4), 16 QAM (the number of states is 16), or 64 QAM (the number of states is 64). Further, a modulation method different from these modulation methods may be adopted.

Note that as the modulation method for a pilot symbol (SP or CP) carrier, BPSK (the number of states is two) compatible with the existing terrestrial digital broadcasting service may be used. As the modulation method for an AC carrier and a TMCC carrier, DBPSK (the number of states is 2) compatible with the existing terrestrial digital broadcasting service may be used.

Further, as a method of the inner coding process, an LDPC code is not adopted in the existing terrestrial digital broadcasting service. Therefore, in the process for the layer necessary for compatibility with the existing terrestrial digital broadcasting service in the OFDM broadcast wave generating process illustrated in (1) of FIG. 4D, (2) of FIG. 4D, and (3) of FIG. 4D according to the present embodiment, the LDPC code is not used. The LDPC code may be applied, as the inner code, to the data to be transmitted by the layer that is compatible with the advanced terrestrial digital broadcasting service. Further, as a method of the outer coding process, a BCH code is not adopted in the existing terrestrial digital broadcasting service. Therefore, in the process for the layer necessary for compatibility with the existing terrestrial digital broadcasting service in the OFDM broadcast wave generating process illustrated in (1) of FIG. 4D, (2) of FIG. 4D, and (3) of FIG. 4D according to the present embodiment, the BCH code is not used. The BCH code may be applied, as the outer code, to the data to be transmitted by the layer that is compatible with the advanced terrestrial digital broadcasting service.

Further, FIG. 4F illustrates one example of a transmission signal parameter for one physical channel (6 MHz bandwidth) unit of the OFDM broadcast wave generating process illustrated in (1) of FIG. 4D, (2) of FIG. 4D, and (3) of FIG. 4D according to the present embodiment. In the OFDM broadcast wave generating process illustrated in (1) of FIG. 4D, (2) of FIG. 4D, and (3) of FIG. 4D according to the present embodiment, for compatibility with the existing terrestrial digital broadcasting service, parameters compatible with the existing terrestrial digital broadcasting service are basically adopted in the parameters illustrated in FIG. 4F as a general rule. However, in a case where all of the segments in the modulation wave to be transmitted by the lower layer illustrated in (3) of FIG. 4D are allocated to the advanced terrestrial digital broadcasting service, it is not necessary to maintain compatibility with the existing terrestrial digital broadcasting service in the modulation wave. Therefore, in this case, parameters other than the parameters illustrated in FIG. 4F may be used with respect to the modulation wave to be transmitted by the lower layer illustrated in (3) of FIG. 4D.

Next, carriers of the OFDM transmission wave according to the present embodiment will be described. In addition to carriers by which data such as video or audio are transmitted, a carrier by which the pilot signal (SP, CP, AC1, or AC2) that becomes a reference of demodulation is transmitted, and a carrier by which the TMCC signal that is information on a modulation form and a convolution code rate of the carrier is transmitted are included in the carriers of the OFDM transmission wave according to the present embodiment. A number of carriers corresponding to ⅑ of the number of carriers for each segment is used for these types of transmission. Further, a concatenate code is adopted for the error correction; a shortened reed Solomon (204, 188) code is adopted for the outer code; a constraint length of 7 is adopted for the inner code; and a punctured convolution code with a code rate of ½ as a mother code is adopted. Coding different from the above may be used for both the outer code and the inner code. Information rate differs depending upon parameters such as a carrier modulation form, a convolution code rate, or a guard interval ratio.

Further, 204 symbols are set as one frame, and the integer number of TSPs are included in one frame. Switching of transmission parameters is executed at the boundary of this frame.

Figure 4G:
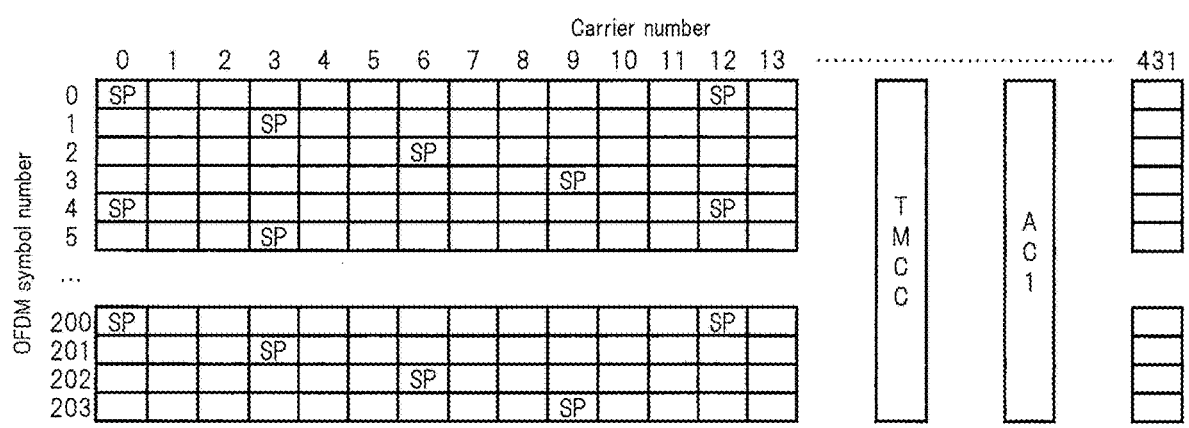
FIG. 4G is a diagram for explaining arrangement of a pilot signal of a synchronous modulation segment for the digital broadcasting according to one embodiment of the present invention.
Figure 4H:
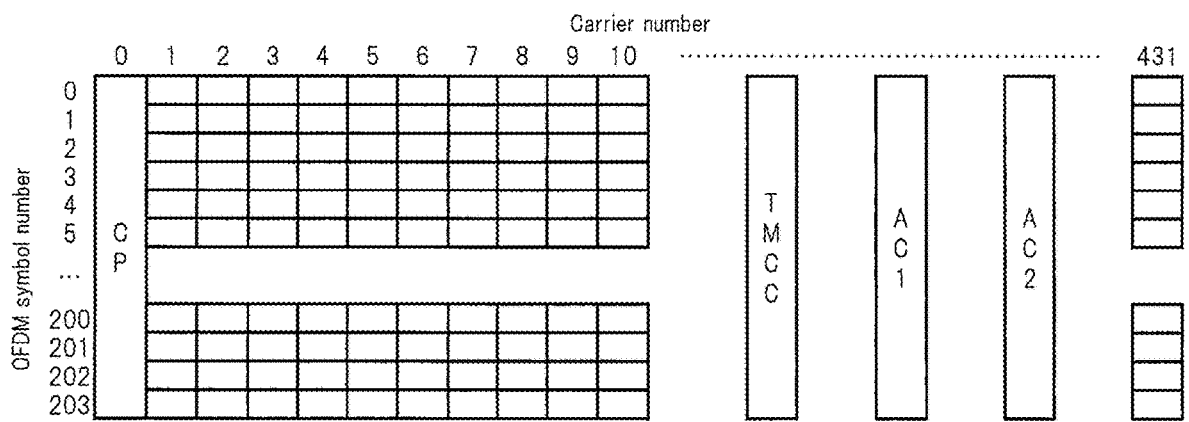
FIG. 4H is a diagram for explaining arrangement of a pilot signal of a differential modulation segment for the digital broadcasting according to one embodiment of the present invention.

There are an SP (Scattered Pilot), a CP (Continual Pilot), an AC (Auxiliary Channel) 1, and an AC2 as the pilot signals that becomes a reference of demodulation. FIG. 4G illustrates one example of an arrangement image of the pilot signals in the segments in case of synchronous modulation (such as QPSK, 16 QAM, 64 QAM, 256 QAM, 1024 QAM, or 4096 QAM). The SP is inserted into the segment of the synchronous modulation; is transmitted to 12 carriers in a carrier number (frequency axis) direction once; and is transmitted to four symbols in an OFDM symbol number (time axis) direction once. Since an amplitude and a phase of the SP are known, the SP can be used as a reference of synchronous demodulation. FIG. 4H illustrates one example of an arrangement image of the pilot signals in the segment in case of differential modulation (such as DQPSK). The CP is a continuous signal that is inserted at a left end of the segment for differential modulation, and is used for demodulation.

The AC1 and the AC2 carry information on the CP, and is also used for transmission of information for broadcaster in addition to a role of the pilot signal. They may be used for transmission of other information.

Note that each of the arrangement images illustrated in FIG. 4G and FIG. 4H is an example of in case of mode 3, and carrier numbers are 0 to 431. However, in case of each of mode 1 and mode 2, carrier numbers are 0 to 107 or 0 to 215. Further, the carrier for transmitting the AC1, the AC2, or the TMCC may be determined in advance for each segment. Note that the carrier for transmitting the AC1, the AC2, and the TMCC are arranged at random in a frequency direction in order to reduce an influence of periodic dip of transmission path characteristics by multipath.

[TMCC Signal]

The TMCC signal transmits information (TMCC information) regarding a layer configuration, a transmission parameter of the OFDM segment, and a demodulation operation of the receiver. The TMCC signal is transmitted by a carrier for TMCC transmission defined in each segment. FIG. 5A illustrates one example of bit allocation of the TMCC carrier. The TMCC carrier is configured by 204 bits (B0 to B203). The B0 is a demodulation reference signal for a TMCC symbol, and has a predetermined amplitude and a predetermined phase reference. Each of the B1 to B16 is a synchronization signal, and is configured by words with 16 bits. As the synchronization signal, two types of w0 and w1 are defined, and the w0 and w1 are alternately sent out for each frame. The B17 to B19 are used for identification of a segment form, by which it is identified whether each segment is a differential modulator or a synchronous modulator. The TMCC information is described in the B20 to B121. The B122 to B203 are parity bits.

The TMCC information of the OFDM transmission wave according to the present embodiment may be configured so as to contain, as one example thereof, information for assisting demodulation and a decoding operation of the receiver, such as system identification, a transmission parameter switching indicator, a startup control signal (a startup flag for emergency warning broadcasting), current information, next information, frequency converting process identification, physical channel number identification, main signal identification, 4K signal transmission layer identification, or additional layer transmission identification, for example. The current information indicates a current layer configuration and a transmission parameter, and the next information indicates a layer configuration and a transmission parameter after switching. The switching of the transmission parameter is executed on a frame unit basis. FIG. 5B illustrates one example of bit allocation of the TMCC information. Further, FIG. 5C illustrates one example of a configuration of transmission parameter information contained in the current information/next information. Note that a connected transmission phase correction amount is control information used in case of terrestrial digital audio broadcasting ISDB-TSB (ISDB for Terrestrial Sound Broadcasting) having a common transmission method, and detailed explanation herein is omitted.

FIG. 5D illustrates one example of bit allocation of the system identification. Two bits are allocated to a signal for the system identification. In case of an existing terrestrial digital television broadcasting system, "00" is set. In a case where the transmission method is a common terrestrial digital audio broadcasting system, "01" is set. Further, in case of an advanced terrestrial digital television broadcasting system such as the dual-polarized terrestrial digital broadcasting or the layered division multiplexing terrestrial digital broadcasting according to the present embodiment, "10" is set. In the advanced terrestrial digital television broadcasting system, it is possible to transmit a 2K broadcasting program (that is, a broadcasting program of video with 1920 horizontal pixels×1080 vertical pixels, a broadcasting program of video with lower resolution than it) and a 4K broadcasting program (that is, a broadcasting program of video with resolution that exceeds 1920 horizontal pixels×1080 vertical pixels) in the same service at the same time by means of broadcast wave transmission by the dual-polarized transmission method or the layered division multiplexing method.

The transmission parameter switching indicator is used to notify the receiver of switching timing by counting down when the transmission parameters are switched. This indicator is a value of "1111" at a normal time. In a case where the transmission parameters are switched, this indicator is subtracted by one for each frame from 15 frames before switching. The switching timing is next frame synchronization in which "0000" is sent out. A value of the indicator returns to "1111" after "0000". Countdown is executed in a case where any one or more of parameters such as the system identification of the TMCC information illustrated in FIG. 5B, the transmission parameter contained in the current information/next information, the frequency converting process identification, the main signal identification, the 4K signal transmission layer identification, or the additional layer transmission identification is switched. Countdown is not executed in a case where only the startup control signal of the TMCC information is switched.

The startup control signal (that is, the startup flag for the emergency warning broadcasting) is set to "1" when a startup control to the receiver is executed in the emergency warning broadcasting. The startup control signal is set to "0" when the startup control is not executed.

A partial reception flag for each of the current information/next information is set to "1" in a case where a segment in the center of the transmission band is set to partial reception. Otherwise, the partial reception flag thereof is set to "0". In a case where segment 0 is set for partial reception, the layer is defined as the A layer. In a case where the next information does not exist, the partial reception flag set to "1".

FIG. 5E illustrates one example of bit allocation for a carrier modulation mapping method (a modulation method for the data carrier) in each layer transmission parameter for each of the current information/next information. In a case where this parameter is "000", it indicates that the modulation method is DQPSK. In a case where this parameter is "001", it indicates that the modulation method is QPSK. In a case where this parameter is "010", it indicates that the modulation method is 16 QAM. In a case where this parameter is "011", it indicates that the modulation method is 64 QAM. In a case where this parameter is "100", it indicates that the modulation method is 256 QAM. In a case where this parameter is "101", it indicates that the modulation method is 1024 QAM. In a case where this parameter is "110", it indicates that the modulation method is 4096 QAM. In a case where any unused layer or the next information does not exist, this parameter is set to "111".

For setting of the code rate or the length of the time interleaving, each parameter may be set in accordance with the organization information of each layer for each of the current information/next information. The number of segments indicates the number of segments of each layer by a numerical value of four bits. In a case where any unused layer or the next information does not exist, the number of segments is set to "1111". Note that since settings of a mode or a guard interval ratio are independently detected at the receiver side, transmission by the TMCC information may not be executed.

FIG. 5F illustrates one example of bit allocation of the frequency converting process identification. The frequency converting process identification is set to "0" in a case where a frequency converting process (in case of the dual-polarized transmission method) (will be described later) or a frequency conversion amplification process (in case of the layered division multiplexing transmission method) is executed in the converter 201T or the converter 201L illustrated in FIG. 2A. In a case where the frequency converting process or the frequency conversion amplification process is not executed, the frequency converting process identification is set to "1". This parameter may be configured so as to be set to "1" when it is sent out from the broadcast station, for example. This parameter may be configured so as to be rewritten into "0" in the converter 201T the converter 201L when the frequency converting process or the frequency conversion amplification process is executed in the converter 201T or the converter 201L. By configuring it in this manner, in a case where it is received by the second tuner/demodulator 130T or the third tuner/demodulator 130L of the broadcast receiving apparatus 100 and a bit of the frequency converting process identification is "0", it is possible to identify that the frequency converting process was executed after the OFDM transmission wave was sent out from the broadcast station.

In the dual-polarized terrestrial digital broadcasting according to the present embodiment, the setting or rewriting of the frequency converting process identification bit may be executed in each of the plurality of polarized waves. For example, in a case where both of the plurality of polarized waves is not subjected to frequency conversion in the converter 201T of FIG. 2A, the frequency converting process identification bit contained in the OFDM transmission wave of each of the both may be left as "1". Further, in a case where only one polarized wave of the plurality of polarized waves is subjected to frequency conversion in the converter 201T, the frequency converting process identification bit included in the OFDM transmission wave of the polarized wave subjected to the frequency conversion may be rewritten into "0" in the converter 201T. Further, in a case where both of the plurality of polarized waves is subjected to frequency conversion in the converter 201T, the frequency converting process identification bit included in the OFDM transmission wave of each of both of polarized waves subjected to the frequency conversion may be rewritten into "0" in the converter 201T. By configuring it in this manner, it is possible to identify presence or absence of the frequency conversion for each polarized wave of the plurality of polarized waves in the broadcast receiving apparatus 100.

Note that since the frequency converting process identification bit is not defined in the existing terrestrial digital broadcasting, it is ignored in a terrestrial digital broadcasting receiving apparatus that has already been used by the user. However, the bit may be introduced into a new terrestrial digital broadcasting service obtained by improving the existing terrestrial digital broadcasting, in which the video whose maximum resolution is 1920 horizontal pixels×1080 vertical pixels is transmitted. In this case, the first tuner/demodulator 130C of the broadcast receiving apparatus 100 according to the embodiment of the present invention may also be configured as a first tuner/demodulator that is compatible with the new terrestrial digital broadcasting service.

Note that as a modification example, on the assumption that the frequency converting process or the frequency conversion amplification process is executed for the OFDM transmission wave in the converter 201T or the converter 201L illustrated in FIG. 2A, this parameter may be set to "0" in advance when it is sent out from the broadcast station. Note that in a case where the broadcast wave to be received is not the advanced terrestrial digital broadcasting service, this parameter may be configured so as to be set to "1".

FIG. 5G illustrates one example of bit allocation of the physical channel number identification. The physical channel number identification is configured by a code with six bits, and identifies a physical channel number (13 ch to 52 ch) of the broadcast wave to be received. In a case where the broadcast wave to be received is not the advanced terrestrial digital broadcasting service, this parameter is set to "111111". A bit of the physical channel number identification is not defined in the existing terrestrial digital broadcasting. Thus, the receiving apparatus of the existing terrestrial digital broadcasting could not obtain a physical channel number of a broadcast wave specified at the broadcast station side from the TMCC signal or the AC signal. In the broadcast receiving apparatus 100 according to the embodiment of the present invention, even though the carrier other than the TMCC signal or the AC signal is not demodulated using the bit of the physical channel number identification of the received OFDM transmission wave, it is possible to grasp the physical channel number that the broadcast station sets for the OFDM transmission wave. Note that the physical channels 13 ch to 52 ch have a bandwidth of 6 MHz per one ch, and are allocated to a frequency band from 470 to 710 MHz in advance. Therefore, the fact that the broadcast receiving apparatus 100 can grasp the physical channel number of the OFDM transmission wave on the basis of the bit of the physical channel number identification means that the frequency band in which the OFDM transmission wave is transmitted in the air as the terrestrial digital broadcasting wave can be grasped.

In the dual-polarized terrestrial digital broadcasting according to the present embodiment, in the OFDM transmission wave generating process at the broadcast station side, bits of the physical channel number identification may be arranged in each of the pair of polarized waves of the plurality of polarized waves in the bandwidth that originally constitutes one physical channel, and the same physical number may be given thereto. Here, depending upon installation environment of the broadcast receiving apparatus 100, only frequency of one polarized wave of the plurality of polarized waves may be converted in the converter 201T illustrated in FIG. 2A. As a result, in a case where the frequencies of the pair of polarized waves of the plurality of polarized waves are different from each other when they are received by the broadcast receiving apparatus 100, the broadcast receiving apparatus side cannot demodulate the advanced terrestrial digital broadcasting by using both of the polarized waves of the dual-polarized terrestrial digital broadcasting if it is impossible to grasp, by any method, that the plurality of polarized waves with different frequencies were originally the pair of polarized waves. Even in such a case, by using the bits of the physical channel number identification described above, in a case where the transmission wave in which the bits of the physical channel number identification indicate that the same value exists in a plurality of different frequencies in the broadcast receiving apparatus 100, it is possible to identify that it is a transmission wave transmitted as a pair of polarized waves that originally constitutes one physical channel at the broadcast station side. This makes it possible to realize demodulation of the advanced terrestrial digital broadcasting of the dual-polarized terrestrial digital broadcasting by using a plurality of transmission waves each indicating the same value.

FIG. 5H illustrates one example of bit allocation of the main signal identification. The present embodiment is an example in which a bit of the main signal identification is arranged in bit B117.

In a case where the OFDM transmission wave to be transmitted is a transmission wave of the dual-polarized terrestrial digital broadcasting, this parameter is set to "1" in the TMCC information of a transmission wave to be transmitted by a main polarized wave. This parameter is set to "0" in the TMCC information of a transmission wave to be transmitted by a sub polarized wave. Note that the transmission wave to be transmitted by the main polarized wave indicates a polarization signal in the same polarization direction as the polarization direction used for transmission of the existing terrestrial digital broadcasting service of a vertical polarized signal and a horizontal polarized signal. Namely, in regions where transmission by the horizontal polarized wave is adopted in the existing terrestrial digital broadcasting service, in the dual-polarized terrestrial digital broadcasting service, the horizontal polarized wave is a main polarized wave, and the vertical polarized wave is a sub polarized wave. Further, in areas where transmission by the vertical polarized wave is adopted in the existing terrestrial digital broadcasting service, in the dual-polarized terrestrial digital broadcasting service, the vertical polarized wave is a main polarized wave, and the horizontal polarized wave is a sub polarized wave.

In the broadcast receiving apparatus 100 according to the embodiment of the present invention that receives the transmission wave of the dual-polarized terrestrial digital broadcasting, by using the bit of the main signal identification, it is possible to identify whether the received transmission wave is transmitted by the main polarized wave or is transmitted by the sub polarized wave at the time of transmission thereof. For example, by using an identifying process for the main polarized wave and the sub polarized wave, it becomes possible to execute a process in which at the time of an initial scan (will be described later), an initial scan is first executed for the transmission wave transmitted by the main polarized wave, and an initial scan is then executed for the transmission wave transmitted by the sub polarized wave after the initial scan for the transmission wave transmitted by the main polarized wave is completed.

Details of a configuration example of the digital broadcasting service for transmitting layers and segments of the dual-polarized terrestrial digital broadcasting according to the present embodiment will be described later. However, in a case where the existing terrestrial digital broadcasting service is transmitted by using a layer constituting a segment contained only in the main polarized wave and an advanced terrestrial digital service is transmitted by a layer containing a segment contained in both the main polarized wave and the sub polarized wave, the initial scan may first be executed for the transmission wave transmitted by the main polarized wave; the initial scan for the existing terrestrial digital broadcasting service may be completed; and then, the initial scan may be executed for the transmission wave transmitted by the sub polarized wave to execute the initial scan for the advanced terrestrial digital broadcasting service. By configuring it in this manner, it is possible to execute the initial scan for the advanced terrestrial digital broadcasting service after the initial scan for the existing terrestrial digital broadcasting service is completed. This makes it possible to reflect settings of the initial scan for the existing terrestrial digital broadcasting service to settings by the initial scan for the advanced terrestrial digital broadcasting service, whereby it is preferable.

Note that the definition of meanings of "1" and "0" of the bit of the main signal identification may be the reverse of the explanation described above.

Further, in place of the bit of the main signal identification, a polarization direction identification bit may be used as one parameter of the TMCC information. Specifically, the polarization direction identification bit may be set to "1" at the broadcast station side for the transmission wave to be transmitted by the horizontal polarized wave, and the polarization direction identification bit is set to "0" at the broadcast station side for the transmission wave to be transmitted by the vertical polarized wave. In the broadcast receiving apparatus 100 according to the embodiment of the present invention that receives the transmission wave of the dual-polarized terrestrial digital broadcasting, by using the polarization direction identification bit, it is possible to identify whether the received transmission wave is transmitted in any polarization direction at the time of the transmission thereof. For example, by using an identifying process for the polarization direction, it becomes possible to execute a process in which at the time of an initial scan (will be described later), an initial scan is first executed for the transmission wave transmitted by the horizontal polarized wave, and an initial scan is then executed for the transmission wave transmitted by the vertical polarized wave after the initial scan for the transmission wave transmitted by the horizontal polarized wave is completed. With respect to explanation of effects of the process, the "main polarized wave" in the part regarding the initial scan in the explanation described above for the bit of the main signal identification may be read as the "horizontal polarized wave", and the "sub polarized wave" may be read as the "vertical polarized wave". For this reason, repeated explanation thereof is omitted.

Note that the definition of meanings of "1" and "0" of the polarization direction identification bit may be the reverse of the explanation described above.

Further, in place of the bit of the main signal identification described above, a first signal/second signal identification bit may be used as one parameter of the TMCC information. Specifically, one polarized wave of the horizontal polarized wave and the vertical polarized wave may be defined as a first polarized wave; a broadcasting signal of the transmission wave to be transmitted by the first polarized wave may be defined as a first signal; and the first signal/second signal identification bit may be set to "1" at the broadcast station side. Further, the other polarized wave may be defined as a second polarized wave; a broadcasting signal of the transmission wave to be transmitted by the second polarized wave may be defined as a second signal; and the first signal/second signal identification bit may be set to "0" at the broadcast station side. In the broadcast receiving apparatus 100 according to the embodiment of the present invention that receives the transmission wave of the dual-polarized terrestrial digital broadcasting, by using the first signal/second signal identification bit, it is possible to identify whether the received transmission wave is transmitted in any polarization direction at the time of the transmission thereof. Note that in the first signal/second signal identification bit, concepts of the "main polarized wave" and the "sub polarized wave" from the definition of the bit of the main signal identification described above are merely replaced by the "first polarized wave" and the "second polarized wave". With respect to the process and the effects of the broadcast receiving apparatus 100, the "main polarized wave" in the part regarding the process of the broadcast receiving apparatus 100 in the explanation described above for the bit of the main signal identification may be read as the "first polarized wave", and the "sub polarized wave" may be read as the "second polarized wave". For this reason, repeated explanation thereof is omitted.

Note that the definition of meanings of "1" and "0" of the first signal/second signal identification bit may be the reverse of the explanation described above.

Next, in the transmission wave of the layered division multiplexing terrestrial digital broadcasting according to the present embodiment, in place of the bit of the main signal identification described above, an upper/lower layer identification bit may be used as one parameter of the TMCC information. Specifically, the upper/lower layer identification bit described above may be set to "1" in the TMCC information of the modulation wave to be transmitted by the upper layer, and the upper/lower layer identification bit described above may be set to "0" in the TMCC information of the transmission wave to be transmitted by the lower layer. Further, in a case where the received broadcast wave is not the advanced terrestrial digital broadcasting service, this parameter may be set to "1".

In the layered division multiplexing terrestrial digital broadcasting according to the present embodiment, here, in the generating process for the OFDM transmission wave at the broadcast station, with respect to a lower layer of a plurality of modulation waves originally transmitted by an upper layer and the lower layer of one physical channel, frequency conversion and signal amplification may be executed by the converter 201L illustrated in FIG. 2A depending upon installation environment of the broadcast receiving apparatus 100. In a case where the broadcast receiving apparatus 100 receives the transmission wave of the layered division multiplexing terrestrial digital broadcasting, it is possible to identify, on the basis of the upper/lower layer identification bit described above, whether it is the modulation wave originally transmitted by the upper layer, or the modulation wave transmitted by the lower layer. For example, by means of the identifying process, it is possible to execute the initial scan for the advanced terrestrial digital broadcasting service to be transmitted by the lower layer after the initial scan for the existing terrestrial digital broadcasting service to be transmitted by the upper layer is completed, and this makes it possible to reflect the settings of the initial scan for the existing terrestrial digital broadcasting service to the settings by the initial scan for the advanced terrestrial digital broadcasting service. Further, in the third tuner/demodulator 130L of the broadcast receiving apparatus 100, it is possible to use the identification result for switching between the demodulator 133S and the demodulator 133L.

Note that in description of the dual-polarized transmission method according to each embodiment described below, unless otherwise specified, an example in which the horizontal polarized wave is the main polarized wave and the vertical polarized wave is the sub polarized wave will be described as one example. However, with respect to the horizontal polarized wave and the vertical polarized wave, the relation between the main and the sub may be reversed.

FIG. 5I illustrates one example of bit allocation of the 4K signal transmission layer identification.

In a case where the broadcast wave to be transmitted is the transmission wave of the dual-polarized terrestrial digital broadcasting service according to the present embodiment, a bit of the 4K signal transmission layer identification may indicate for each of the B layer and the C layer whether transmission of the 4K broadcasting program is executed by using both the horizontal polarized signal and the vertical polarized signal or not. One bit is allocated to each of setting of the B layer and setting of the C layer. For example, in a case where the bit of the 4K signal transmission layer identification for each of the B layer and the C layer is "0", it may indicate that the transmission of the 4K broadcasting program is executed by using both the horizontal polarized signal and the vertical polarized signal in the layer. In a case where the bit of the 4K signal transmission layer identification for each of the B layer and the C layer is "1", it may indicate that transmission of the 4K broadcasting program using both the horizontal polarized signal and the vertical polarized signal in the layer is not executed. By configuring it in this manner, it is possible to identify whether the transmission of the 4K broadcasting program is executed by using both the horizontal polarized signal and the vertical polarized signal for each of the B layer and the C layer or not by using the bit of the 4K signal transmission layer identification in the broadcast receiving apparatus 100.

Further, in a case where the broadcast wave to be transmitted is a broadcast wave of the layered division multiplexing terrestrial digital broadcasting service according to the present embodiment, the bit of the 4K signal transmission layer identification may indicate whether transmission of the 4K broadcasting program by the lower layer is to be executed or not. In a case where B119 of this parameter is "0", transmission of the 4K broadcasting program by the lower layer is executed. In a case where B119 of this parameter is "1", transmission of the 4K broadcasting program by the lower layer is not executed. By configuring it in this manner, it is possible to identify whether the transmission of the 4K broadcasting program by the lower layer by using the bit of the 4K signal transmission layer identification or not in the broadcast receiving apparatus 100.

Note that in a case where this parameter is "0", it is possible to adopt a modulation method of NUC (Non-Uniform Constellation) in addition to a basic modulation method illustrated in FIG. 5C as the carrier modulation mapping method. In this case, it is possible to transmit the current information/next information of transmission parameter additional information regarding the B layer/C layer by using the AC1 and the like.

Further, in a case where the broadcast wave to be transmitted are not the advanced terrestrial digital broadcasting service, each of these parameters may be set to "1".

Note that the definition of "0" and "1" of the bit of the 4K signal transmission layer identification explained above may be the reverse of the explanation described above.

FIG. 5J illustrates one example of bit allocation of the additional layer transmission identification. A bit of the additional layer transmission identification may indicate that the broadcast wave to be transmitted is the dual-polarized terrestrial digital broadcasting service according to the present embodiment and whether each of the B layer and the C layer of the transmission wave to be transmitted by the sub polarized wave is used as a virtual D layer or a virtual E layer or not.

For example, in the example of FIG. 5J, a bit arranged in B120 is a D layer transmission identification bit. In a case where this parameter is "0", the B layer to be transmitted by the sub polarized wave is used as the virtual D layer. This means that to be expressed precisely, a group of segments each having the same segment number as the segment belonging to the B layer to be transmitted by the main polarized wave among the segments to be transmitted by the sub polarized wave is treated as the D layer that is a different layer from the B layer to be transmitted by the main polarized wave. In a case where this parameter is "1", the B layer to be transmitted by the sub polarized wave is not used as the virtual D layer, but is used as the B layer.

Further, for example, a bit arranged in B121 is an E layer transmission identification bit. In a case where this parameter is "0", the C layer to be transmitted by the sub polarized wave is used as the virtual E layer. This means that to be expressed precisely, a group of segments each having the same segment number as the segment belonging to the C layer to be transmitted by the main polarized wave among the segments to be transmitted by the sub polarized wave is treated as the E layer that is a different layer from the C layer to be transmitted by the main polarized wave. In a case where this parameter is "1", the C layer to be transmitted by the sub polarized wave is not used as the virtual E layer, but is used as the C layer.

By configuring it in this manner, it is possible to identify presence or absence of the D layer and the E layer to be transmitted by the sub polarized wave by using the bit of the additional layer transmission identification (at least one of the D layer transmission identification bit or the E layer transmission identification bit) in the broadcast receiving apparatus 100. Namely, in terrestrial digital broadcasting according to the present embodiment, by using a parameter of the additional layer transmission identification illustrated in FIG. 5J, it is possible to operate a new layer (in the example of FIG. 5J, the D layer and the E layer) beyond the number of layers that is limited to three layers including the A layer, the B layer, and the C layer in the existing terrestrial digital broadcasting.

Note that in a case where this parameter is "0", it is possible to differentiate parameters such as the carrier modulation mapping method illustrated in FIG. 5C, the code rate, or the length of the time interleaving between the virtual D layer/virtual E layer and the B layer/C layer. In this case, in a case where the current information/next information of the parameters such as the carrier modulation mapping method regarding the virtual D layer/virtual E layer, the convolution code rate, or the length of the time interleaving is transmitted by using AC information (for example, the AC1), it is possible to grasp the parameters such as the carrier modulation mapping method regarding the virtual D layer/virtual E layer, the convolution code rate, or the length of the time interleaving at the broadcast receiving apparatus 100 side.

Note that as a modification example, in a case where the bit of the additional layer transmission identification (at least one of the D layer transmission identification bit or the E layer transmission identification bit) is "0", it may be configured so that the transmission parameter of at least one of the B layer or the C layer of the current information/next information of the TMCC information to be transmitted by the sub polarized wave is switched to the meaning of the transmission parameter of at least one of the virtual D layer or the virtual E layer. In this case, in a case where at least one of the virtual D layer or the virtual E layer is used, the A layer, the B layer, and the C layer may be used in the main polarized wave, the transmission parameter of these layers may be transmitted by the current information/next information of the TMCC information to be transmitted by the main polarized wave. Further, the A layer, the D layer, and the E layer may be used in the sub polarized wave, and the transmission parameter of these layers may be transmitted by the current information/next information of the TMCC information to be transmitted by the sub polarized wave. Even in this case, it is possible to grasp the parameters such as the carrier modulation mapping method regarding the virtual D layer/virtual E layer, the convolution code rate, or the length of the time interleaving at the broadcast receiving apparatus 100 side.

Further, in a case where the broadcast wave to be transmitted is not the advanced terrestrial digital broadcasting service or in a case where the layered division multiplexing transmission method is used even in the advanced terrestrial digital broadcasting service, it may be configured so that this parameter is respectively set to "1".

Note that the parameter of the additional layer transmission identification may be stored in both the TMCC information of the main polarized wave and the TMCC information of the sub polarized wave. However, any of the processes described above can be realized so long as the parameter is stored at least in the TMCC information of the sub polarized wave.

Further, the definition of "0" and "1" of the bit of the additional layer transmission identification explained above may be the reverse of the explanation described above.

Note that in a case where a parameter of the 4K signal transmission layer identification described above indicates that transmission of the 4K broadcasting program is executed by the B layer, the broadcast receiving apparatus 100 may ignore the D layer transmission identification bit even though the D layer transmission identification bit described above indicates that the B layer is used as the virtual D layer. Similarly, in a case where the parameter of the 4K signal transmission layer identification indicates that the transmission of the 4K broadcasting program is executed by the C layer, the broadcast receiving apparatus 100 may be configured so as to ignore the E layer transmission identification bit even though the E layer transmission identification bit indicates that the C layer is used as the virtual E layer. By clarifying a priority order of the bits used in a determining process, it is possible to prevent conflict of the determining process in the broadcast receiving apparatus 100.

Further, in the broadcast wave to be transmitted, all of the bit of the frequency converting process identification described above, the bit of the physical channel number identification, the bit of the main signal identification, a bit of 4K signal transmission identification, and the bit of the additional layer transmission identification may be set to "1" in principle in a case where the parameter of the system identification described above is not "10". Even in a case where the parameter of the system identification is not "10" but exceptionally due to a certain problem, any of the bit of the frequency converting process identification, the bit of the physical channel number identification, the bit of the main signal identification, the bit of the 4K signal transmission identification, and the bit of the additional layer transmission identification is not "1", the broadcast receiving apparatus 100 may be configured so as to ignore the bit that is not "1", and determine that all of these bits are "1".

Further, in the advanced terrestrial digital broadcasting service of the dual-polarized transmission method, the TMCC information of the transmission wave to be transmitted by the horizontal polarized wave and the TMCC information of the transmission wave to be transmitted by the vertical polarized wave may be the same as each other, or may be different from each other. Similarly, in the advanced terrestrial digital broadcasting service of the layered division multiplexing transmission method, the TMCC information of the transmission wave to be transmitted by the upper layer and the TMCC information of the transmission wave to be transmitted by the lower layer may be the same as each other, or may be different from each other. Further, the parameter of the frequency converting process identification described above, the parameter of the main signal identification, the parameter of the additional layer transmission identification may be described only in the TMCC information of the transmission wave to be transmitted by the sub polarized wave or the transmission wave to be transmitted by the lower layer.

Note that in the explanation described above, the example in which the parameter of the frequency converting process identification, the parameter of the main signal identification, the parameter of the polarization direction identification, the parameter of the first signal/second signal identification, the parameter of the upper/lower layer identification, the parameter of the 4K signal transmission layer identification, and the parameter of the additional layer transmission identification are transmitted so as to be included in the TMCC signal (or the TMCC carrier) has been explained. However, these parameters may be transmitted so as to be included in the AC signal (or the AC carrier). Namely, these parameters may be transmitted by a signal of a carrier (such as the TMCC carrier or the AC carrier) modulated by a modulation method that executes mapping with a smaller number of states than that of the modulation method for the data carrier.

[AC Signal]

The AC signal is an additional information signal regarding the broadcast, and includes additional information or seismic motion warning information regarding a transmission control of a modulation wave. Note that the seismic motion warning information is transmitted by using an AC carrier with segment 0. On the other hand, the additional information regarding the transmission control of the modulation wave can be transmitted by using an arbitrary AC carrier. FIG. 6A illustrates one example of bit allocation of the AC signal. The AC signal is configured by 204 bits (B0 to B203). B0 is a demodulation reference signal for an AC symbol, and has a predetermined amplitude and a phase reference. B1 to B3 are signals for identifying a configuration of the AC signal. B4 to B203 are used for transmission of the additional information or transmission of the seismic motion warning information regarding the transmission control of the modulation wave.

FIG. 6B illustrates one example of bit allocation of configuration identification of the AC signal. In a case where the seismic motion warning information is transmitted by using B4 to B203 of the AC signal, this parameter is set to "001" or "110". A parameter of the configuration identification ("001" or "110") in case of transmission of the seismic motion warning information has the same code as leading three bits (B1 to B3) of a synchronization signal of the TMCC signal, and is sent out alternately for each frame at the same timing as the TMCC signal. Further, in a case where this parameter is a value other than the value described above, it indicates that the additional information regarding the transmission control of the modulation wave is transmitted by using B4 to B203 of the AC signal. The additional information regarding the transmission control of the modulation wave may be transmitted by using B4 to B203 of the AC signal. In this case, as the parameter of the configuration identification of the AC signal, "000" and "111", "010" and "101", or "011" and "100" are sent out alternately for each frame.

B4 to B203 of the AC signal are used for transmission of the additional information or transmission of the seismic motion warning information regarding the transmission control of the modulation wave.

The transmission of the additional information regarding the transmission control of the modulation wave may be executed by various bit configurations. For example, the frequency converting process identification, the physical channel number identification, the main signal identification, the 4K signal transmission layer identification, and the additional layer transmission identification, which have been described in the explanation of the TMCC signal, the bit of the additional information regarding the transmission control of the modulation wave of the AC signal may be allocated and transmitted in place of the TMCC signal or in addition to the TMCC signal. By configuring it in this manner, in the broadcast receiving apparatus 100, it is possible to execute various kinds of identifying processes using these parameters, which have already been described in the explanation of the TMCC signal. Further, the current/next information of the transmission parameter additional information regarding the transmission layer of the 4K broadcasting program when any parameter of the 4K signal transmission layer identification is "0" or the transmission parameter regarding the virtual D layer/virtual E layer when any parameter of the additional layer transmission identification is "0" may be allocated. By configuring it in this manner, in the broadcast receiving apparatus 100, it is possible to obtain the transmission parameter of each layer by using these parameters, and this makes it possible to control the demodulating process for each layer.

Transmission of the seismic motion warning information may be executed by bit allocation illustrated in FIG. 6C. The seismic motion warning information is configured by a synchronization signal, a start/end flag, update flag, signal identification, seismic motion warning detailed information, CRC, and parity bits. The synchronization signal is configured by a code with 13 bits, and has the same code as 13 bits (B4 to B16) obtained by removing the leading three bits from the synchronization signal of the TMCC signal. In a case where the configuration identification of the AC signal indicates that the seismic motion warning information is to be transmitted, a code with 16 bits obtained by combining the configuration identification with the synchronization signal becomes the same synchronization words with 16 bits as the synchronization signal of the TMCC. The start/end flag is configured by a code with two bits as a flag of start timing/end timing of the seismic motion warning information. The start/end flag is changed from "11" to "00" when sending of the seismic motion warning information is started, and is changed from "00" to "11" when the sending of the seismic motion warning information is ended. The update flag is configured by a code with two bits, and is increased by "1" using "00" as an initial value every time the content of a series of seismic motion warning detailed information to be transmitted when the start/end flag is "00" is changed. After "11", it returns to "00". In a case where the start/end flag is "11", the update flag is also "11".

FIG. 6D illustrates one example of bit allocation of the signal identification. The signal identification is configured by a code of three bits, and is used for identifying a type of the seismic motion warning detailed information. In a case where this parameter is "000", it means the "seismic motion warning detailed information (there is a corresponding region)". In a case where this parameter is "001", it means the "seismic motion warning detailed information (there is no corresponding region)". In a case where this parameter is "010", it means "a test signal of the seismic motion warning detailed information (there is a corresponding region)". In a case where this parameter is "011", it means "the test signal of the seismic motion warning detailed information (there is no corresponding region)". In a case where this parameter is "111", it means "no seismic motion warning detailed information". Note that in a case where the start/end flag is "00", the signal identification becomes any of "000", "001", "010", and "011". In a case where the start/end flag is "11", the signal identification becomes "111".

The seismic motion warning detailed information is configured by a code with 88 bits. In a case where the signal identification is any of "000", "001", "010", and "011", information such as information regarding a current time when the seismic motion warning information is sent out, information indicating a region that becomes a target of seismic motion warning, or latitude/longitude/earthquake intensity of a seismic center of earthquake that becomes a target of the seismic motion warning is transmitted as the seismic motion warning detailed information. FIG. 6E illustrates one example of bit allocation of the seismic motion warning detailed information in a case where the signal identification is any of "000", "001", "010", and "011". Further, in a case where the signal identification is "111", it is possible to transmit a code or the like for identifying a broadcaster by using a bit of the seismic motion warning detailed information. FIG. 6F illustrates one example of bit allocation of the seismic motion warning detailed information in a case where the signal identification is "111".

The CRC is a code generated by using a predetermined generator polynomial with respect to B21 to B111 of the seismic motion warning information. The parity bit is a code generated by a shortened code (187, 105) of a difference set cyclic code (273, 191) with reference to B17 to B121 of the seismic motion warning information.

In the broadcast receiving apparatus 100, it is possible to execute various kinds of controls for addressing an emergency situation by using the parameters regarding the seismic motion warning, which have been described in FIG. 6C, FIG. 6D, FIG. 6E, and FIG. 6F. For example, it is possible to execute a presentation control of information regarding the seismic motion warning, a control to switch display content with low priority into display regarding the seismic motion warning, and a control to terminate display of an application and switch into display regarding the seismic motion warning or broadcasting program video.

FIG. 6G illustrates one example of bit allocation of the additional information regarding the transmission control of the modulation wave. The additional information regarding the transmission control of the modulation wave is configured by the synchronization signal, the current information, the next information, and the parity bit. The synchronization signal is configured by a code with 13 bits, and has the same code as 13 bits (B4 to B16) obtained by removing the leading three bits from the synchronization signal of the TMCC signal. In a case where the configuration identification of the AC signal indicates that the additional information regarding the transmission control of the modulation wave is to be transmitted, a code with 16 bits obtained by combining the configuration identification and the synchronization signal becomes synchronization words with 16 bits equivalent to the synchronization signal of the TMCC. The current information indicates current information of the transmission parameter additional information when the 4K broadcasting program is transmitted by the B layer or the C layer and the transmission parameter regarding the virtual D layer or the virtual E layer. The next information indicates information after switching of the transmission parameter additional information when the 4K broadcasting program is transmitted by the B layer or the C layer and the transmission parameter regarding the virtual D layer or the virtual E layer.

In the example of FIG. 6G, B18 to B30 of the current information are current information of the B layer transmission parameter additional information, and indicate current information of the transmission parameter additional information when the 4K broadcasting program is to be transmitted by the B layer. Further, B31 to B43 of the current information are current information of the C layer transmission parameter additional information, and indicate current information of the transmission parameter additional information when the 4K broadcasting program is to be transmitted by the C layer. Further, B70 to B82 of the next information are information after switching of the transmission parameters of the B layer transmission parameter additional information, and indicate information after switching of the transmission parameters of the transmission parameter additional information when the 4K broadcasting program is to be transmitted by the B layer. Further, B83 to B95 of the next information are information after switching of the transmission parameters of the C layer transmission parameter additional information, and indicate information after switching of the transmission parameters of the transmission parameter additional information when the 4K broadcasting program is to be transmitted by the C layer. Here, the transmission parameter additional information is a transmission parameter regarding modulation, which is added to the transmission parameter of the TMCC information illustrated in FIG. 5C to extend the specifications. The concrete content of the transmission parameter additional information will be described later.

In the example illustrated in FIG. 6G, B44 to B56 of the current information are current information of the transmission parameter for the virtual D layer in a case where the virtual D layer is operated. B57 to B69 of the current information are current information of the transmission parameter for the virtual E layer in a case where the virtual E layer is operated. Further, B96 to B108 of the next information are information after switching of the transmission parameters for the virtual D layer in a case where the virtual D layer is operated. B109 to B121 of the current information are information after switching of the transmission parameters for the virtual E layer in a case where the virtual E layer is operated. The parameters stored in the transmission parameter for the virtual D layer and the transmission parameter for the virtual E layer may be the similar to those illustrated in FIG. 5C.

The virtual D layer and the virtual E layer are layers that do not exist in the existing terrestrial digital broadcasting. It is not easy to increase the number of bits of the TMCC information illustrated in FIG. 5B because it is necessary to maintain compatibility with the existing terrestrial digital broadcasting. Therefore, in the embodiment according to the present invention, the transmission parameters for the virtual D layer and the virtual E layer are not stored in the TMCC information, but are stored in the AC information as illustrated in FIG. 6G.

This makes it possible to transmit, to the receiving apparatus, information on modulation for the new virtual D layer and the new virtual E layer while maintaining compatibility of the TMCC information with the existing terrestrial digital broadcasting. As a result, in the broadcast wave of the dual-polarized terrestrial digital broadcasting service according to the present embodiment, in a case where the B layer/C layer of the transmission wave to be transmitted by the sub polarized wave is used as the virtual D layer/virtual E layer, it is possible to set the transmission parameter of the virtual D layer/virtual E layer of the transmission wave to be transmitted by the sub polarized wave so as to be differentiated from the transmission parameter of the B layer/C layer of the transmission wave to be transmitted by the main polarized wave.

Note that in a case where the virtual D layer or the virtual E layer is not used, information on the transmission parameter for the unused layer may be ignored by the broadcast receiving apparatus 100 without any problem. For example, in a case where the parameter of the additional layer transmission identification of the TMCC information illustrated in FIG. 5J indicates "1" for the virtual D layer or the virtual E layer (in a case where it indicates that the virtual D layer/virtual E layer is not used), the broadcast receiving apparatus 100 may be configured so as to ignore the information on the transmission parameter even though any value is contained in the transmission parameter illustrated in FIG. 6G for the unused virtual D layer or the unused virtual E layer.

Next, details of the transmission parameter additional information, which has been explained with reference to FIG. 6G, will be described.

FIG. 6H illustrates one concrete example of the transmission parameter additional information. it is possible to contain a parameter of an error correcting method, a parameter of a constellation form, and the like in the transmission parameter additional information.

The error correcting method indicates setting of what kind of coding method is used as the error correcting method for the inner code and the outer code when the 4K broadcasting program (the advanced terrestrial digital broadcasting service) is to be transmitted by the B layer or the C layer. FIG. 6I illustrates one example of bit allocation of the error correcting method. In a case where this parameter is "000", a convolution code is used as the inner code and a shortened RS code is used as the outer code when the 4K broadcasting program is to be transmitted by the B layer or the C layer. In a case where this parameter is "001", the LDPC code is used as the inner code and the BCH code is used as the outer code when the 4K broadcasting program is to be transmitted by the B layer and the C layer. Moreover, the other combinations may be set so that they can be selected.

Further, when the 4K broadcasting program is transmitted by the B layer and the C layer, it is possible to adopt not only a uniform constellation but also a non-uniform constellation (Non Uniform Constellation: NUC) as the carrier modulation mapping method. FIG. 6J illustrates one example of bit allocation of the constellation form. In a case where this parameter is "000", the carrier modulation mapping method selected in the transmission parameter of the TMCC information is applied to the uniform constellation. In a case where this parameter is any of "001" to "111", the carrier modulation mapping method selected in the transmission parameter of the TMCC information is applied to the non-uniform constellation. Note that in a case where the non-uniform constellation is to be applied, the optimum value of the non-uniform constellation differs depending upon the type of the error correcting method and a code rate thereof. Therefore, in a case where the parameter of the constellation form is any of "001" to "111", the broadcast receiving apparatus 100 according to the present embodiment may determine the non-uniform constellation used in the demodulating process on the basis of the parameter of the carrier modulation mapping method, the parameter of the error correcting method, and the parameter of the code rate thereof. This determination may be made by referring to a predetermined table that the broadcast receiving apparatus 100 stores in advance.

[Transmission Method 1 of Advanced Terrestrial Digital Broadcasting Service]

In order to realize 4K (3840 horizontal pixels×2160 vertical pixels) broadcasting while maintaining viewing environment of the existing terrestrial digital broadcasting service, the dual-polarized transmission method will be described as one example of the transmission method of the advanced terrestrial digital broadcasting service according to the embodiment of the present invention. The dual-polarized transmission method according to the embodiment of the present invention is a method that has specifications common to some specifications of the existing terrestrial digital broadcasting method. For example, 13 segments in about 6 MHz band corresponding to one physical channel are divided, and seven segments, five segments, and one segment are respectively allocated to transmission of a 2K (1920 horizontal pixels×1080 vertical pixels) broadcasting program, transmission of a 4K broadcasting program, and mobile reception (so-called one-segment broadcasting). Moreover, the five segments for the 4K broadcasting use not only the horizontal polarized signal but also the vertical polarized signal to secure a transmission capacity for total ten segments by a MIMO (Multiple-Input Multiple-Output) technique. Note that the 2K broadcasting program maintains image quality by optimizing the latest MPEG-2 Video compression technique, and can be received even by an existing television receiver. For the 4K broadcasting program, image quality is secured by optimization of a more high-efficient HEVC compression technique than MPEG-2 Video and multi-valued modulation. Note that the number of segments allocated for each broadcast may be different from the above.

Figure 7A:
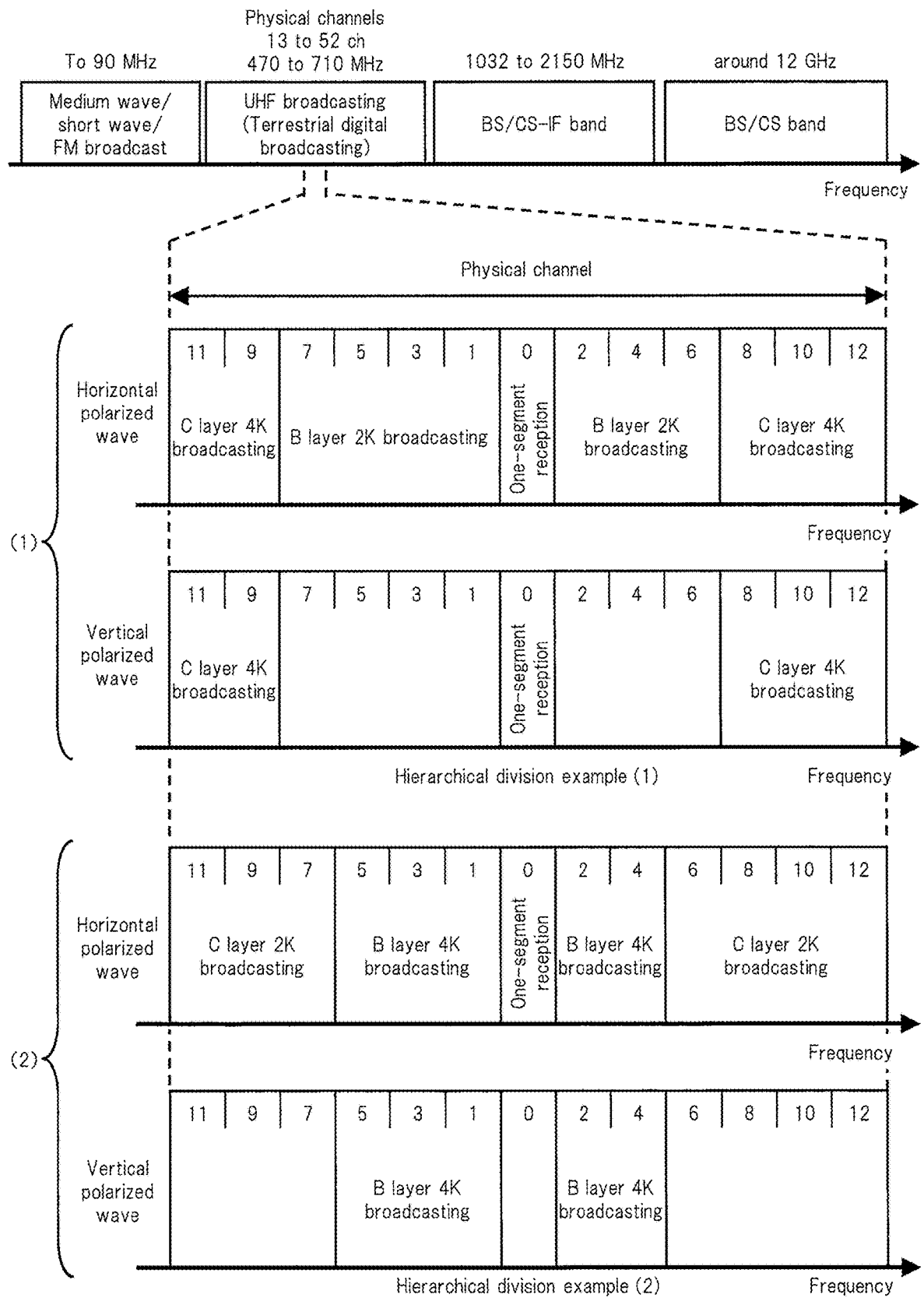
FIG. 7A is a diagram for explaining a dual-polarized transmission method according to one embodiment of the present invention.

FIG. 7A illustrates one example of the dual-polarized transmission method in the advanced terrestrial digital broadcasting service according to the embodiment of the present invention. A frequency band of 470 to 710 MHz is used for transmission of the broadcast wave of the terrestrial digital broadcasting service. The number of physical channels in the frequency band is 40 channels of 13 to 52 ch, each of the physical channels has a bandwidth of 6 MHz. In the dual-polarized transmission method according to the embodiment of the present invention, both the horizontal polarized signal and the vertical polarized signal are used in one physical channel.

FIG. 7A illustrates two examples of (1) and (2) as an allocation example of 13 segments. In the example of (1), transmission of a 2K broadcasting program is executed by using segments 1 to 7 (the B layer) of the horizontal polarized signal. Transmission of a 4K broadcasting program is executed by using total ten segments of segments 8 to 12 (the C layer) of the horizontal polarized signal and segments 8 to 12 (the C layer) of the vertical polarized signal. The segments 1 to 7 (the B layer) of the vertical polarized signal may be used for transmission of the same broadcasting program as the 2K broadcasting program to be transmitted by the segments 1 to 7 (the B layer) of the horizontal polarized signal. Alternatively, the segments 1 to 7 (the B layer) of the vertical polarized signal may be used for transmission of a different broadcasting program from the 2K broadcasting program to be transmitted by the segments 1 to 7 (the B layer) of the horizontal polarized signal. Alternatively, the segments 1 to 7 (the B layer) of the vertical polarized signal may be used for the other data transmission, or may not be used. Identification information of how to use the segments 1 to 7 (the B layer) of the vertical polarized signal can be transmitted to the receiving apparatus side by the parameter of the 4K signal transmission layer identification or the parameter of the additional layer transmission identification of the TMCC signal, which has already been explained. In the broadcast receiving apparatus 100, it is possible to identify handling of the segments 1 to 7 (the B layer) of the vertical polarized signal by these parameters. Further, the 2K broadcasting program to be transmitted by using the B layer of the horizontal polarized signal and the 4K broadcasting program to be transmitted by using the C layers of both horizontal/vertical polarized signals may be simultaneous broadcasting (simulcast) in which a broadcasting program with the same content is transmitted with different resolutions, or may be one in which a broadcasting program with different content is transmitted. In the segment 0 of both horizontal/vertical polarized signals, transmission of the same one-segment broadcasting program is executed.

The example illustrated in (2) of FIG. 7A is a modification example different from (1). In the example of (2), transmission of a 4K broadcasting program is executed by using total ten segments of segments 1 to 5 (the B layer) of the horizontal polarized signal and segments 1 to 5 (the B layer) of the vertical polarized signal. Transmission of a 2K broadcasting program is executed by using segments 6 to 12 (the C layer) of the horizontal polarized signal. Even in the example of (2), the segments 6 to 12 (the C layer) of the vertical polarized signal may be used for transmission of the same broadcasting program as the 2K broadcasting program to be transmitted by the segments 6 to 12 (the C layer) of the horizontal polarized signal. The segments 6 to 12 (the C layer) of the vertical polarized signal may be used for transmission of a different broadcasting program from the 2K broadcasting program to be transmitted by the segments 6 to 12 (the C layer) of the horizontal polarized signal. Further, the segments 6 to 12 (the C layer) of the vertical polarized signal may be used for the other data transmission, or may not be used. These kinds of identification information are similar to those in the example of (1). For this reason, repeated explanation thereof is omitted.

Note that in any of the examples illustrated in (1) and (2) of FIG. 7A, a case where the horizontal polarized wave is the main polarized wave has been described as an example, but the horizontal polarized wave and the vertical polarized wave may be reversed depending upon the operation thereof.

Figure 7B:
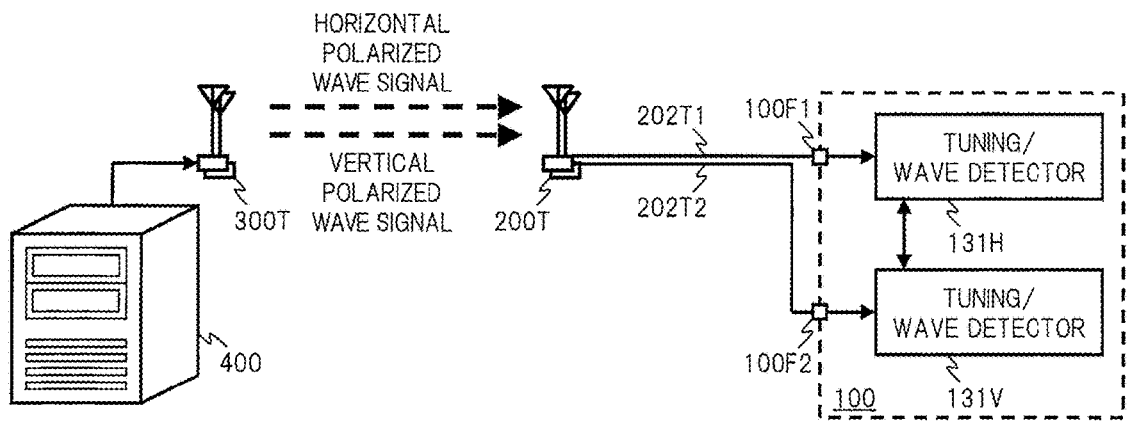
FIG. 7B is a system configuration diagram of the broadcasting system using the dual-polarized transmission method according to one embodiment of the present invention.

FIG. 7B illustrates one example of a configuration of a broadcasting system for the advanced terrestrial digital broadcasting service using the dual-polarized transmission method according to the embodiment of the present invention. This illustrates both a system at a transmission side and a system at a reception side of the advanced terrestrial digital broadcasting service using the dual-polarized transmission method. A configuration of the broadcasting system of the advanced terrestrial digital broadcasting service using the dual-polarized transmission method is basically similar to the configuration of the broadcasting system illustrated in FIG. 1. However, a radio tower 300T that is facility of the broadcast station is a dual polarized transmission antenna capable of sending out the horizontal polarized signal and the vertical polarized signal at the same time. Further, in the example of FIG. 7B, only the tuning/wave detector 131H and the tuning/wave detector 131V of the second tuner/demodulator 130T in the broadcast receiving apparatus 100 are extracted and illustrated, and the other operating units are omitted.

The horizontal polarized signal sent out from the radio tower 300T is received by a horizontal polarized wave receiving element of the antenna 200T that is a dual polarized reception antenna, and is inputted into the tuning/wave detector 131H from a connector 100F1 via a coaxial cable 202T1. On the other hand, the vertical polarized signal sent out from the radio tower 300T is received by a vertical polarized wave receiving element of the antenna 200T, and is inputted into the tuning/wave detector 131V from a connector 100F2 via a coaxial cable 202T2. An F type connector is generally used as a connector that connects an antenna (for example, a coaxial cable) and a television receiver.

Here, the user may mistakenly connect the coaxial cable 202T1 to the connector 100F2, and connect the coaxial cable 202T2 to the connector 100F1. In this case, in the tuning/wave detector 131H and the tuning/wave detector 131V, there is a possibility that a defect such as being unable to identify whether the inputted broadcasting signal is the horizontal polarized signal or the vertical polarized signal. In order to prevent the defect described above, it is considered that one of the connectors each of which connects the antenna (coaxial cable) to the television receiver, for example, the connector between the coaxial cable 202T2 and the connector 100F2 via which the vertical polarized signal is to be transmitted is a connector with a different shape other than that of the F type connector of the connector between the coaxial cable 202T1 and the connector 100F1 via which the horizontal polarized signal is to be transmitted. Alternatively, each of the tuning/wave detector 131H and the tuning/wave detector 131V may refer to the main signal identification of the TMCC information of each input signal to control the operation thereof so as to identify whether the inputted broadcasting signal is the horizontal polarized signal or the vertical polarized signal.

Figure 7C:
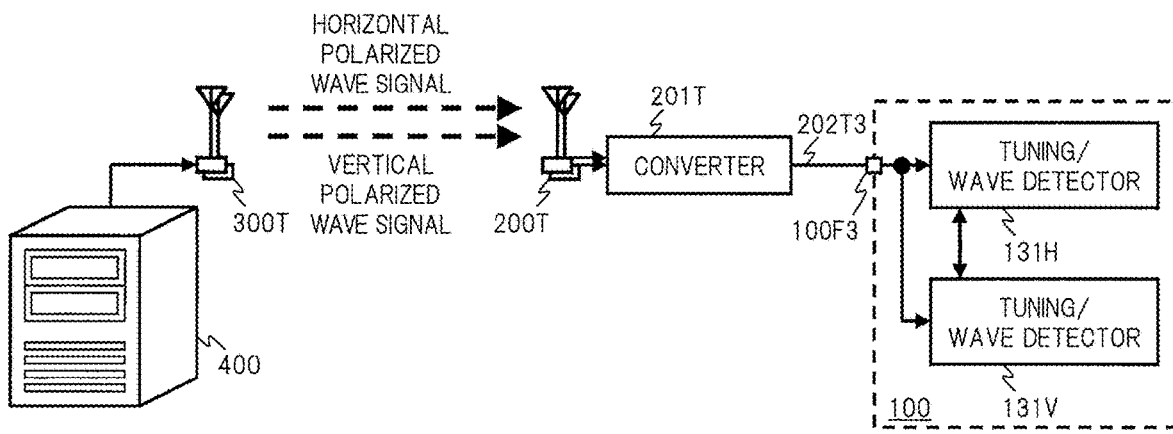
FIG. 7C is a system configuration diagram of the broadcasting system using the dual-polarized transmission method according to one embodiment of the present invention.

FIG. 7C illustrates one example of a configuration example different from the configuration of the broadcasting system described above for the advanced terrestrial digital broadcasting service using the dual-polarized transmission method according to the embodiment of the present invention. The configuration as illustrated in FIG. 7B in which the broadcast receiving apparatus 100 includes two connectors for inputting broadcasting signals and two coaxial cables are used to connect the antenna 200T to the broadcast receiving apparatus 100 may not always be suitable for the cost of facility and handling at the time of cable wiring. Therefore, in the configuration illustrated in FIG. 7C, the horizontal polarized signal received by the horizontal polarized wave receiving element of the antenna 200T and the vertical polarized signal received by the vertical polarized wave receiving element of the antenna 200T are inputted into the converter (converting unit) 201T, and connection between the converter 201T and the broadcast receiving apparatus 100 is executed by a single coaxial cable 202T3. A broadcasting signal inputted from a connector 100F3 is demultiplexed and inputted into the tuning/wave detector 131H and the tuning/wave detector 131V. The connector 100F3 may have a function to supply operating power to the converter 201T.

The converter 201T may belong to facility in an environment (for example, an apartment house or the like) in which the broadcast receiving apparatus 100 is installed. Alternatively, the converter 201T may be configured as a device integrated with the antenna 200T, and installed in a house or the like. The converter 201T executes a frequency converting process for any one of the horizontal polarized signal received by the horizontal polarized wave receiving element of the antenna 200T and the vertical polarized signal received by the vertical polarized wave receiving element of the antenna 200T. By this process, the horizontal polarized signal and the vertical polarized signal transmitted from the radio tower 300T to the antenna 200T can be separated into different frequency bands from each other by using the horizontal polarized wave and the vertical polarized wave of the same frequency band, and may be transmitted to the broadcast receiving apparatus 100 by the single coaxial cable 202T3 at the same time. Note that if necessary, the frequency converting process may be executed for both the horizontal polarized signal and the vertical polarized signal, but in this case, the frequency bands of the both after frequency conversion have to be different from each other. Further, the broadcast receiving apparatus 100 may include one connector 100F3 for inputting the broadcasting signal.

Figure 7D:
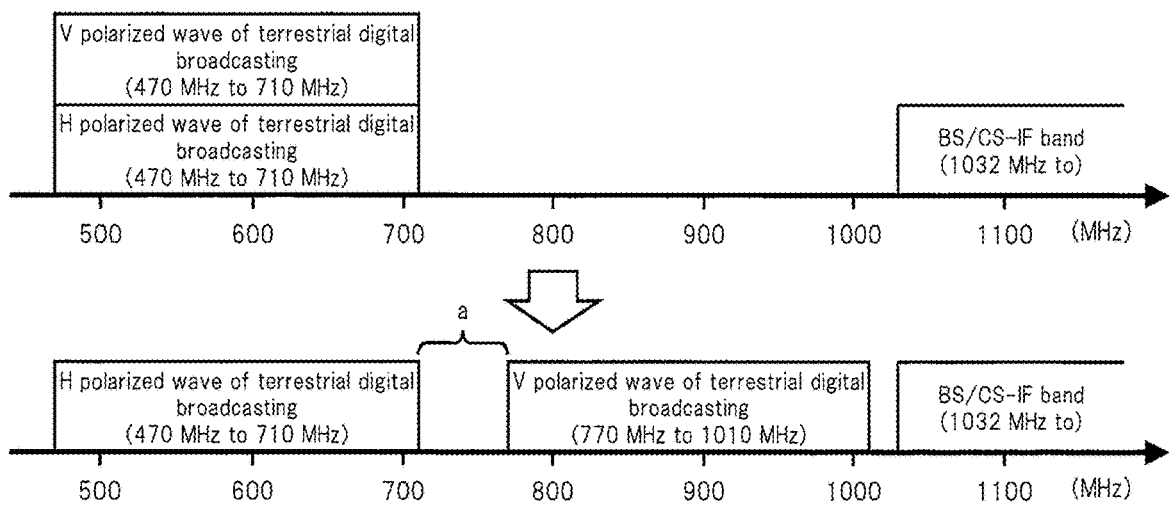
FIG. 7D is a diagram for explaining a frequency converting process according to one embodiment of the present invention.

FIG. 7D illustrates one example of the frequency converting process. In this example, the frequency converting process is executed for the vertical polarized signal. Specifically, of a horizontal polarized signal and a vertical polarized signal transmitted by a frequency band of 470 to 710 MHz (that is, a band corresponding to 13 ch to 52 ch of UHF), a frequency band of the vertical polarized signal is converted from the frequency band of 470 to 710 MHz to a frequency band of 770 to 1010 MHz. By this process, it is possible to transmit signals transmitted by using the horizontal polarized wave and the vertical polarized wave with the same frequency band to the broadcast receiving apparatus 100 through the coaxial cable 202T3 at the same time without interfering with each other. Note that the frequency converting process may be executed for the horizontal polarized signal.

Further, it is preferable that the frequency converting process is executed for the signal transmitted by the sub polarized wave in accordance with a result obtained by referring to the main signal identification of the TMCC information. As explained with reference to FIG. 5H, the signal transmitted by the main polarized wave is more likely to be transmitted so as to include the existing terrestrial digital broadcasting service compared with the signal transmitted by the sub polarized wave. Therefore, in order to maintain compatibility with the existing terrestrial digital broadcasting service more suitably, it is preferable that a frequency of the signal transmitted by the main polarized wave is not converted, but a frequency of the signal transmitted by the sub polarized wave is converted.

Further, in a case where the frequency of the signal transmitted by the sub polarized wave is converted, it is desirable that a frequency band of the signal transmitted by the sub polarized wave is set to be higher than a frequency band of the signal transmitted by the main polarized wave in the signals after conversion. As a result, by starting a scan from a low frequency side and causing the scan to proceed to a high frequency side in the initial scan of the broadcast receiving apparatus 100, it is possible to execute the initial scan for the signal transmitted by the main polarized wave prior to that for the signal transmitted by the sub polarized wave. This makes it possible to execute a process of reflecting settings by the initial scan of the existing terrestrial digital broadcasting service to settings by the initial scan of the advanced terrestrial digital broadcasting service more suitably.

Further, the frequency converting process may be executed for all physical channels used in the advanced terrestrial digital broadcasting service, but may be executed only for a physical channel using signal transmission by the dual-polarized transmission method.

Note that it is preferable that the frequency band after conversion by the frequency converting process is between 710 and 1032 MHz. Namely, in a case where the terrestrial digital broadcasting service and a BS/CS digital broadcasting service are to be received at the same time, it is conceivable that the broadcasting signal of the terrestrial digital broadcasting service received by the antenna 200T and the broadcasting signal of the BS/CS digital broadcasting service received by the antenna 200B are mixed and transmitted to the broadcast receiving apparatus 100 with a single coaxial cable. In this case, a BS/CS-IF signal uses a frequency band of about 1032 to 2150 MHz. For this reason, by setting the frequency band after conversion by the frequency converting process to be between 710 and 1032 MHz, it becomes possible to avoid interference between the broadcasting signal of the terrestrial digital broadcasting service and the broadcasting signal of the BS/CS digital broadcasting service while avoiding interference between the horizontal polarized signal and the vertical polarized signal. Further, in case of considering reception of a retransmission broadcasting signal by a cable television (Community Antenna TV or Cable TV: CATV) station, a frequency band of 770 MHz or less (a band corresponding to 62 ch or less of the UHF) is used in television broadcasting distribution by the cable television station. For this reason, it is more preferable that the frequency band after conversion by the frequency converting process is set to be between 770 and 1032 MHz, which exceeds the band corresponding to 62 ch of the UHF.

Further, it is preferable that a bandwidth of a range between the frequency band before conversion by the frequency converting process and the frequency band after conversion (that is, "a" portion in FIG. 7D) is set to be an integral multiple of the bandwidth (6 MHz) of one physical channel. By configuring it in this manner, in the broadcast receiving apparatus 100, there is an advantage that a frequency setting control becomes easy in a case where a frequency of the broadcasting signal of the frequency band before conversion by the frequency converting process and a frequency of the broadcasting signal of the frequency band after conversion are collectively scanned.

Note that as described above, in the dual-polarized transmission method according to the embodiment of the present invention, both the horizontal polarized signal and the vertical polarized signal are used for transmission of the 4K broadcasting program. Therefore, in order to reproduce the 4K broadcasting program correctly, it is necessary for the reception side to correctly grasp a combination of physical channels between the broadcasting signal transmitted by the horizontal polarized wave and the broadcasting signal transmitted by the vertical polarized wave. Even in a case where the frequency converting process is executed and the broadcasting signal transmitted by the horizontal polarized wave and the broadcasting signal transmitted by the vertical polarized wave for the same physical channel are inputted into the receiving apparatus as signals of different frequency bands, in the broadcast receiving apparatus 100 according to the present embodiment, by appropriately referring to the parameters of the TMCC information illustrated in FIG. 5F to FIG. 5J (for example, the main signal identification and the physical channel number identification), it is possible to correctly grasp the combination of the broadcasting signal transmitted by the horizontal polarized wave and the broadcasting signal transmitted by the vertical polarized wave for the same physical channel. This makes it possible to suitably receive, demodulate, and reproduce the 4K broadcasting program in the broadcast receiving apparatus 100 according to the present embodiment.

Note that in any of the examples illustrated in FIG. 7B, FIG. 7C, and FIG. 7D, a case where the horizontal polarized wave is the main polarized wave has been described as an example, but the horizontal polarized wave and the vertical polarized wave may be reversed depending upon the operation thereof.

Note that as described above, the broadcast wave of the terrestrial digital broadcasting to be transmitted by the dual-polarized transmission method explained above can be received and reproduced by the second tuner/demodulator 130T of the broadcast receiving apparatus 100, but is received even by the first tuner/demodulator 130C of the broadcast receiving apparatus 100. In a case where the broadcast wave of the terrestrial digital broadcasting is received by the first tuner/demodulator 130C, the broadcasting signal transmitted by the layer for the advanced terrestrial digital broadcasting service of the broadcasting signals of the broadcast wave of the terrestrial digital broadcasting is ignored, but the broadcasting signal transmitted by the layer for the existing terrestrial digital broadcasting service is reproduced.

<Pass-Through Transmission Method of Advanced Terrestrial Digital Broadcasting Service>

The broadcast receiving apparatus 100 can receive a signal transmitted by a pass-through transmission method. The pass-through transmission method is a method in which a broadcasting signal received by the cable television station or the like is sent out to a distribution system of a CATV at the same frequency or via frequency conversion by a signal method as it is.

The pass-through transmission method includes: (1) a method of executing transmission signal band extraction and level adjustment for each terrestrial digital broadcasting signal outputted from a terrestrial reception antenna, and transmitting the terrestrial digital broadcasting signal to a CATV facility at the same frequency as a transmission signal frequency; and (2) a method of executing the transmission signal band extraction and the level adjustment for each terrestrial digital broadcasting signal outputted from the terrestrial reception antenna, and transmitting the terrestrial digital broadcasting signal to the CATV facility at a frequency for any of a VHF band, a MID band, a SHB band, and a UHF band, which is set by a CATV facility manager. Equipment constituting a reception amplifier for executing signal processing of the first method or equipment constituting a reception amplifier and a frequency converter for executing signal processing of the second method is an OFDM signal processor (OFDM Signal Processor: OFDM-SP).

FIG. 7E illustrates one example of a system configuration in a case where the first method of the pass-through transmission method is applied to the advanced terrestrial digital broadcasting service of the dual-polarized transmission method. FIG. 7E illustrates a headend facility 400C and the broadcast receiving apparatus 100 of the cable television station. Further, FIG. 7F illustrates one example of the frequency converting process at that time. A notation (H/V) in FIG. 7F indicates a state where both a broadcasting signal transmitted by a horizontal polarized wave and a broadcasting signal transmitted by a vertical polarized wave are broadcasting signals that exist in the same frequency band. A notation (H) indicates the broadcasting signal transmitted by the horizontal polarized wave, and a notation (V) indicates the broadcasting signal transmitted by the vertical polarized wave. Notations in FIG. 7H and FIG. 7I described below respectively have the similar meanings.

In a case where the pass-through transmission of the first method is applied to the advanced terrestrial digital broadcasting service of the dual-polarized transmission method according to the embodiment of the present invention, the transmission signal band extraction and the level adjustment are executed for the broadcasting signal transmitted by the horizontal polarized wave in the headend facility 400C of the cable television station, and the broadcasting signal is sent out at the same frequency as the transmission signal frequency. On the other hand, the transmission signal band extraction and the level adjustment are executed for the broadcasting signal transmitted by the vertical polarized wave in the headend facility 400C of the cable television station, and the broadcasting signal is sent out after the similar frequency converting process to that described with reference to FIG. 7D (that is, the process of converting the broadcasting signal transmitted by the vertical polarized wave into a frequency band higher than the frequency band of 470 to 770 MHz, which is the band corresponding to 13 ch to 62 ch of the UHF) is executed. This process causes frequency bands of the broadcasting signal transmitted by the horizontal polarized wave and the broadcasting signal transmitted by the vertical polarized wave not to be overlapped. For this reason, signal transmission by one coaxial cable (or one optical fiber cable) becomes possible. The transmitted signal can be received by the broadcast receiving apparatus 100 according to the present embodiment. A process of receiving and demodulating the broadcasting signal transmitted by the horizontal polarized wave and the broadcasting signal transmitted by the vertical polarized wave included in the signal by the broadcast receiving apparatus 100 according to the present embodiment is similar to that described with reference to FIG. 7D. For this reason, repeated explanation thereof is omitted.

FIG. 7G illustrates one example of a system configuration in a case where the second method of the pass-through transmission method is applied to the advanced terrestrial digital broadcasting service of the dual-polarized transmission method. FIG. 7G illustrates the headend facility 400C and the broadcast receiving apparatus 100 of the cable television station. Further, FIG. 7H illustrates one example of the frequency converting process at that time.

In a case where the pass-through transmission of the second method is applied to the advanced terrestrial digital broadcasting service of the dual-polarized transmission method according to the embodiment of the present invention, the transmission signal band extraction and the level adjustment are executed for the broadcasting signal transmitted by the horizontal polarized wave in the headend facility 400C of the cable television station, and the broadcasting signal is sent out after the frequency converting process into the frequency set by the CATV facility manager is executed. On the other hand, the transmission signal band extraction and the level adjustment are executed for the broadcasting signal transmitted by the vertical polarized wave in the headend facility 400C of the cable television station, and the broadcasting signal is sent out after the similar frequency converting process to that described with reference to FIG. 7D (that is, the process of converting the broadcasting signal transmitted by the vertical polarized wave into the frequency band higher than the frequency band of 470 to 770 MHz, which is the band corresponding to 13 ch to 62 ch of the UHF) is executed. The frequency converting process illustrated in FIG. 7H is different from that illustrated in FIG. 7F, and is one in which the frequency of the broadcasting signal transmitted by the horizontal polarized wave is converted so as to be rearranged in a range of 90 to 770 MHz, which is expanded to a lower frequency band without limiting the frequency band of 470 to 770 MHz that is the band of 13 ch to 62 ch of the UHF. This process causes frequency bands of the broadcasting signal transmitted by the horizontal polarized wave and the broadcasting signal transmitted by the vertical polarized wave not to be overlapped. For this reason, signal transmission by one coaxial cable (or one optical fiber cable) becomes possible. The transmitted signal can be received by the broadcast receiving apparatus 100 according to the present embodiment. A process of receiving and demodulating the broadcasting signal transmitted by the horizontal polarized wave and the broadcasting signal transmitted by the vertical polarized wave included in the signal by the broadcast receiving apparatus 100 according to the present embodiment is similar to that described with reference to FIG. 7D. For this reason, repeated explanation thereof is omitted.

Further, as another modification example of the frequency converting process for the headend facility 400C of the cable television station illustrated in FIG. 7G, the broadcasting signal at the time of pass-through output after the frequency conversion may be changed into any of states respectively illustrated in FIG. 7H and FIG. 7I. In this case, the transmission signal band extraction and the level adjustment may be executed for both the broadcasting signal transmitted by the horizontal polarized wave and the broadcasting signal transmitted by the vertical polarized wave, and the broadcasting signals may be sent out after the frequency converting process into the frequency set by the CATV facility manager is executed. In the example of FIG. 7I, frequency conversion is executed so that both the broadcasting signal transmitted by the horizontal polarized wave and the broadcasting signal transmitted by the vertical polarized wave are rearranged in a range of 90 to 770 MHz (that is, a range from VHF 1 ch to UHF 62 ch). Since any frequency band of a range that exceeds UHF 62 ch is not used, frequency band utilization efficiency of the broadcasting signal can be heightened compared with the case illustrated in FIG. 7H.

Further, the band in which the broadcasting signals are rearranged is wider than the frequency band of 470 to 710 MHz that is the band of 13 ch to 52 ch of the UHF at the time of reception by the antenna, as illustrated in the example of FIG. 7I, it is possible to alternately rearrange the broadcasting signal transmitted by the horizontal polarized wave and the broadcasting signal transmitted by the vertical polarized wave. At this time, as illustrated in the example of FIG. 7I, by alternately rearranging a pair of the broadcasting signal transmitted by the horizontal polarized wave and the broadcasting signal transmitted by the vertical polarized wave, which were in the same physical channel at the time of reception by the antenna, in the order of the physical channels at the time of reception by the antenna, in a case where the broadcast receiving apparatus 100 according to the present embodiment executes the initial scan from the low frequency side, it is possible to proceed with initial settings for the pair of the broadcasting signal transmitted by the horizontal polarized wave and the broadcasting signal transmitted by the vertical polarized wave, which are originally in the same physical channel, in order by originally the same physical channel unit, and this makes it possible to execute the initial scan efficiently.

Note that in any of the examples illustrated in FIG. 7E, FIG. 7F, FIG. 7G, FIG. 7H, and FIG. 7I, a case where the horizontal polarized wave is the main polarized wave has been described as an example, but the horizontal polarized wave and the vertical polarized wave may be reversed depending upon the operation thereof.

Note that as described above, the broadcast wave of the terrestrial digital broadcasting of the dual-polarized transmission method, to which the pass-through transmission method explained above was made, can be received and reproduced by the second tuner/demodulator 130T of the broadcast receiving apparatus 100, but it can be received even by the first tuner/demodulator 130C of the broadcast receiving apparatus 100. In a case where the broadcast wave of the terrestrial digital broadcasting is received by the first tuner/demodulator 130C, the broadcasting signal transmitted by the layer for the advanced terrestrial digital broadcasting service of the broadcasting signals of the broadcast wave of the terrestrial digital broadcasting is ignored, but the broadcasting signal transmitted by the layer for the existing terrestrial digital broadcasting service is reproduced.

[Transmission Method 2 of Advanced Terrestrial Digital Broadcasting Service]

In order to realize the 4K broadcasting while maintaining the viewing environment of the existing terrestrial digital broadcasting service, as one example different from that described above of the transmission method of the advanced terrestrial digital broadcasting service according to the embodiment of the present invention, the layered division multiplexing transmission method will be described. The layered division multiplexing transmission method according to the embodiment of the present invention is a method that has specifications common to some specifications of the existing terrestrial digital broadcasting method. For example, a broadcast wave of a 4K broadcasting service whose signal level is a low level is multiplexed into the same channel as the broadcast wave of an existing 2K broadcasting service, and then is transmitted. Note that the 2K broadcasting is received as before by suppressing a reception level of the 4K broadcasting to a required C/N or less. With respect to the 4K broadcasting, a 2K broadcast wave is cancelled using a receiving technique compatible with an LDM (layered division multiplexing) technique while expanding a transmission capacity by multi-valued modulation or the like, and the 4K broadcasting is received through the remaining 4K broadcast wave.

Figure 8A:
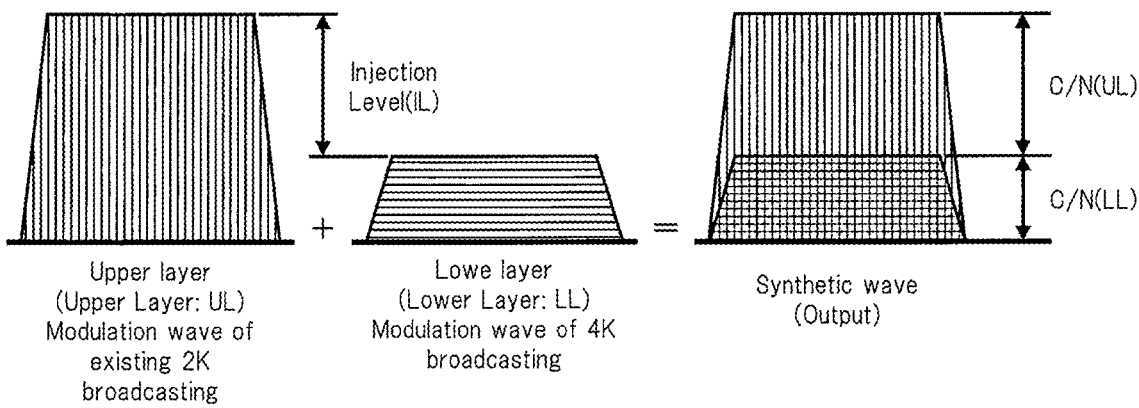
FIG. 8A is a diagram for explaining a layered division multiplexing transmission method according to one embodiment of the present invention.

FIG. 8A illustrates one example of the layered division multiplexing transmission method in the advanced terrestrial digital broadcasting service according to the embodiment of the present invention. An upper layer is configured by a modulation wave of the existing 2K broadcasting, and a lower layer is configured by a modulation wave of the 4K broadcasting. Then, the upper layer and the lower layer are multiplexed, and are outputted as a synthetic wave. For example, they may be configured so that 64 QAM or the like is used as the modulation method in the upper layer and 256 QAM or the like is used as the modulation method in the lower layer. Note that a 2K broadcasting program to be transmitted using the upper layer and a 4K broadcasting program to be transmitted using the lower layer may be the simultaneous broadcasting in which the broadcasting program with the same content is transmitted at different resolutions, or may be one in which broadcasting programs with different content are transmitted.

Figure 8B:
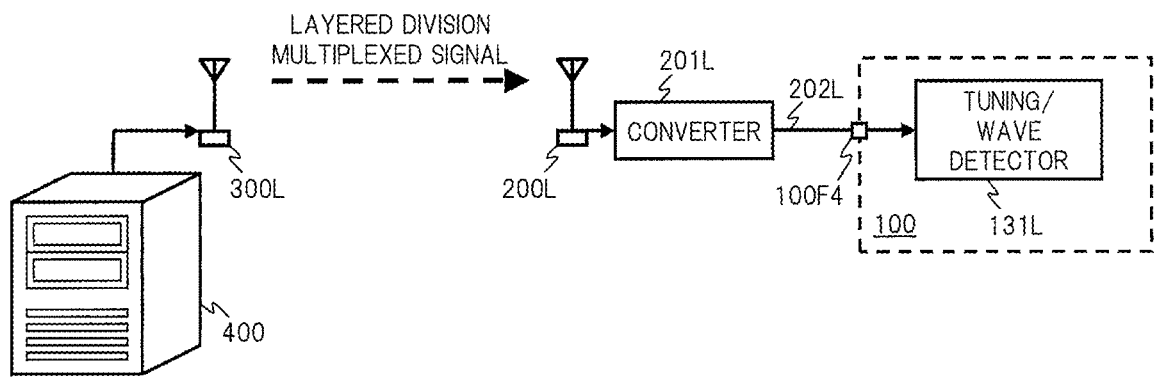
FIG. 8B is a system configuration diagram of the broadcasting system using the layered division multiplexing transmission method according to one embodiment of the present invention.

FIG. 8B illustrates one example of a configuration of a broadcasting system for the advanced terrestrial digital broadcasting service using the layered division multiplexing transmission method according to the embodiment of the present invention. The configuration of the broadcasting system of the advanced terrestrial digital broadcasting service using the layered division multiplexing transmission method is basically similar to the configuration of the broadcasting system illustrated in FIG. 1. However, a radio tower 300L that is facility of the broadcast station is a transmission antenna configured to send out a broadcasting signal obtained by multiplexing the 2K broadcasting of the upper layer and the 4K broadcasting of the lower layer. Further, in the example of FIG. 8B, only the tuning/wave detector 131L of the third tuner/demodulator 130L in the broadcast receiving apparatus 100 is extracted and illustrated, and the other operating units are omitted.

Figure 8C:
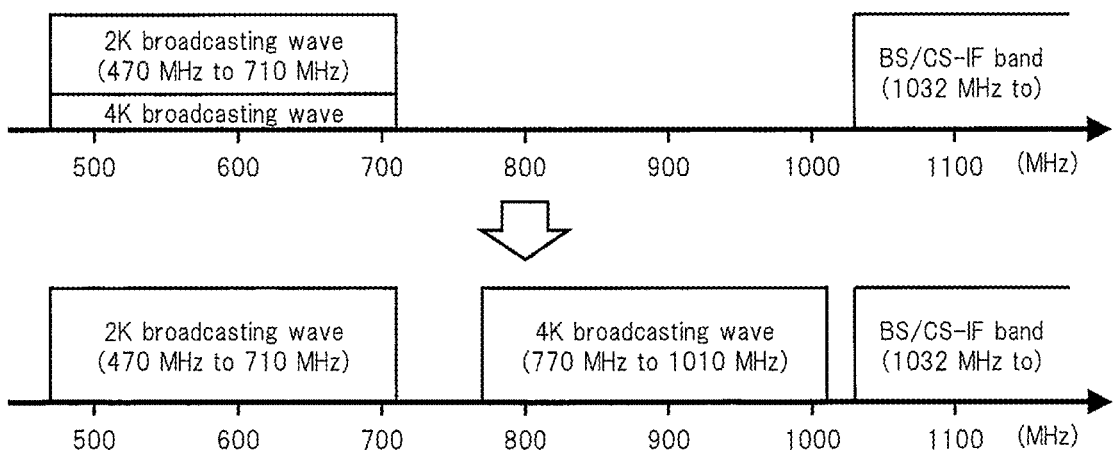
FIG. 8C is a diagram for explaining a frequency conversion amplification process according to one embodiment of the present invention.

A broadcasting signal received by the antenna 200L is inputted from a connector 100F4 to the tuning/wave detector 131L via a converter (converter) 201L and a coaxial cable 202L. Here, in the configuration, when the broadcasting signal is transmitted from the antenna 200L to the broadcast receiving apparatus 100, as illustrated in FIG. 8C, the converter 201L may subject a frequency conversion amplification process to the broadcasting signal. Namely, in a case where the antenna 200L is installed at the roof of an apartment building or the like and transmission of the broadcasting signal is executed to the broadcast receiving apparatus 100 of each room by the coaxial cable 202L with a long cable length, it is conceivable that the broadcasting signal will be attenuated, and there is a possibility that a defect that the 4K broadcast wave of the lower layer cannot particularly be received correctly by the tuning/wave detector 131L occurs.

Therefore, in order to prevent the defect described above, the converter 201L executes the frequency conversion amplification process for the 4K broadcasting signal of the lower layer. In the frequency conversion amplification process, a frequency band of the 4K broadcasting signal of the lower layer is converted from a frequency band of 470 to 710 MHz (that is, a band corresponding to 13 ch to 52 ch of the UHF) to a frequency band of 770 to 1010 MHz that exceed a band corresponding to 62 ch of the UHF, for example. Moreover, a process of amplifying the 4K broadcasting signal of the lower layer to a signal level at which an influence of attenuation by the cable does not cause a problem is executed. By executing such a process, it also becomes possible to avoid an influence of attenuation of the broadcasting signal during coaxial cable transmission while avoiding interference between the 2K broadcasting signal and the 4K broadcasting signal. Note that in a case where the influence of attenuation does not cause a problem, such as in a case where the cable length of the coaxial cable 202L is short, the converter 201L and the frequency conversion amplification process may be unnecessary.

Further, it is preferable that the frequency band after conversion by the frequency conversion amplification process is between 710 and 1032 MHz, which exceeds the band corresponding to 52 ch of the UHF, or between 770 and 1032 MHz, which exceeds the band corresponding to 62 ch of the UHF, (in case of retransmission by the cable television station); it is preferable that a bandwidth of a range between a frequency band before conversion by the frequency conversion amplification process and a frequency band after conversion is set to be an integral multiple of the bandwidth (6 MHz) of one physical channel; and the frequency conversion amplification process may be executed only for a physical channel using signal transmission by the layered division multiplexing transmission method. Since all of them are similar to those explained for the frequency conversion according to the present embodiment, which have already been described, repeated explanation thereof is omitted.

Note that the broadcast receiving apparatus 100 according to the present embodiment can identify whether the received broadcasting signal is the broadcasting signal transmitted by the lower layer or the broadcasting signal transmitted by the upper layer by using the upper/lower layer identification bit of the TMCC information, which has been explained with reference to FIG. 5H. Further, the broadcast receiving apparatus 100 according to the present embodiment can identify whether the received broadcasting signal is a broadcasting signal subjected to the frequency conversion after reception by the antenna or not by using the frequency converting process identification bit of the TMCC information, which has been explained with reference to FIG. 5F. Further, the broadcast receiving apparatus 100 according to the present embodiment can identify whether a 4K program is transmitted by the lower layer in the received broadcasting signal or not by using the 4K signal transmission layer identification bit of the TMCC information, which has been explained with reference to FIG. 5I. It is not impossible to execute these identifying processes by demodulating a data carrier and referring to control information contained in a stream. However, it is necessary to demodulate the data carrier, and this causes the process to become complicated. It is more easily and faster to identify them by referring to the parameters of the TMCC information described above. For this reason, it is possible to further speed up the initial scan of the broadcast receiving apparatus 100, for example.

Note that as explained above, the tuning/wave detector 131L of the third tuner/demodulator 130L in the broadcast receiving apparatus 100 according to the embodiment of the present invention has the receiving function compatible with the LDM (layered division multiplexing) technique. For this reason, the converter 201L illustrated in FIG. 8C is not always required between the antenna 200L and the broadcast receiving apparatus 100.

Note that as described above, the broadcast wave of the terrestrial digital broadcasting transmitted by the layered division multiplexing transmission method explained above can be received and reproduced by the third tuner/demodulator 130L of the broadcast receiving apparatus 100, but can also be received by the first tuner/demodulator 130C of the broadcast receiving apparatus 100. In a case where the broadcast wave of the terrestrial digital broadcasting is received by the first tuner/demodulator 130C, the broadcasting signal transmitted by the layer for the transmitted advanced terrestrial digital broadcasting service of the broadcasting signals of the broadcast wave of the terrestrial digital broadcasting is ignored, but the broadcasting signal transmitted by the layer for the existing terrestrial digital broadcasting service is reproduced.

[MPEG-2 TS Method]

The broadcasting system according to the present embodiment is compatible with an MPEG-2 TS, which is adopted in the existing terrestrial digital broadcasting service, as a media transport method of transmitting data such as video or audio. Specifically, the method of the stream transmitted by the OFDM transmission wave illustrated in (1) of FIG. 4D is the MPEG-2 TS, and the method of the stream transmitted by the layer, by which the existing terrestrial digital broadcasting service is transmitted, of the OFDM transmission waves illustrated in (2) of FIG. 4D and (3) of FIG. 4D is the MPEG-2 TS. Further, the method of the stream obtained by demodulating the transmission wave by the first tuner/demodulator 130C of the broadcast receiving apparatus 100 illustrated in FIG. 2A is the MPEG-2 TS. Further, the method of the stream, which corresponds to the layer by which the existing terrestrial digital broadcasting service is transmitted, among the streams obtained by demodulating the transmission wave by the second tuner/demodulator 130T is the MPEG-2 TS. Similarly, the method of the stream, which corresponds to the layer by which the existing terrestrial digital broadcasting service is transmitted, among the streams obtained by demodulating the transmission wave by the third tuner/demodulator 130L is the MPEG-2 TS.

The MPEG-2 TS is characterized in that components constituting a program such as video or audio is multiplexed into one packet stream together with a control signal and a clock. Since it is treated as one packet stream including the clock, it is suitable to transmit one content via one transmission path in which transmission quality is secured, and the MPEG-2 TS is adopted in many existing digital broadcasting systems. Further, it is possible to realize bidirectional communication via a bidirectional network such as a fixed network/portable network, and it is possible to be compatible with the broadcasting/communication cooperation system in which a digital broadcasting service is caused to cooperate with a function using a broadband network and acquisition of additional content via the broadband network, arithmetic processing by a server apparatus, and a presenting process in cooperation with portable terminal equipment are combined with the digital broadcasting service.

Figure 9A:
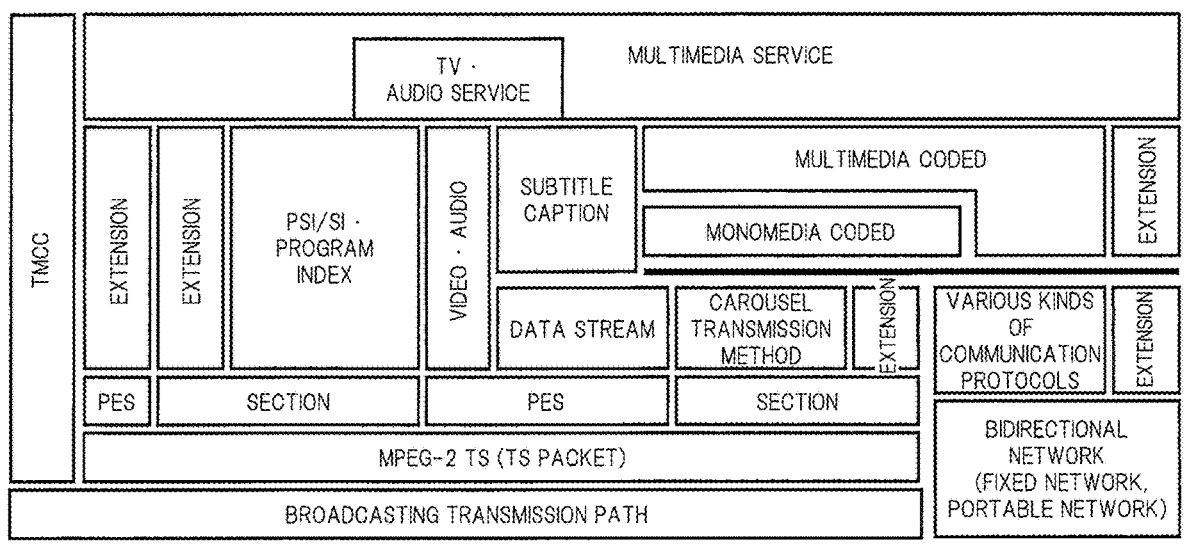
FIG. 9A is a diagram for explaining a protocol stack of an MPEG-2 TS.

FIG. 9A illustrates one example of a protocol stack of a transmission signal in the broadcasting system using the MPEG-2 TS. In the MPEG-2 TS, PSI, SI, and the other control signals are transmitted by a section form.

[Control Signal of Broadcasting System Using MPEG-2 TS Method]

As control information of a MPEG-2 TS method, there are a table mainly used for program arrangement information and a table used for other than the program arrangement information. Each of the tables is transmitted in a section form, and descriptors are arranged in the corresponding table.

<Tables Used in Program Arrangement Information>

FIG. 9B illustrates a list of tables used in the program arrangement information of the broadcasting system of the MPEG-2 TS method. In the present embodiment, the following is used as the tables used in the program arrangement information.
(1) PAT (Program Association Table)
(2) CAT (Conditional Access Table)
(3) PMT (Program Map Table)
(4) NIT (Network Information Table)
(5) SDT (Service Description Table)
(6) BAT (Bouquet Association Table)
(7) EIT (Event Information Table)
(8) RST (Running Status Table)
(9) TDT (Time and Date Table)
(10) TOT (Time Offset Table)
(11) LIT (Local Event Information Table)
(12) ERT (Event Relation Table)
(13) ITT (Index Transmission Table)
(14) PCAT (Partial Content Announcement Table)
(15) ST (Stuffing Table)
(16) BIT (Broadcaster Information Table)
(17) NBIT (Network Board Information Table)
(18) LDT (Linked Description Table)
(19) AMT (Address Map Table)
(20) INT (IP/MAC Notification Table)
(21) table set by provider <Tables Used in Digital Broadcasting>

FIG. 9C illustrates a list of tables used for other than the program arrangement information of the broadcasting system with the MPEG-2 TS method. In the present embodiment, the following is used as the tables used for other than the program arrangement information.
(1) ECM (Entitlement Control Message)
(2) EMM (Entitlement Management Message)
(3) DCT (Download Control Table)
(4) DLT (DownLoad Table)
(5) DIT (Discontinuity Information Table)
(6) SIT (Selection Information Table)
(7) SDTT (Software Download Trigger Table)
(8) CDT (Common Data Table)
(9) DSM-CC section
(10) AIT (Application Information Table)
(11) DCM (Download Control Message)
(12) DMM (Download Management Message)
(13) table set by provider <Descriptors Used in Program Arrangement Information>

FIG. 9D, FIG. 9E, and FIG. 9F illustrate a list of descriptors used in the program arrangement information of the broadcasting system of the MPEG-2 TS method. In the present embodiment, the following is used as the descriptors used in the program arrangement information.
(1) limited reception type descriptor (Conditional Access Descriptor)
(2) copyright descriptor (Copyright Descriptor)
(3) network name descriptor (Network Name Descriptor)
(4) service list descriptor (Service List Descriptor)
(5) stuffing descriptor (Stuffing Descriptor)
(6) satellite delivery system descriptor (Satellite Delivery System Descriptor)
(7) terrestrial delivery system descriptor (Terrestrial Delivery System Descriptor)
(8) bouquet name descriptor (Bouquet Name Descriptor)
(9) service descriptor (Service Descriptor)
(10) country reception availability descriptor (Country Availability Descriptor)
(11) linkage descriptor (Linkage Descriptor)
(12) NVOD reference service descriptor (NVOD Reference Descriptor)
(13) time shifted service descriptor (Time Shifted Service Descriptor)
(14) short form event descriptor (Short Event Descriptor)
(15) extended form event descriptor (Extended Event Descriptor)
(16) time shifted event descriptor (Time Shifted Event Descriptor)
(17) component descriptor (Component Descriptor)
(18) mosaic descriptor (Mosaic Descriptor)
(19) stream identifier descriptor (Stream Identifier Descriptor)
(20) CA identifier descriptor (CA Identifier Descriptor)
(21) content descriptor (Content Descriptor)
(22) parental rate descriptor (Parental Rating Descriptor)
(23) hierarchical transmission descriptor (Hierarchical Transmission Descriptor)

(24) digital copy control descriptor (Digital Copy Control Descriptor)
(25) emergency information descriptor (Emergency Information Descriptor)
(26) data coded method descriptor (Data Component Descriptor)
(27) system management descriptor (System Management Descriptor)
(28) local time offset descriptor (Local Time Offset Descriptor)
(29) audio component descriptor (Audio Component Descriptor)
(30) target region descriptor (Target Region Descriptor)
(31) hyperlink descriptor (Hyperlink Descriptor)
(32) data content descriptor (Data Content Descriptor)
(33) video decode control descriptor (Video Decode Control Descriptor)
(34) basic local event descriptor (Basic Local Event Descriptor)
(35) reference descriptor (Reference Descriptor)
(36) node relation descriptor (Node Relation Descriptor)
(37) short form node information descriptor (Short Node Information Descriptor)
(38) STC reference descriptor (STC Reference Descriptor)
(39) partial reception descriptor (Partial Reception Descriptor)
(40) series descriptor (Series Descriptor)
(41) event group descriptor (Event Group Descriptor)
(42) SI transmission parameter descriptor (SI Parameter Descriptor)
(43) broadcaster name descriptor (Broadcaster Name Descriptor)
(44) component group descriptor (Component Group Descriptor)
(45) SI prime TS descriptor (SI Prime TS Descriptor)
(46) bulletin board information descriptor (Board Information Descriptor)
(47) LDT linkage descriptor (LDT Linkage Descriptor)
(48) connected transmission descriptor (Connected Transmission Descriptor)
(49) TS information descriptor (TS Information Descriptor)
(50) extended broadcaster descriptor (Extended Broadcaster Descriptor)
(51) logo transmission descriptor (Logo Transmission Descriptor)
(52) content availability descriptor (Content Availability Descriptor)
(53) carousel compatible composite descriptor (Carousel Compatible Composite Descriptor)
(54) limited reproduction method descriptor (Conditional Playback Descriptor)
(55) AVC video descriptor (AVC Video Descriptor)
(56) AVC timing HRD descriptor (AVC Timing and HRD Descriptor)
(57) service group descriptor (Service Group Descriptor)
(58) MPEG-4 audio descriptor (MPEG-4 Audio Descriptor)
(59) MPEG-4 audio extension descriptor (MPEG-4 Audio Extension Descriptor)
(60) registration descriptor (Registration Descriptor)
(61) data broadcast identification descriptor (Data Broadcast Id Descriptor)
(62) access control descriptor (Access Control Descriptor)
(63) area broadcasting information descriptor (Area Broadcasting Information Descriptor)
(64) material information descriptor (Material Information Descriptor)
(65) HEVC video descriptor (HEVC Video Descriptor)
(66) hierarchy coded descriptor (Hierarchy Descriptor)
(67) communication cooperation information descriptor (Hybrid Information Descriptor)
(68) scramble method descriptor (Scrambler Descriptor)
(69) descriptor set by provider <Descriptors Used in Digital Broadcasting>

FIG. 9G illustrates a list of descriptors used for other than the program arrangement information of the broadcasting system of the MPEG-2 TS method. In the present embodiment, the following is used as the descriptors other than the program arrangement information.

(1) partial transport stream descriptor (Partial Transport Stream Descriptor)
(2) network identification descriptor (Network Identification Descriptor)
(3) partial transport stream time descriptor (Partial Transport Stream Time Descriptor)
(4) download content descriptor (Download Content Descriptor)
(5) CA EMM TS descriptor (CA EMM TS Descriptor)
(6) CA contract information descriptor (CA Contract Information Descriptor)
(7) CA service descriptor (CA Service Descriptor)
(8) carousel identifier descriptor (Carousel Identifier Descriptor)
(9) association tag descriptor (Association Tag Descriptor)
(10) extended association tag descriptor (Deferred Association tags Descriptor)
(11) network download content descriptor (Network Download Content Descriptor)
(12) download protection descriptor (Download Protection Descriptor)
(13) CA startup descriptor (CA Startup Descriptor)
(14) descriptor set by provider <Descriptor Used in INT>

FIG. 9H illustrates a list of descriptors used in INT of the broadcasting system of the MPEG-2 TS method. In the present embodiment, the following is used as the descriptors used in the INT. Note that the descriptors used in the program arrangement information described above and the descriptors used for other than the program arrangement information are not used in the INT.

(1) target smartcard descriptor (Target Smartcard Descriptor)
(2) target IP address descriptor (Target IP Address Descriptor)
(3) target IPv6 address descriptor (Target IPv6 Address Descriptor)
(4) IP/MAC platform name descriptor (IP/MAC Platform Name Descriptor)
(5) IP/MAC platform provider name descriptor (IP/MAC Platform Provider Name Descriptor)
(6) IP/MAC stream arrangement descriptor (IP/MAC Stream Location Descriptor)
(7) descriptor set by provider <Descriptors Used in AIT>

FIG. 9I illustrates a list of descriptors used in the AIT of the broadcasting system of the MPEG-2 TS method. In the present embodiment, the following is used as descriptors used in the AIT. Note that the descriptors used in the program arrangement information described above and the descriptors used for other than the program arrangement information are not used in the INT.

(1) application descriptor (Application Descriptor)
(2) transport protocol descriptor (Transport Protocol Descriptor)

(3) simple application location descriptor (Simple Application Location Descriptor)
(4) application boundary authority setting descriptor (Application Boundary and Permission Descriptor)
(5) startup priority information descriptor (Autostart Priority Descriptor)
(6) cache information descriptor (Cache Control Info Descriptor)
(7) stochastic application delay descriptor (Randomized Latency Descriptor)
(8) external application control descriptor (External Application Control Descriptor)
(9) video recording and reproducing application descriptor (Playback Application Descriptor)
(10) simple video recording and reproducing application location descriptor (Simple Playback Application Location Descriptor)
(11) application expiration date descriptor (Application Expiration Descriptor)
(12) descriptor set by provider

[MMT Method]

The broadcasting system according to the present embodiment can also address an MMT method as the media transport method of transmitting data such as video or audio. Specifically, the method of the stream to be transmitted by the layer by which the advanced terrestrial digital broadcasting service is transmitted in the OFDM transmission wave illustrate in (2) of FIG. 4D and (3) of FIG. 4D is the MMT method in principle. Further, the method of the stream corresponding to the layer by which the advanced terrestrial digital broadcasting service is transmitted in the stream obtained by demodulating the transmission wave by the second tuner/demodulator 130T of the broadcast receiving apparatus 100 illustrated in FIG. 2A is an MMT in principle. Similarly, the method of the stream corresponding to the layer by which the advanced terrestrial digital broadcasting service is transmitted in the stream obtained by demodulating the transmission wave by the third tuner/demodulator 130L is the MMT in principle. Note that as a modification example, the stream of the MPEG-2 TS may be operated by the advanced terrestrial digital broadcasting service. Further, the method of the stream obtained by demodulating the transmission wave by the fourth tuner/demodulator 130B is the MMT.

The MMT method is a newly formulated media transport method because functions of the MPEG-2 TS method are limited with respect to a change in environment regarding content distribution such as diversification of content in the recent years, diversification of equipment that utilizes content, diversification of a transmission path for distributing content, or diversification of content storage environment.

A code of a video signal and an audio signal of a broadcasting program is an MFU (Media Fragment Unit)/MPU (Media Processing Unit); is put on MMT P (MMT Protocol) payload to be converted into an MMTP packet; and is transmitted by an IP packet. Further, data content and a signal of a subtitle related to the broadcasting program are also in an MFU/MPU form; are put on MMTP payload to be converted into an MMTP packet; and are transmitted by an IP packet.

UDP/IP (User Datagram Protocol/Internet Protocol) is used for transmission of the MMTP packet in a broadcast transmission path, and the UDP/IP or TCP/IP (Transmission Control Protocol/Internet Protocol) is used in a communication line. Further, in the broadcast transmission path, a TLV multiplex method may be used for efficient transmission of the IP packet.

Figure 10A:
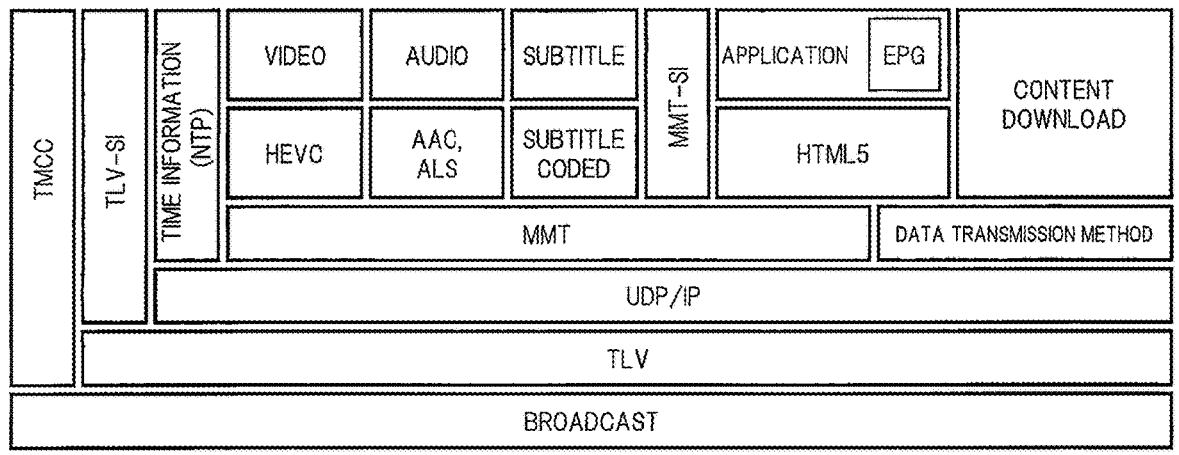
FIG. 10A is a diagram for explaining a protocol stack in a broadcast transmission path of MMT.
Figure 10B:
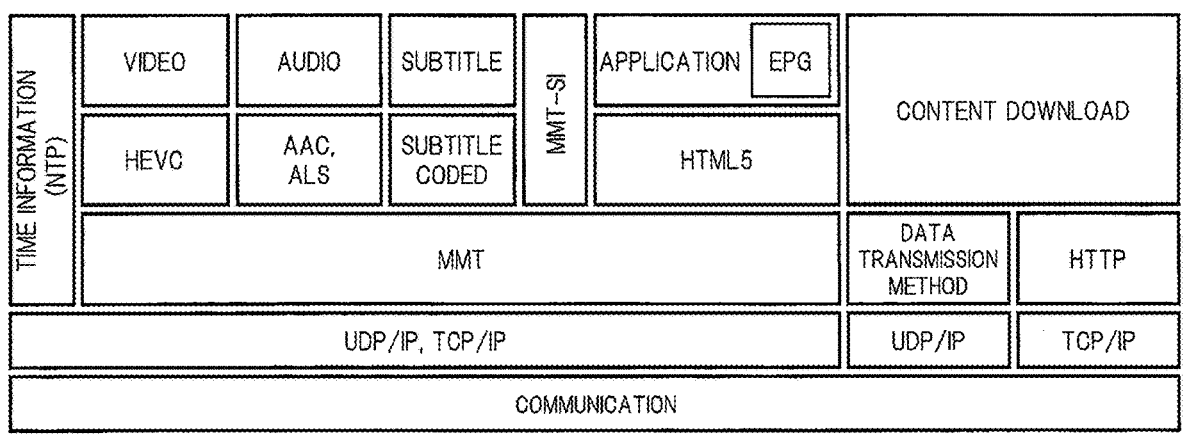
FIG. 10B is a diagram for explaining the protocol stack in a communication line of the MMT.

FIG. 10A illustrates a protocol stack of the MMT in the broadcast transmission path. Further, FIG. 10B illustrates a protocol stack of the MMT in the communication line. In the MMT method, a mechanism for transmitting two types of control information including MMT-SI and TLV-SI is prepared. The MMT-SI is control information indicating a configuration of a broadcasting program. The MMT-SI is formed as a control message of the MMT; is put on the MMTP payload to become an MMTP packet; and is transmitted by the IP packet. The TLV-SI is control information regarding multiplexing of the IP packet, and provide information for channel selection and correspondence information between an IP address and a service.

[Control Signal of Broadcasting System Using MMT Method]

As described above, in the MMT method, the TLV-SI and the MMT-SI are prepared as the control information. The TLV-SI is configured by a table and descriptors. The table is transmitted in a section form, and the descriptors are arranged in the table. The MMT-SI is configured by three layers including a message that stores the table and the descriptors, a table having an element and an attribute that indicate specific information, and a descriptor that indicates more detailed information.

<Tables Used in TLV-SI>

FIG. 10C illustrates a list of tables used in the TLV-SI of the broadcasting system with the MMT method. In the present embodiment, the following is used as the tables of the TLV-SI.
(1) network information table for TLV (Network Information Table for TLV)
(2) address map table (Address Map Table)
(3) table set by provider <Descriptors Used in TLV-SI>

FIG. 10D illustrates a list of descriptors used in the TLV-SI of the broadcasting system with the MMT method. In the present embodiment, the following is used as the descriptors of the TLV-SI.
(1) service list descriptor (Service List Descriptor)
(2) satellite delivery system descriptor (Satellite Delivery System Descriptor)
(3) system management descriptor (System Management Descriptor)
(4) network name descriptor (Network Name Descriptor)
(5) remote control key descriptor (Remote Control Key Descriptor)
(6) descriptor set by provider <Message Used in MMT-SI>

FIG. 10E illustrates a list of messages used in the MMT-SI of the broadcasting system with the MMT method. In the present embodiment, the following is used as the messages of the MMT-SI.
(1) PA (Package Access) message
(2) M2 section message
(3) CA message
(4) M2 short section message
(5) data transmission message
(6) message set by provider <Table Used in MMT-SI>

FIG. 10F illustrates a list of tables used in the MMT-SI of the broadcasting system with the MMT method. In the present embodiment, the following is used as the tables of the MMT-SI.
(1) MPT (MMT Package Table)
(2) PLT (Package List Table)
(3) LCT (Layout Configuration Table)
(4) ECM (Entitlement Control Message)

(5) EMM (Entitlement Management Message)
(6) CAT (MH) (Conditional Access Table (MH))
(7) DCM (Download Control Message)
(8) DMM (Download Management Message)
(9) MH-EIT (MH-Event Information Table)
(10) MH-AIT (MH-Application Information Table)
(11) MH-BIT (MH-Broadcaster Information Table)
(12) MH-SDTT (MH-Software Download Trigger Table)
(13) MH-SDT (MH-Service Description Table)
(14) MH-TOT (MH-Time Offset Table)
(15) MH-CDT (MH-Common Data Table)
(16) DDM table (Data Directory Management Table)
(17) DAM table (Data Asset Management Table)
(18) DCC table (Data Content Configuration Table)
(19) EMT (Event Message Table)
(20) table set by provider
  <Descriptor Used in MMT-SI>
FIG. 10G, FIG. 10H, and FIG. 10I illustrate a list of descriptors used in the MMT-SI of the broadcasting system with the MMT method. In the present embodiment, the following is used as the descriptors of the MMT-SI.
(1) asset group descriptor (Asset Group Descriptor)
(2) event package descriptor (Event Package Descriptor)
(3) background color specification descriptor (Background Color Descriptor)
(4) MPU presentation region specification descriptor (MPU Presentation Region Descriptor)
(5) MPU timestamp descriptor (MPU Timestamp Descriptor)
(6) dependency descriptor (Dependency Descriptor)
(7) access control descriptor (Access Control Descriptor)
(8) scramble method descriptor (Scrambler Descriptor)
(9) message authentication method descriptor (Message Authentication Method Descriptor)
(10) emergency information descriptor (Emergency Information Descriptor)
(11) MH-MPEG-4 audio descriptor (MH-MPEG-4 Audio Descriptor)
(12) MH-MPEG-4 audio extension descriptor (MH-MPEG-4 Audio Extension Descriptor)
(13) MH-HEVC descriptor (MH-HEVC Descriptor)
(14) MH-linkage descriptor (MH-Linkage Descriptor)
(15) MH-event group descriptor (MH-Event Group Descriptor)
(16) MH-service list descriptor (MH-Service List Descriptor)
(17) MH-short form event descriptor (MH-Short Event Descriptor)
(18) MH-extended form event descriptor (MH-Extended Event Descriptor)
(19) video component descriptor (Video Component Descriptor)
(20) MH-stream identifier descriptor (MH-Stream Identifier Descriptor)
(21) MH-content descriptor (MH-Content Descriptor)
(22) MH-parental rate descriptor (MH-Parental Rating Descriptor)
(23) MH-audio component descriptor (MH-Audio Component Descriptor)
(24) MH-target region descriptor (MH-Target Region Descriptor)
(25) MH-series descriptor (MH-Series Descriptor)
(26) MH-SI transmission parameter descriptor (MH-SI Parameter Descriptor)
(27) MH-broadcaster name descriptor (MH-Broadcaster Name Descriptor)
(28) MH-service descriptor (MH-Service Descriptor)
(29) IP data flow descriptor (IP Data Flow Descriptor)
(30) MH-CA startup descriptor (MH-CA Startup Descriptor)
(31) MH-Type descriptor (MH-Type Descriptor)
(32) MH-Info descriptor (MH-Info Descriptor)
(33) MH-Expire descriptor (MH-Expire Descriptor)
(34) MH-Compression Type descriptor (MH-Compression Type Descriptor)
(35) MH-data coding method descriptor (MH-Data Component Descriptor)
(36) UTC-NPT reference descriptor (UTC-NPT Reference Descriptor)
(37) event message descriptor (Event Message Descriptor)
(38) MH-local time offset descriptor (MH-Local Time Offset Descriptor)
(39) MH-component group descriptor (MH-Component Group Descriptor)
(40) MH-logo transmission descriptor (MH-Logo Transmission Descriptor)
(41) MPU extended timestamp descriptor (MPU Extended Timestamp Descriptor)
(42) MPU download content descriptor (MPU Download Content Descriptor)
(43) MH-network download content descriptor (MH-Network Download Content Descriptor)
(44) MH-application descriptor (MH-Application Descriptor)
(45) MH-transport protocol descriptor (MH-Transport Protocol Descriptor)
(46) MH-simple application location descriptor (MH-Simple Application Location Descriptor)
(47) MH-application boundary authority setting descriptor (MH-Application Boundary and Permission Descriptor)
(48) MH-startup priority information descriptor (MH-Autostart Priority Descriptor)
(49) MH-cache information descriptor (MH-Cache Control Info Descriptor)
(50) MH-stochastic application delay descriptor (MH-Randomized Latency Descriptor)
(51) linked PU descriptor (Linked PU Descriptor)
(52) locked cache specification descriptor (Locked Cache Descriptor)
(53) unlocked cache specification descriptor (Unlocked Cache Descriptor)
(54) MH-download protection descriptor (MH-DL Protection Descriptor)
(55) application service descriptor (Application Service Descriptor)
(56) MPU node descriptor (MPU Node Descriptor)
(57) PU structure descriptor (PU Structure Descriptor)
(58) MH-hierarchy coding descriptor (MH-Hierarchy Descriptor)
(59) content copy control descriptor (Content Copy Control Descriptor)
(60) content usage control descriptor (Content Usage Control Descriptor)
(61) emergency news descriptor (Emergency News Descriptor)
(62) MH-CA contract information descriptor (MH-CA Contract Info Descriptor)
(63) MH-CA service descriptor (MH-CA Service Descriptor)
(64) MH-external application control descriptor (MH-External Application Control Descriptor)
(65) MH-video recording and reproducing application descriptor (MH-Playback Application Descriptor)

(66) MH-simple video recording and reproducing application location descriptor (MH-Simple Playback Application Location Descriptor)
(67) MH-application expiration date descriptor (MH-Application Expiration Descriptor)
(68) related broadcaster descriptor (Related Broadcaster Descriptor)
(69) multimedia service information descriptor (Multimedia Service Descriptor)
(70) descriptor set by provider <Relation Between Data Transmission and Each Control Information in MMT Method>

Figure 10J:
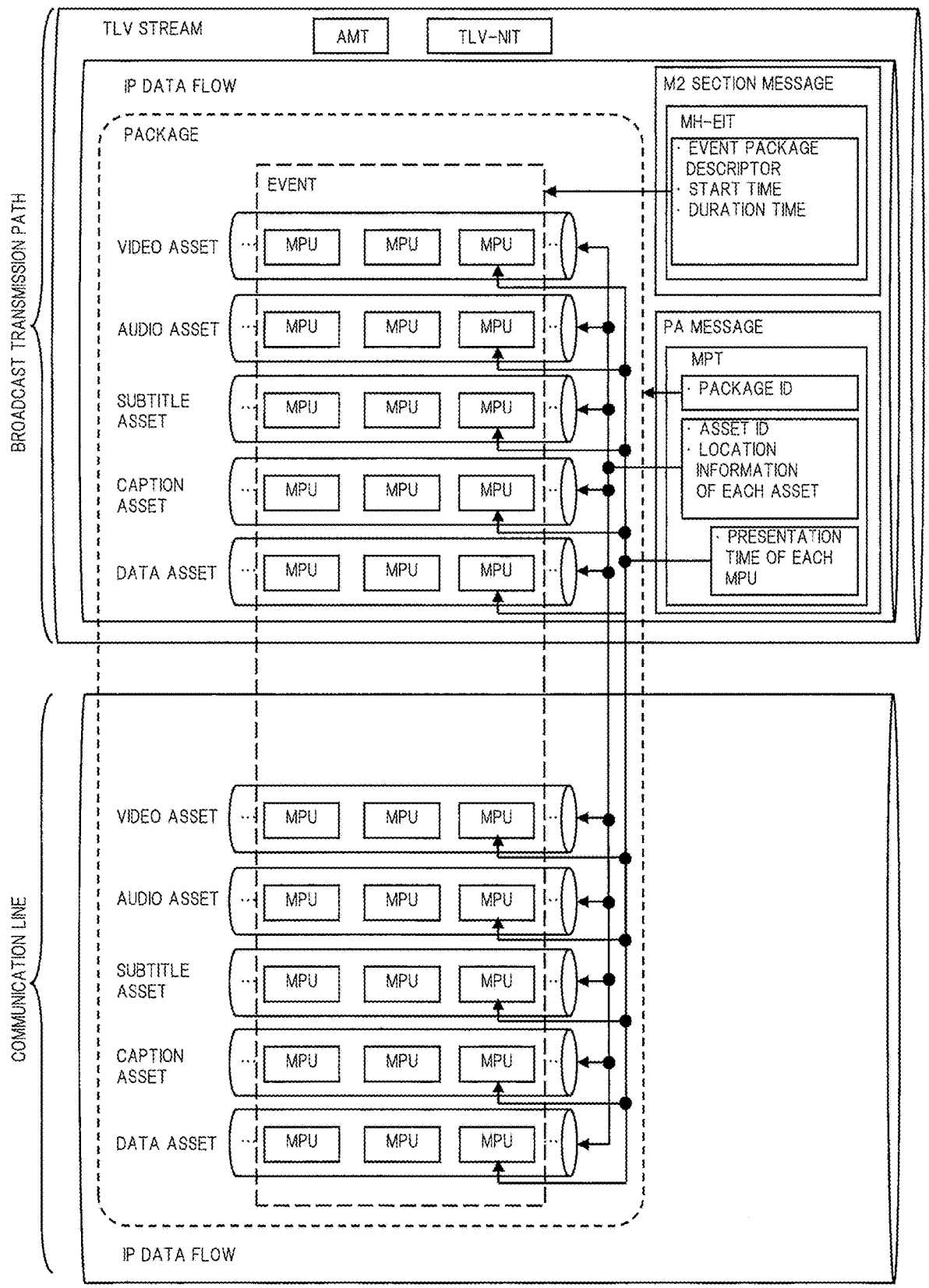
FIG. 10J is a diagram for explaining a relation between data transmission of an MMT method and respective tables.

FIG. 10J illustrates a relation between data transmission and representative tables in the broadcasting system of the MMT method.

In the broadcasting system of the MMT method, data transmission can be executed via a plurality of routes such as the TLV stream via the broadcast transmission path or an IP data flow via the communication line. The TLV-SI such as a TLV-NIT or an AMT and the IP data flow that is a data flow of the IP packet are contained in the TLV stream. A video asset including a series of video MPUs and an audio asset including a series of audio MPUs are contained in the IP data flow. Moreover, any of a subtitle asset including a series of subtitle MPUs, a caption asset including a series of caption MPUs, and a data asset including a series of data MPUs may be contained therein. Various kinds of assets are associated with each other for package unit by an MPT (an MMT package table) stored in a PA message and to be transmitted. Specifically, a package ID and an asset ID of each asset included in a package may be described in the MPT so as to be associated with each other.

The assets constituting the package can be only the assets in the TLV stream. However, as illustrated in FIG. 10J, the assets to be transmitted by the IP data flow of the communication line can also be included. This can be realized by containing location information of each asset included in the package in the MPT so that the broadcast receiving apparatus 100 can grasp a reference destination of each asset. As the location information of each asset, it is possible to specify various kinds of data to be transmitted by various transmission routes as follows:
(1) data multiplexed into the same IP data flow as the MPT
(2) data multiplexed into an IPv4 data flow
(3) data multiplexed into an IPv6 data flow
(4) data multiplexed into MPEG2-TS of broadcast
(5) data multiplexed into the IP data flow in an MPEG2-TS form
(6) data at a specified URL.

The broadcasting system with the MMT method further has a concept of an event. The event is a concept indicating a so-called program, which is treated by an MH-EIT that is transmitted while being included in an M2 section message. Specifically, in a package indicated by an event package descriptor stored in the MH-EIT, a series of data included in a period for a duration time from a disclosure time stored in the MH-EIT is data contained in the concept of the event. The MH-EIT can be used for various kinds of processes (for example, a generating process for a program guide, a control of video recording reservation or timer recording, a copyright management process such as temporary storage, and the like) for event unit in the broadcast receiving apparatus 100.

[Channel Setting Process of Broadcast Receiving Apparatus]
<Initial Scan>

In the existing terrestrial digital broadcasting, the network ID is different for sending master unit, and it is general that information of the other stations is not described in an NIT. Therefore, with respect to the terrestrial digital broadcasting according to the embodiment of the present invention (advanced terrestrial digital broadcast or terrestrial digital broadcast in which the advanced terrestrial digital broadcasting and the existing terrestrial digital broadcasting are transmitted by the other layers at the same time), it is necessary for the broadcast receiving apparatus 100 according to the embodiment of the present invention, which has compatibility with the existing terrestrial digital broadcasting to have a function to search (or scan) all receivable channels at a reception spot and create a service list (that is, a receivable frequency table) based on a service ID. Note that in regions where the same network ID can be received on different physical channels by an MFN (Multi Frequency Network: multi frequency network), the broadcast receiving apparatus 100 may basically operate so as to select a channel with a good reception C/N or a good BER (Bit Error Rate) and store it in the service list.

Note that in the advanced BS digital broadcasting or the advanced CS digital broadcasting received by the fourth tuner/demodulator 130B of the broadcast receiving apparatus 100 according to the embodiment of the present invention, the broadcast receiving apparatus 100 may obtain and store the service list to be stored in the TLV-NIT, and it is thus unnecessary to create the service list. Therefore, the initial scan and rescan (will be described later) are not required for the advanced BS digital broadcasting or the advanced CS digital broadcasting received by the fourth tuner/demodulator 130B.

<Rescan>

The broadcast receiving apparatus 100 according to the embodiment of the present invention has a rescan function prepared for a case of open of a new station, installation of a new relay station, or change in a reception spot of a television receiver. In a case where information that has already been set is to be changed, the broadcast receiving apparatus 100 can notify the user of that effect.

<Operation Example at Time of Initial/Rescan>

Figure 11A:
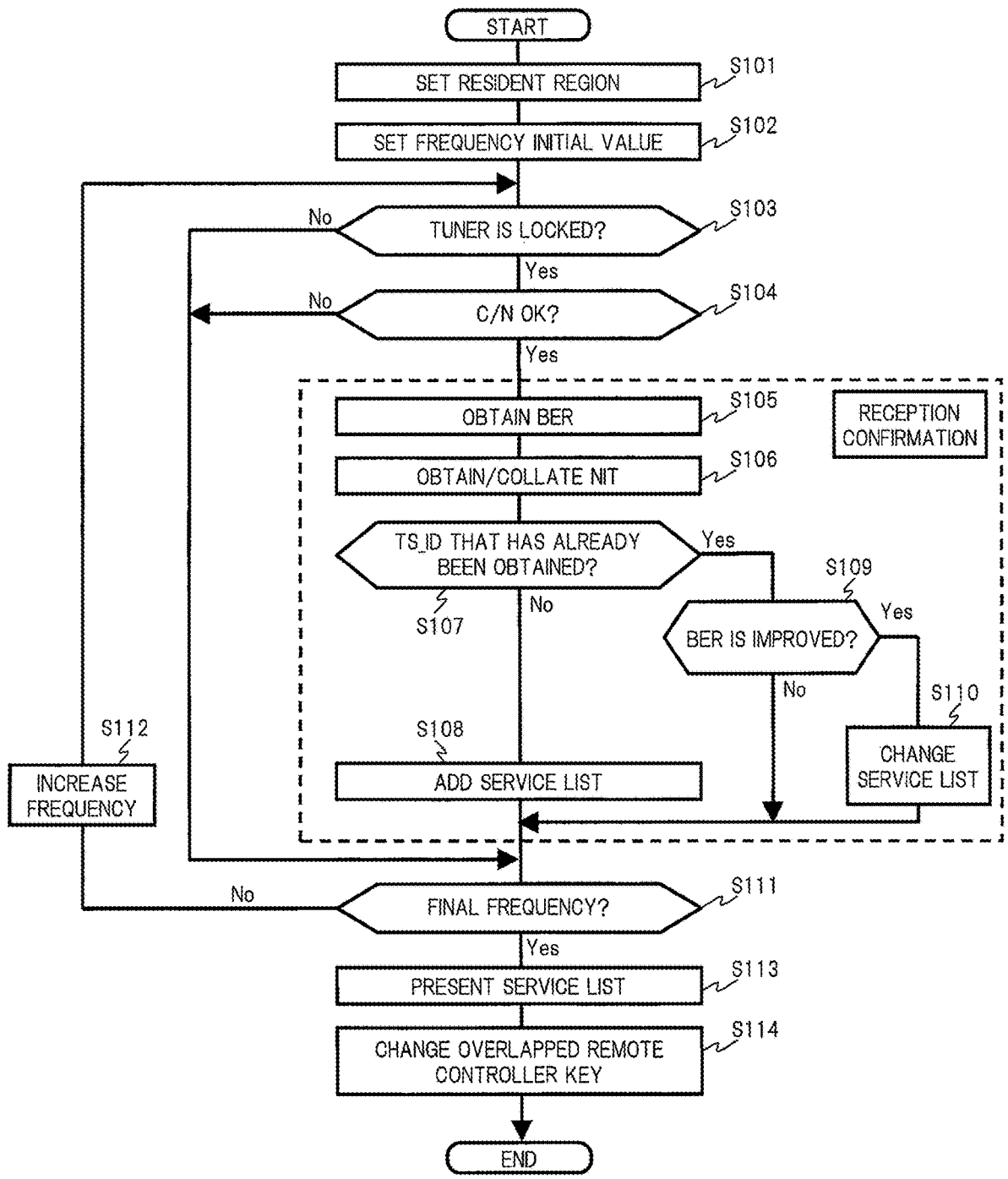
FIG. 11A is an operation sequence diagram of a channel setting process by a broadcast receiving apparatus 100 according to one embodiment of the present invention.

FIG. 11A illustrates one example of an operation sequence of a channel setting process (initial/rescan) by the broadcast receiving apparatus 100 according to the embodiment of the present invention. Note that in FIG. 11A, an example of a case where the MPEG-2 TS is adopted as the media transport method is illustrated, but it also becomes the similar process basically even in a case where the MMT method is adopted.

In the channel setting process, the receiving function controller 1102 first executes setting of a resident region (selection of a region where the broadcast receiving apparatus 100 is installed) on the basis of an instruction of the user (S101). At this time, in place of the instruction of the user, the setting of the resident region may be executed automatically on the basis of installation location information of the broadcast receiving apparatus 100, which is obtained by a predetermined process. As an example of an obtaining process of the installation location information, such information may be obtained from a network to which the LAN communication unit 121 is connected, or information regarding an installation location may be obtained from external equipment to which the digital interface 125 is connected. Next, an initial value of a frequency range to be scanned is set, and a tuner/demodulator (described in this manner in a case where the first tuner/demodulator 130C, the second tuner/demodulator 130T, and the third tuner/demodulator 130L are not distinguished. the same applies hereinafter.) is instructed so as to execute tuning to the set frequency (S102).

The tuner/demodulator executes the tuning on the basis of the instruction (S103). In a case where the lock to the set frequency is successful (S103: Yes), the processing flow proceeds to a process at S104. In a case where the lock is not successful (S103: No), the processing flow proceeds to a process at S111. In the process at S104, confirmation of a C/N is executed (S104). In a case where a predetermined number of C/N or more is obtained (S104: Yes), the processing flow proceeds to a process at S105, and a reception confirming process is executed. In a case where the predetermined number of C/N or more is not obtained (S104: No), the processing flow proceeds to a process at S111.

In the reception confirming process, the receiving function controller 1102 first obtains a BER of the received broadcast wave (S105). Next, an NIT is obtained and collated, whereby it is confirmed whether the NIT is effective data or not (S106). In a case where the NIT obtained in the process at S106 is effective data, the receiving function controller 1102 obtains, from the NIT, information such as a transport stream ID or an original network ID. Further, the receiving function controller 1102 obtains, from a terrestrial delivery system descriptor, delivery system information regarding a physical condition of a broadcast transmission path corresponding to each transport stream ID/original network ID. Further, the receiving function controller 1102 obtains a list of service IDs from a service list descriptor.

Next, by confirming the service list stored in the receiving apparatus, the receiving function controller 1102 confirms whether the transport stream ID obtained in the process at S106 has already been obtained or not (S107). In a case where the transport stream ID obtained in the process at S106 has not already been obtained (S107: No), the receiving function controller 1102 adds the various kinds of information obtained in the process at S106 to the service list so as to be associated with the transport stream ID (S108). In a case where the transport stream ID obtained in the process at S106 has already been obtained (S107: Yes), the receiving function controller 1102 compares the BER obtained in the process at S105 with the BER when the transport stream ID, which has been described in the service list, is obtained (S109). As a result, in a case where the BER obtained in the process at S105 is better (S109: Yes), the receiving function controller 1102 updates the service list on the basis of the various kinds of information obtained in the process at S106 (S110). In a case where the BER obtained in the process at S105 is not better (S109: No), the receiving function controller 1102 discards the various kinds of information obtained in the process at S106.

Further, at the time of the service list creating (adding/updating) process described above, a remote controller key ID may be obtained from a TS information descriptor, and a representative service for each transport stream may be associated with the remote controller key. By this process, it becomes possible to execute one-touch channel selection (will be described later).

When the reception confirming process is terminated, the receiving function controller 1102 confirms whether a current frequency setting is a final value in the frequency range to be scanned or not (S111). In a case where the current frequency setting is not the final value in the frequency range to be scanned (S111: No), the receiving function controller 1102 increases the frequency value set to the tuner/demodulator (S112), and repeats the processes at S103 to S110. In a case where the current frequency setting is the final value in the frequency range to be scanned (S111: Yes), the processing flow proceeds to a process at S113.

In the process at S113, the service list created (or added or updated) in the processes described above is presented to the user as a result of the channel setting process (S113). Further, in a case where there is overlap of the remote controller keys, the user may be informed of that effect to encourage the user to change the setting for the remote controller key (S114). The service list created or updated in the processes described above is stored in the ROM 103 of the broadcast receiving apparatus 100 or a non-volatile memory such as the storage (accumulator) 110.

FIG. 11B illustrates one example of a data structure of the NIT. In FIG. 11B, "transpotrt_stream_id" corresponds to the transport stream ID described above, and "original_network_id" corresponds to the original network ID. Further, FIG. 11C illustrates one example of a data structure of the terrestrial delivery system descriptor. In FIG. 11C, "guard_interval", "transmission_mode", "frequency", and the like correspond to the delivery system information described above. FIG. 11D illustrates one example of a data structure of the service list descriptor. In FIG. 11D, "service_id" corresponds to the service ID described above. FIG. 11E illustrates one example of a data structure of the TS information descriptor. In FIG. 11E, "remote_control_key_id" corresponds to the remote controller key ID described above.

Note that the broadcast receiving apparatus 100 may control the receiving function controller 1102 so as to appropriately change the frequency range to be scanned described above in accordance with a broadcasting service to be received. For example, in a case where the broadcast receiving apparatus 100 receives the broadcast wave of the existing terrestrial digital broadcasting service, the broadcast receiving apparatus 100 controls the receiving function controller 1102 so as to scan a frequency range of 470 to 770 MHz (corresponding to 13 ch to 62 ch of the physical channel). Namely, the broadcast receiving apparatus 100 sets an initial value of the frequency range to 470 to 476 MHz (central frequency: 473 MHz); sets a final value of the frequency range to 764 to 770 MHz (central frequency: 767 MHz); and controls the receiving function controller 1102 so as to increase the frequency value by +6 MHz in the process at S112.

Further, in a case where the broadcast receiving apparatus 100 receives the broadcast wave including the advanced terrestrial digital broadcasting service, the broadcast receiving apparatus 100 controls the receiving function controller 1102 so as to scan a frequency range of 470 to 1010 MHz (because there is a possibility that the frequency converting process illustrated in FIG. 7D or the frequency conversion amplification process illustrated in FIG. 8C is executed). Namely, the broadcast receiving apparatus 100 sets an initial value of the frequency range to 470 to 476 MHz (central frequency: 473 MHz); sets a final value of the frequency range to 1004 to 1010 MHz (central frequency: 1007 MHz); and controls serviced the receiving function controller 1102 so as to increase the frequency value by +6 MHz in the process at S112. Note that even in a case where the broadcast receiving apparatus 100 receives the advanced terrestrial digital broadcasting service but it is determined that the frequency converting process or the frequency conversion amplification process described above is not executed, the broadcast receiving apparatus 100 may control the receiving function controller 1102 so as to scan only the frequency range of 470 to 770 MHz. The broadcast receiving apparatus 100 can execute a selection control of the frequency range to be scanned on the basis of the system identification of the TMCC information, the frequency converting process identification, and the like.

Further, in a case where the broadcasting system according to the embodiment of the present invention has the configuration illustrated in FIG. 7C, for example, and the broadcast receiving apparatus 100 receives the advanced terrestrial digital broadcasting service of the dual-polarized transmission method, one of the tuning/wave detector 131H and the tuning/wave detector 131V may scan the frequency range of 470 to 770 MHz, and the other may scan the frequency range of 770 to 1010 MHz (in a case where the frequency converting process is applied to the transmission wave by the polarized wave detected by the other tuning/wave detector). By controlling it in this manner on the basis of the system identification of the TMCC information and the frequency converting process identification, it is possible to omit scanning in an unnecessary frequency range, and this makes it possible to reduce the time required for channel setting. Moreover, in this case, both the tuning/wave detector 131H and the tuning/wave detector 131V may cause the operation sequence illustrated in FIG. 11A to proceed in parallel to synchronize the loop of frequency increase at S112 in the operation sequence illustrated in FIG. 11A. At this time, in the loop of the same timing in the loop of the frequency increase in the operation sequence illustrated in FIG. 11A, in a case where the broadcast receiving apparatus 100 is configured so as to receive a pair of the horizontal polarized signal and the vertical polarized signal transmitted by the same physical channel in parallel, it becomes possible to decode the control information inside the packet stream of the advanced terrestrial digital service to be transmitted by the pair of the horizontal polarized signal and the vertical polarized signal to obtain the decoded control information during the loop process. This is preferable because the scanning and the creation of the service list proceed efficiently.

Similarly, in a case where the broadcast receiving apparatus 100 further has a configuration of so-called double tuners in which a plurality of tuners/demodulators (tuning/wave detectors) is provided (for example, a configuration in which a plurality of third tuner/demodulators 130L is provided) in addition to the configuration illustrated in FIG. 8B and the broadcast receiving apparatus 100 receives the advanced terrestrial digital broadcasting service of the layered division multiplexing transmission method, one of the double tuners may scan the frequency range of 470 to 770 MHz, and the other may scan the frequency range of 770 to 1010 MHz (in a case where the frequency conversion amplification process is applied thereto). By controlling it in this manner, it becomes possible to reduce the time required for the channel setting in the similar manner to the above.

Note that as explained with reference to FIG. 8A, FIG. 8B, and FIG. 8C, the terrestrial digital broadcasting service transmitted by any one of the upper layer and the lower layer in the configuration illustrated in FIG. 8B is the existing terrestrial digital broadcasting service. Therefore, for example, the first tuner/demodulator 130C may scan the frequency range in which the existing terrestrial digital broadcasting service is transmitted of the frequency range of 470 to 770 MHz and the frequency range of 770 to 1010 MHz, and the third tuner/demodulator 130L may scan the other frequency range I parallel. In this case, it is also possible to reduce the time required for the channel setting in the similar manner to the parallel scanning by the double tuners of the third tuner/demodulator 130L described above. It is possible to identify whether the existing terrestrial digital broadcasting service is transmitted in any of the frequency range of 470 to 770 MHz and the frequency range of 770 to 1010 MHz and whether the advanced terrestrial digital broadcasting service is transmitted in any of the frequency range of 470 to 770 MHz and the frequency range of 770 to 1010 MHz by receiving total two points of one point from each frequency range, for example, two points of 470 to 476 MHz (central frequency: 473 MHz) and 770 to 776 MHz (central frequency: 773 MHz) before the operation sequence for the initial scan/rescan is started by means of the third tuner/demodulator 130L, obtaining the TMCC information transmitted at each frequency, and referring to the parameters stored in the TMCC information (for example, the parameter of the system identification).

Note that in case of a channel that has a broadcasting program to be transmitted by using both the horizontal polarized signal and the vertical polarized signal like the 4K broadcasting program of the C layer illustrated in the hierarchical division example of (1) of FIG. 7A, for example, in the advanced terrestrial digital broadcasting service of the dual-polarized transmission method, the same transport ID is detected by scanning both the frequency range of 470 to 770 MHz and the frequency range of 770 to 1010 MHz. However, this is described in the service list as one channel. Further, in a case where the same broadcasting program is transmitted by the B layer of the horizontal polarized signal and the B layer of the vertical polarized signal in the 2K broadcasting program of the B layer illustrated in (1) of FIG. 7A, it may be stored in the service list as one channel even though the same transport ID is detected. Namely, in a case where the same broadcasting program is transmitted in the same layer transmitted by a different polarized wave, they are merged into one channel and recognized, and are not recognized as different channels. By configuring it in this manner, it is possible to avoid the user from being confused due to existence of exactly the same broadcasting program in the different channels in the channel selecting process using the service list.

On the other hand, in a case where different broadcasting programs are transmitted between the B layer of the horizontal polarized signal and the B layer of the vertical polarized signal in the advanced terrestrial digital broadcasting service of the dual-polarized transmission method (in a case where the B layer of the vertical polarized signal is treated as the virtual D layer), they are stored in the service list as different channels. It is possible to identify whether the same broadcasting program is transmitted by the B layer of the horizontal polarized signal and the B layer of the vertical polarized signal or not by referring to the additional layer transmission identification parameter of the TMCC information and determining such a manner by means of the broadcast receiving apparatus 100.

[Channel Selecting Process of Broadcast Receiving Apparatus]

The broadcast receiving apparatus 100 according to the embodiment of the present invention has, as a program selecting function, functions such as one-touch channel selection by a one-touch key of a remote controller, channel up/down selection by a channel up/down key of the remote controller, or direct channel selection by a direct input of a triple-digit number using ten keys of the remote controller. Any channel selecting function may be executed by using information stored in the service list generated by the initial scan/rescan described above. Further, after channel selection, information on the selected channel (a triple-digit number used for direct channel selection, a branch number, a TS name, a service name, a logo, video resolution information (distinguishing among UHD, HD, and SD), presence or absence of video resolution up/down conversion, the number of audio channels, presence or absence of audio downmix, and the like) is displayed by a banner display or the like. By configuring it in this manner, the user visually obtains information of the channel after channel selection, and confirm whether the channel can be selected to a desired channel or not. Hereinafter, one example of a process in each channel selecting method is described.

<Process Example of One-Touch Channel Selection>
(1) A service of "service_id" specified by "remote_control_key_id" is selected by pressing the one-touch key of the remote controller.
(2) A last mode is set, and channel information display after channel selection is executed.

<Process Example of Up/Down Channel Selection by Channel Up/Down Button>
(1) Channel selection is executed in the order of the triple-digit number using the direct channel selection by pressing the channel up/down key of the remote controller.
(1-1) In a case where an up key is pressed, a service adjacent to an upper side of the triple-digit number is selected. However, in a case where a value of a current triple-digit number is the maximum value in the service list, a service with a number of the minimum value is selected.
(1-2) In a case where a down key is pressed, a service adjacent to a lower side of the triple-digit number is selected. However, in a case where a value of a current triple-digit number is the minimum value of the service list, a service with a number of the maximum value is selected.
(2) A last mode is set, and channel information display after channel selection is executed.

<Process Example of Direct Channel Selection>
(1) When direct channel selection is selected, it becomes a state of waiting for an input of triple-digit number.
(2-1) In a case where the input of the triple-digit number is not completed within a predetermined time (about five seconds), the mode is returned to a normal mode, and channel information display of the currently selected service is executed.
(2-2) In a case where an input of a triple-digit number is completed, it is determined whether the channel exists in the service list of a receivable frequency table or not. In a case where there is no channel, a message such as "this channel does not exist" is displayed.
(3) In a case where the channel exists, a channel selecting process is executed, a last mode is set, and channel information display after channel selection is executed.

Note that the channel selection operation is executed on the basis of SI, and the broadcast receiving apparatus 100 may also have a function to inform the user of that effect by displaying the same in a case where it is determined that the broadcast is suspended.

Figure 12A:
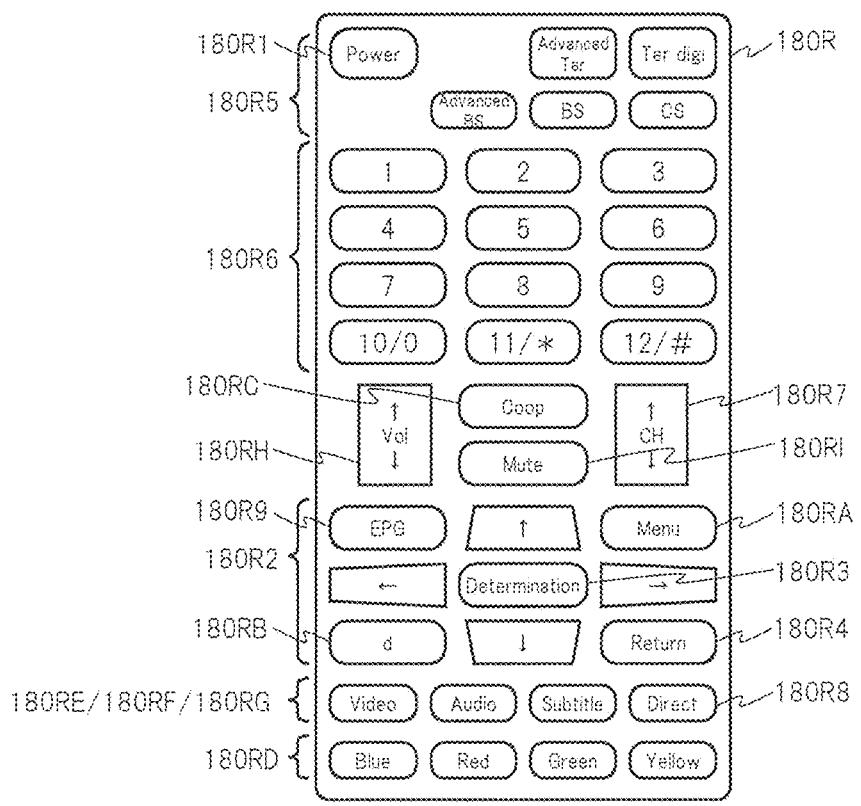
FIG. 12A is an appearance diagram of a remote controller according to one embodiment of the present invention.

<Remote Controller of Broadcast Receiving Apparatus>
FIG. 12A illustrates one example of an appearance view of the remote controller (remote controller) used for inputting an operation instruction to the broadcast receiving apparatus 100 according to the embodiment of the present invention.

A remote controller 180R includes a power source key 180R1 for turning on/off (standby on/off) of a power source of the broadcast receiving apparatus 100, a cursor key (up, down, left, and right) 180R2 for moving a cursor up, down, right, and left, a determination key 180R3 for determining an item of a cursor position as a selection item, and a return key 180R4.

Further, the remote controller 180R also includes a network switching key (advanced terrestrial digital, terrestrial digital, advanced BS, BS, and CS) 180R5 for switching a broadcasting network received by the broadcast receiving apparatus 100. Further, the remote controller 180R also includes one-touch keys (1 to 12) 180R6 used for one-touch channel selection, a channel up/down key 180R7 used for channel selection by channel up/down, and ten keys used for inputting a triple-digit number at the time of direct channel selection. Note that in the example illustrated in FIG. 12A, the ten keys are also used as the one-touch key 180R6, and a triple-digit number can be inputted by operating the one-touch key 180R6 after pressing a direct key 180R8 at the time of direct channel selection.

Further, the remote controller 180R also includes an EPG key 180R9 for displaying a program guide and a menu key 180RA for displaying a system menu. The program guide and the system menu can be operated in detail by any of the cursor key 180R2, the determination key 180R3, and the return key 180R4.

Further, the remote controller 180R also includes a d key 18ORB used for a data broadcasting service or a multimedia service, a cooperation key 18ORC for displaying a broadcasting/communication cooperation service and a list of corresponding applications, and a color key (blue, red, green, and yellow) 180RD. In each of the data broadcasting service, the multimedia service, and the broadcasting/communication cooperation service, detailed operations can be carried out by using any of the cursor key 180R2, the determination key 180R3, the return key 180R4, and the color key 180RD.

Further, the remote controller 180R also includes a video key 180RE for selecting related video, an audio key 180RF for switching of audio ES or switching of two languages, and a subtitle key 18ORG for switching of on/off of a subtitle or switching of a subtitle language. Further, the remote controller 180R also includes a volume key 180RH for increasing or decreasing volume of audio output, and a mute key 180RI for switching on/off of the audio output.

<Process Example of Network Switching by Advanced Terrestrial Digital Key>
The remote controller 180R of the broadcast receiving apparatus 100 according to the embodiment of the present invention includes an "advanced terrestrial digital key", a "terrestrial digital key", an "advanced BS key", a "BS key", and a "CS key" as the network switching key 180R5. Here, with respect to the "advanced terrestrial digital key" and the "terrestrial digital key", the broadcast receiving apparatus 100 may be configured so that in the advanced terrestrial digital broadcasting service, for example, in a case where the simultaneous broadcasting of a 4K broadcasting program and a 2K broadcasting program by different layers is conducted, selection of the 4K broadcasting program is prioritized at the time of channel selection in a state where the "advanced terrestrial digital key" is pressed; and selection of the 2K broadcasting program is prioritized at the time of channel selection in a state where the "terrestrial digital key" is pressed. By controlling the broadcast receiving apparatus 100 in this manner, in a case where there are many errors in the transmission wave of the 4K broadcasting program in a situation where the 4K broadcasting program can be received, for example, it becomes possible to control the broadcast receiving apparatus 100 so that the 2K broadcasting program can be selected forcibly by pressing the "terrestrial digital key".

<Screen Display Example at Time of Channel Selection>

As described above, the broadcast receiving apparatus 100 according to the embodiment of the present invention has a function to display information on selected channel by a banner display or the like when channel selection by the one-touch channel selection, the channel up/down selection, or the direct channel selection is executed.

Figure 12B:
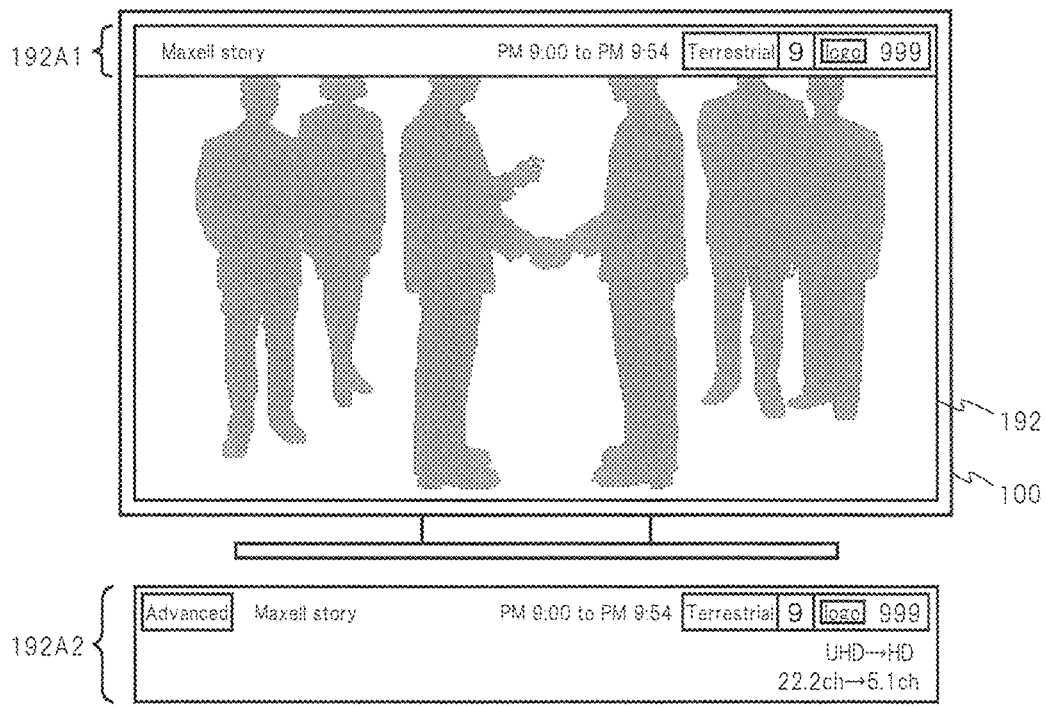
FIG. 12B is a diagram for explaining banner display at the time of channel selection according to one embodiment of the present invention.

FIG. 12B illustrates one example of the banner display at the time of channel selection. A banner display 192A1 is an example of a banner display that is displayed when a 2K broadcasting program is selected. For example, a program name, a start time and an end time of a program, a network type, a number of a direct channel selection key of a remote controller, a service logo, and a triple-digit number may be displayed. Further, a banner display 192A2 is an example of a banner display that is displayed when a 4K broadcasting program is selected. For example, in addition to similar information as those of the banner display 192A1 described above, a mark symbolizing "advanced", which indicates that a program being receives is a 4K broadcasting program, is further displayed. Further, in a case where a resolution converting process or a downmixing process is executed, a display indicating that effect may be executed. In the example of the banner display 192A2, as one example, it is displayed that the down-converting process from UHD resolution to HD resolution and the downmixing process from 22.2 ch to 5.1 ch have been executed.

In the broadcast receiving apparatus 100, by executing these displays, in a case where the same content is broadcast as broadcasting programs with different quality such as a 2K broadcasting program or a 4K broadcasting program at the same time by the simultaneous broadcasting or the like, the user can suitably grasp which broadcasting program is displayed.

According to the system of the advanced digital broadcasting service, which includes apart or all of the functions of each function according to the embodiment of the present invention described above, it becomes possible to provide a transmission technique and a reception technique for an advanced digital broadcasting service with higher functionality in consideration of compatibility with an existing digital broadcasting service. Namely, it is possible to provide a technique for more suitably transmitting or receiving the advanced digital broadcasting service.

As described above, the examples of the embodiment according to the present invention have been described. However, the configuration for realizing the techniques according to the present invention is not limited to the embodiment, and various modification examples can be considered. For example, apart of the configuration of one embodiment can be replaced by the configuration of the other embodiment, and the condition of one embodiment can also be added to the configuration of the other embodiment. All of these belong to the scope of the present invention. Further, numerical values or messages appearing in the specification and the drawings are merely one example, and the effects of the present invention may not be impaired even though different ones are used.

The functions of the present invention described above may be realized by hardware, for example, by designing apart or all of them by an integrated circuit. Further, a microprocessor unit or the like interprets and executes operating programs for realizing the respective functions, whereby the functions may be realized by software. Hardware and software may be used together.

Note that the broadcast receiving apparatus 100 may become a state where the software for controlling the broadcast receiving apparatus 100 is stored in at least one of the ROM 103 or the storage 110 of the broadcast receiving apparatus 100 in advance at the time of product shipment. The broadcast receiving apparatus 100 may be configured so as to obtain the software from the other application server on Internet 800 via the LAN communication unit 121 after the product shipment. Further, the broadcast receiving apparatus 100 may obtain the software stored in a memory card or an optical disc via the extension interface 124. Similarly, the portable information terminal 700 become a state where the software for controlling the portable information terminal 700 is stored in at least one of a ROM or a storage of the portable information terminal 700 in advance at the time of product shipment. The portable information terminal 700 may be configured so as to obtain the software from the other application server on the Internet 800 via a LAN communication unit or a mobile phone network communication unit of the portable information terminal 700 after the product shipment. Further, the portable information terminal 700 may obtain the software stored in a memory card or an optical disc via an extension interface of the portable information terminal 700.

Further, the control lines and the information lines illustrated in the drawings indicate what are considered necessary for explanation thereof, and do not necessarily indicate all of the control lines and the information lines on a product. In fact, it may be considered that almost all configurations are connected mutually.

REFERENCE SINGS LIST

100: broadcast receiving apparatus, 101: main controller, 102: system bus, 103: ROM, 104: RAM, 110: storage (accumulator), 121: LAN communication unit, 124: extension interface, 125: digital interface, 130C, 130T, 130L, 130B: tuner/demodulator, 140S, 140U: decoder, 180: operation input unit, 191: video selector, 192: monitor, 193: video output unit, 194: audio selector, 195: speaker, 196: audio output unit, 180R: remote controller, 200, 200T, 200L, 200B: antenna, 300, 300T, 300L: radio tower, 400C: head-end of cable television station, 400: broadcast station server, 500: service provider server, 600: mobile phone communication server, 600B: base station, 700: portable information terminal, 800: the Internet, 800R: router device.

The invention claimed is:

1. A broadcast receiving apparatus comprising:
a tuner/demodulator configured to receive a first transmission wave transmitted in a first polarization direction in an air and a second transmission wave transmitted into a second polarization direction different from the first polarization direction in the air, and generate a stream by executing a demodulating process using the first transmission wave and the second transmission wave; and
a controller,
wherein each of the first transmission wave and the second transmission wave has a predetermined bandwidth divided into a predetermined number of segments, and
wherein the controller is configured to identify, on a basis of identification information contained in the second transmission wave, a group of segments having a same segment number as a segment that belongs to a predetermined layer transmitted by the first transmission wave in the first polarization direction among the segments transmitted by the second transmission wave in the second polarization direction as a layer different from the predetermined layer of the first transmission wave.

2. The broadcast receiving apparatus according to claim 1, wherein the identification information is stored in a carrier that is modulated differently from a data carrier in the second transmission wave received by the tuner/demodulator.

3. A method of processing a transmission wave in a digital broadcasting system, the method comprising:
- a transmitting step of transmitting a first transmission wave in a first polarization direction in the digital broadcasting system, and transmitting a second transmission wave in a second polarization direction different from the first polarization direction;
- a receiving step of receiving the first transmission wave and the second transmission wave transmitted in the transmitting step;
- a layer identifying step of identifying layers included in the first transmission wave and the second transmission wave received in the receiving step, wherein each of the first transmission wave and the second transmission wave has a predetermined bandwidth divided into a predetermined number of segments, and wherein identification information is stored in the second transmission wave, and a group of segments having a same segment number as a segment that belongs to a predetermined layer transmitted by the first transmission wave in the first polarization direction among the segments transmitted by the second transmission wave in the second polarization direction in the layer identifying step can be identified as a layer different from the predetermined layer.

4. The method of processing a transmission wave according to claim 3, wherein the identification information is stored in a carrier that is modulated differently from a data carrier in the plurality of different transmission waves.

\* \* \* \* \*